(12) United States Patent
Sampemane et al.

(10) Patent No.: US 11,170,120 B1
(45) Date of Patent: Nov. 9, 2021

(54) RUNTIME COMPUTER SOFTWARE PRODUCT MANAGEMENT SYSTEM

(71) Applicant: INTUIT INC., Mountain View, CA (US)

(72) Inventors: Leena Sampemane, Foster City, CA (US); Michael A. Meagher, Cary, NC (US)

(73) Assignee: INTUIT INC., Mountain View, CA (US)

( * ) Notice: Subject to any disclaimer, the term of this patent is extended or adjusted under 35 U.S.C. 154(b) by 1162 days.

(21) Appl. No.: 15/146,558

(22) Filed: May 4, 2016

(51) Int. Cl.
   *G06F 21/62* (2013.01)
   *G06Q 20/12* (2012.01)
   *G06F 21/10* (2013.01)

(52) U.S. Cl.
   CPC ........ *G06F 21/6218* (2013.01); *G06F 21/105* (2013.01); *G06Q 20/127* (2013.01); *G06F 2221/0724* (2013.01)

(58) Field of Classification Search
   None
   See application file for complete search history.

(56) References Cited

U.S. PATENT DOCUMENTS

| | | | |
|---|---|---|---|
| 4,937,863 | A | 6/1990 | Robert |
| 6,252,964 | B1 | 6/2001 | Lewski |
| 6,292,568 | B1 | 9/2001 | Akins |
| 7,636,742 | B1 | 12/2009 | Olavarrieta |
| 8,364,951 | B2 | 1/2013 | Peterka |
| 10,505,987 | B2 | 12/2019 | Mitevski |
| 2003/0009691 | A1 | 1/2003 | Lyons |
| 2003/0065597 | A1 | 4/2003 | Smith |
| 2004/0186809 | A1 | 9/2004 | Schlesinger |
| 2005/0071418 | A1 | 3/2005 | Kjellberg |
| 2005/0131833 | A1 | 6/2005 | Martinelli |
| 2006/0041930 | A1 | 2/2006 | Hafeman |
| 2006/0069926 | A1 | 3/2006 | Ginter |
| 2006/0235831 | A1 | 10/2006 | Adinolfi |

(Continued)

OTHER PUBLICATIONS

U.S. Appl. No. 15/011,326, filed Jan. 29, 2016.

(Continued)

*Primary Examiner* — Neha Patel
*Assistant Examiner* — Nicholas K Phan
(74) *Attorney, Agent, or Firm* — DLA Piper LLP (US)

(57) ABSTRACT

Runtime computer software product management systems that operate in a networked computing environment. A computer database or computer software product configuration/access management system includes a runtime subscription model including a hybrid entitlement-service state model that defines a hybrid state including first or entitlement state data specifying access to the computer software product by the customer and second or service state data specifying permissible customer actions given a pre-determined combination of entitlement state and service state data. Subscription model state changes may be executed in runtime in response to events published by an event generation system and processed by the configuration/access management system, and modifications to the hybrid state are communicated to an access control system. The access control system responds to customer requests based at least in part upon the received hybrid state data.

19 Claims, 60 Drawing Sheets

(56) References Cited

U.S. PATENT DOCUMENTS

| | | |
|---|---|---|
| 2009/0125380 A1 | 5/2009 | Otto |
| 2009/0150981 A1 | 6/2009 | Amies |
| 2010/0131973 A1 | 5/2010 | Dillon |
| 2010/0229108 A1* | 9/2010 | Gerson .................. A63F 13/12 |
| | | 715/757 |
| 2010/0306090 A1 | 12/2010 | Zargahi |
| 2011/0238526 A1* | 9/2011 | McQuilkin ........ G06Q 30/0601 |
| | | 705/26.7 |
| 2012/0089404 A1 | 4/2012 | Rao |
| 2013/0132235 A1 | 5/2013 | Gandhi |
| 2014/0053277 A1 | 2/2014 | Biswas |
| 2014/0089201 A1 | 3/2014 | Jakulin |
| 2014/0137259 A1* | 5/2014 | Chen .................... G06F 21/105 |
| | | 726/26 |
| 2014/0279216 A1* | 9/2014 | Desmarais ........ G06Q 30/0633 |
| | | 705/26.8 |
| 2015/0135333 A1 | 5/2015 | Biswas |
| 2016/0012465 A1 | 1/2016 | Sharp |
| 2016/0124742 A1 | 5/2016 | Rangasamy |
| 2016/0267257 A1* | 9/2016 | Wisgo ................... G06Q 30/04 |
| 2017/0359346 A1 | 12/2017 | Parab |
| 2018/0144108 A1* | 5/2018 | Sawai ................... G06Q 10/10 |
| 2019/0238944 A1* | 8/2019 | Balasubramanian ....................... |
| | | H04N 21/2668 |

OTHER PUBLICATIONS

U.S. Appl. No. 15/364,826, filed Nov. 30, 2016.
U.S. Appl. No. 16/371,710, filed Apr. 1, 2019.
U.S. Appl. No. 15/011,326, filed Jan. 29, 2016 (Jan. 10, 2020 to present).
U.S. Appl. No. 16/371,710, filed Apr. 1, 2019 (Jan. 10, 2020 to present).
Amazon Web Services, AWS Marketplace Entitlement Service, 2017, API Reference API Version Jan. 11, 2017.
U.S. Appl. No. 15/011,326, filed Jan. 29, 2016 (Nov. 3, 2020 to present).
U.S. Appl. No. 15/011,326, filed Jan. 29, 2016 (Jul. 5, 2021 to present).

* cited by examiner

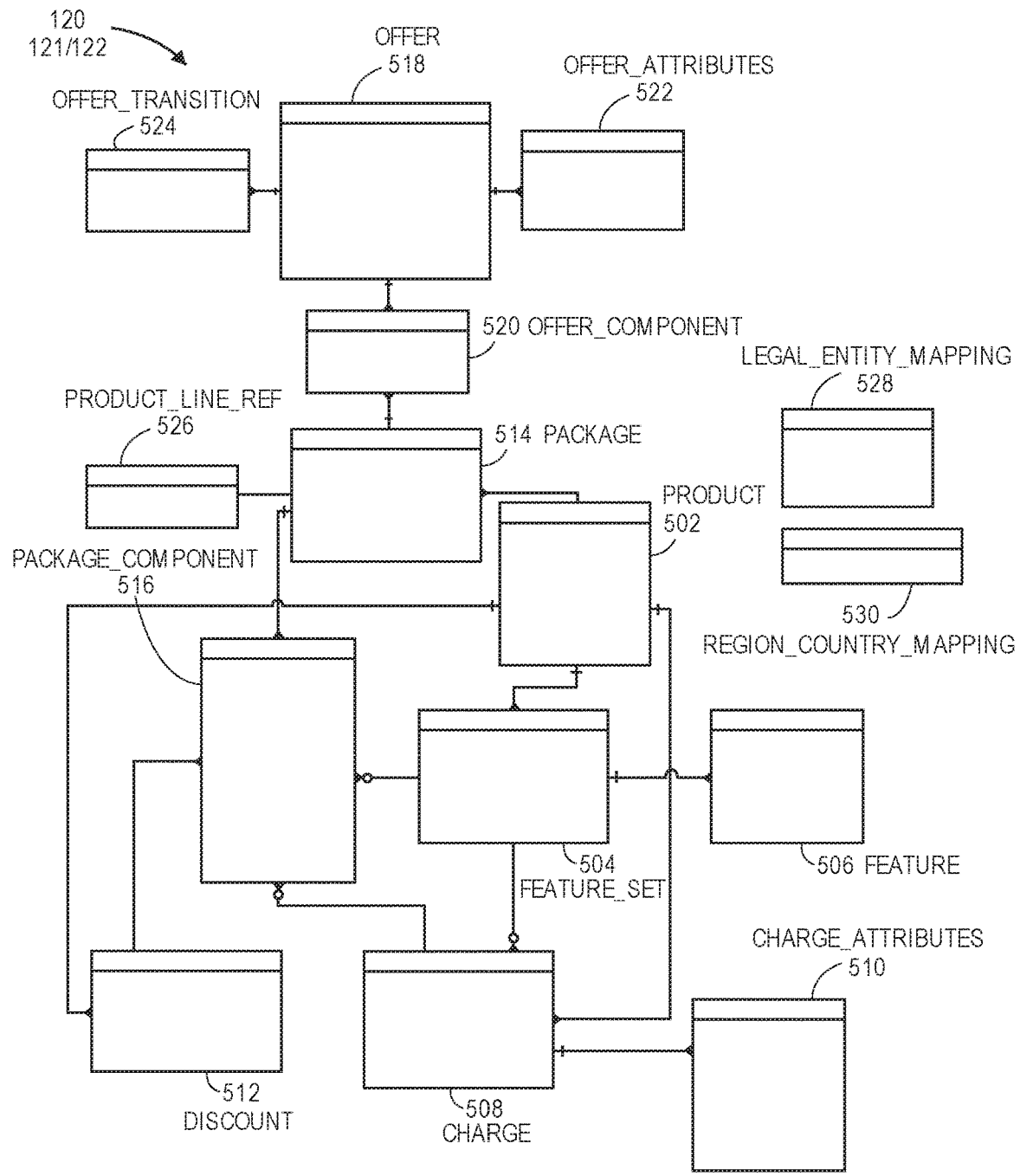
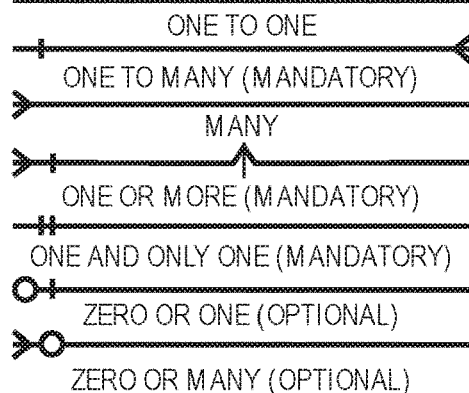
FIG. 5A

PRODUCT
PRODUCT_ID(PK)
CODE(Unique)
NAME
DESCRIPTION
GRANT_OFFERING_TYPE (eg:
Intuit.sbe.salsa.default)
BILLING_SERVICE_TYPE (eg: /service/
intuit/qbo)
ITEM_CLASSIFICATION (software, SaaS,
collateral...)
TAX_CLASSIFICATION
DATA_RETENTION_RULE (placeholder)
TRIAL_LOCK_OUT_RULE (placeholder)

FIG. 6A

Products

| PRODUCT_ID | CODE | NAME | DESCRIPTION | GRANT_OFFERING_TYPE | BRM_SERVICE_TYPE | ITEM_CLASSIFICATION | TAX_CLASSIFICATION |
|---|---|---|---|---|---|---|---|
| 01-01 | QBO | QuickBooks Online | QuickBooks Online | intuit.sbe.salsa.default | /service/intuit/qbo | SaaS | ASPB |

FIG. 6B

```
FEATURE_SET

FEATURE_SET_ID(PK)
PRODUCT_ID (FK))
CODE (Unique)
NAME
DESCRIPTION
STATUS (new, pending approval, active, inactive)
```
— 504

FIG. 7A

```
FEATURE

FEATURE_SET_ID(PK)(FK)
ATTRIBUTE_CODE(PK)
ATTRIBUTE_NAME
ATTRIBUTE_TYPE
LIMIT_UNIT_VALUE
LIMIT_UPGRADE_RULE
LIMIT_EXPIRE_PERIOD
LIMIT_EXPIRE_DATE
```
— 506

FIG. 7B

```
CHARGE
─────────────────────────────────
CHARGE_ID(PK)
PRODUCT_ID(FK)
FEATURE_SET_ID(FK)
NAME
DESCRIPTION
STATUS (new, pending approval, active, inactive)
CHARGE_TYPE (usage, recurring, one-time, trial-no charge)
CHARGE_FREQUENCY (monthly, annually...)
REVENUE_GL_ACCT_CODE
```
⎬ 508

FIG. 8A

```
CHARGE_ATTRIBUTES
─────────────────────────────────
CHARGE_ATTRIBUTES_ID(PK)
CHARGE_ID(FK)
REGION
CURRENCY
SALES CHANNEL
CUSTOMER SEGMENT
LIST PRICE
FAIR_VALUE_BASIS
FAIR_VALUE_METHOD
STRATIFICATION_SET
FAIR_VALUE_LOW
FAIR_VALUE_MED
FAIR_VALUE_HIGH
```
⎬ 510

FIG. 8B

Charges

QuickBooks Essentials ROW USD Monthly

| CHARGE_ID | PRODUCT_ID | FEATURE_SET_ID | NAME (Used for on correspondence) | DESCRIPTION | CHARGE_TYPE | CHARGE_FREQUENCY | STATUS |
|---|---|---|---|---|---|---|---|
| 03-01 | 01-01 | 02-01 | QuickBooks Online Essentials | QuickBooks Essentials ROW USD Monthly | Recurring | Monthly | Active |

← 508

*Charge Attributes*

| CHARGE_ATTRIBUTES_ID | CHARGE_ID | REGION | COUNTRY | CURRENCY | CUSTOMER_SEGMENT | SALES_CHANNEL |
|---|---|---|---|---|---|---|
| 031-01 | 03-01 | ROW | * | USD | Default | * |

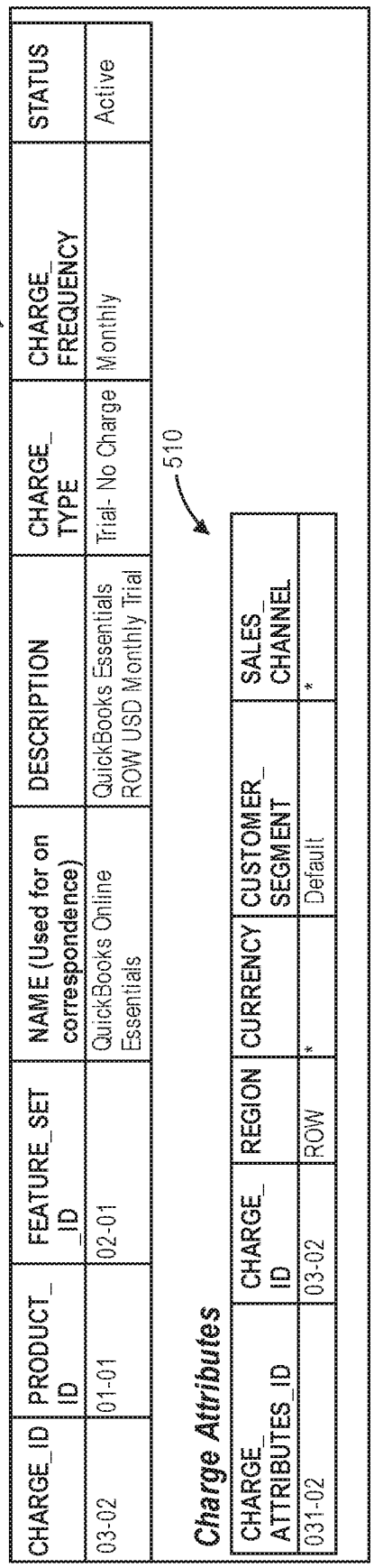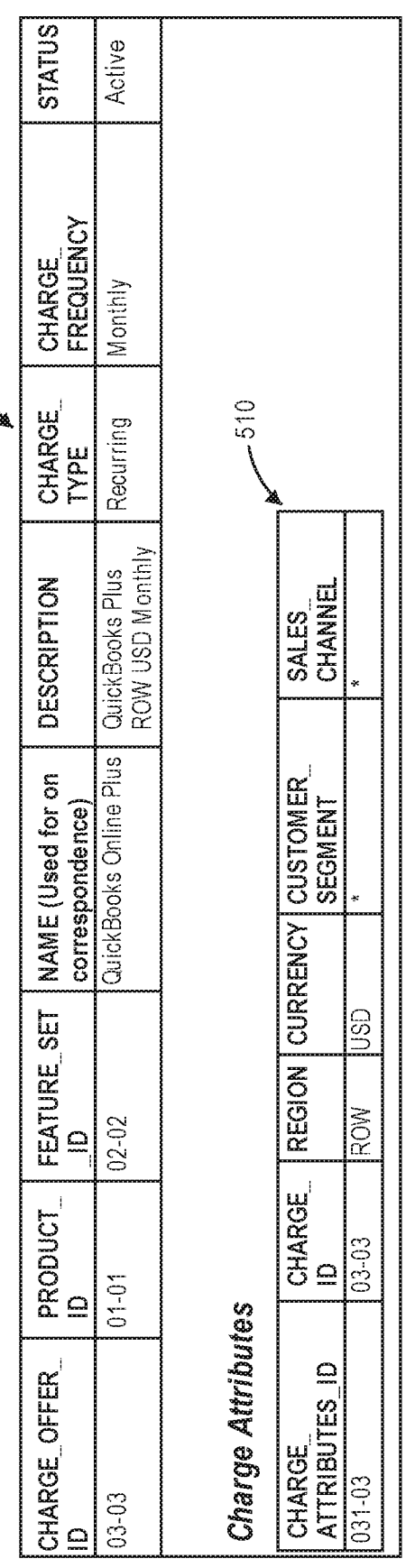
FIG. 8D
FIG. 8E

```
PACKAGE

PACKAGE_ID(PK)
PRODUCT_ID(FK)
NAME
DESCRIPTION
MANUAL_DISCOUNT_PACKAGE (Y,N)
PRODUCT_LINE
SUB_PRODUCT_LINE
STATUS(new, pending approval, active, inactive)
```
— 514

FIG. 10A

```
PACKAGE_COMPONENT

PACKAGE_COMPONENT_ID(PK)
PACKAGE_ID(FK) |package|
COMPONENT_TYPE (Feature Set or
Charge or Discount)
COMPONENT_ID(FK) (feature_set_id or charge_id
or discount_id - for non-manual discount package
must be at least one charge offer or feature set)

For charges and discounts:
RELATIVE_START_UNIT (relative from purchase.
Null for 'Immediate or 'Month').
RELATIVE_START_QTY (1, 2, etc.)
RELATIVE_END_UNIT (relative from purchase.
Null for 'Never' or 'Month')
RELATIVE_END_QTY(1, 2 etc.)
```
— 516

FIG. 10B

Packages

QBO Essentials ROW USD Monthly Base

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-01 | 01-01 | QBO Essentials ROW USD Monthly Base | QuickBooks Essentials ROW USD Monthly Base | QBO | Essentials | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-01 | 05-01 | CHARGE | 03-01 | IMMEDIATE | | NEVER | |
| 051-02 | 05-01 | FEATURE_SET | 02-01 | IMMEDIATE | | NEVER | |

QBO Essentials ROW USD Monthly Trial For One Month

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-02 | 01-01 | QBO Essentials ROW USD Monthly Trial For One Month | QuickBooks Essentials ROW USD Monthly Trial For one Month | QBO | Essentials | Active |

↗ 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-03 | 05-02 | CHARGE | 03-02 | IMMEDIATE | | MONTH | 1 |
| 051-04 | 05-02 | FEATURE_SET | 02-01 | IMMEDIATE | | MONTH | 1 |
| 051-05 | 05-02 | CHARGE | 03-01 | MONTH | 1 | NEVER | |
| 051-06 | 05-02 | FEATURE_SET | 02-01 | MONTH | 1 | NEVER | |

QBO Essentials ROW USD Monthly Trial Buy Now - 30 Percent Off For 12 Months

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-03 | 01-01 | QBO Essentials ROW USD Monthly Buy Now - 30 Percent for 12 Months | QuickBooks Essentials ROW USD Monthly Buy Now - 30 Percent Off For 12 Months | QBO | Essentials | Active |

↙ 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-07 | 05-03 | CHARGE | 03-01 | IMMEDIATE | | MONTH | |
| 051-08 | 05-03 | FEATURE_SET | 02-01 | IMMEDIATE | | NEVER | |
| 051-09 | 05-03 | DISCOUNT | 04-01 | IMMEDIATE | | NEVER | 12 |

QBO Plus ROW USD Monthly Base

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-04 | 01-01 | QBO Plus ROW USD Monthly Base | QuickBooks Plus ROW USD Monthly Base | QBO | Plus | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-10 | 05-04 | CHARGE | 03-03 | IMMEDIATE | | NEVER | |
| 051-11 | 05-04 | FEATURE_SET | 02-02 | IMMEDIATE | | NEVER | |

QBO Plus ROW USD Monthly Trial For One Month

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-05 | 01-01 | QBO Plus ROW USD Monthly Trial For One Month | QuickBooks Plus ROW USD Monthly Trial For One Month | QBO | Plus | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-12 | 05-05 | CHARGE | 03-04 | IMMEDIATE |  | MONTH | 1 |
| 051-13 | 05-05 | FEATURE_SET | 02-02 | IMMEDIATE |  | MONTH | 1 |
| 051-14 | 05-05 | CHARGE | 03-03 | MONTH | 1 | NEVER |  |
| 051-15 | 05-05 | FEATURE_SET | 02-02 | MONTH | 1 | NEVER |  |

QBO Plus ROW USD Monthly Buy Now - 40 Percent Off For 12 Months

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-06 | 01-01 | QBO Plus ROW USD Monthly Buy Now - 40% Off For 12 Months | QuickBooks Plus ROW USD Monthly - 40% Off For 12 Months | QBO | Plus | Active |

↙ 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-15 | 05-06 | CHARGE | 03-03 | MONTH | IMMEDIATE | NEVER | |
| 051-16 | 05-06 | FEATURE_SET | 02-02 | MONTH | IMMEDIATE | NEVER | |
| 051-17 | 05-06 | DISCOUNT | 04-02 | MONTH | IMMEDIATE | MONTH | 12 |

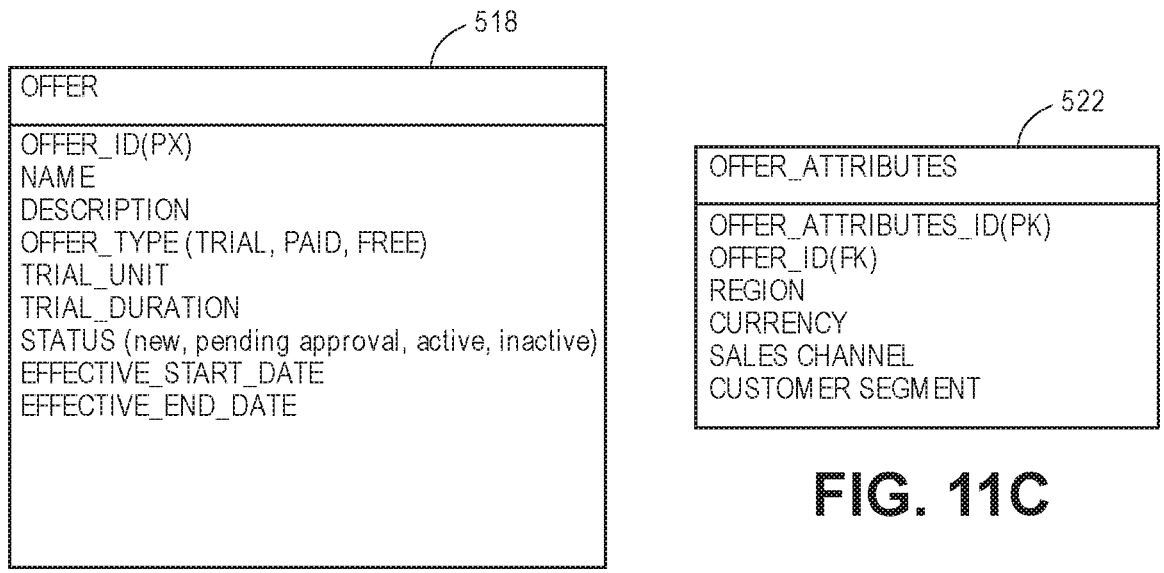
FIG. 11A
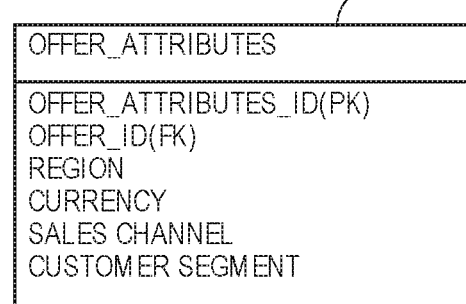
FIG. 11C
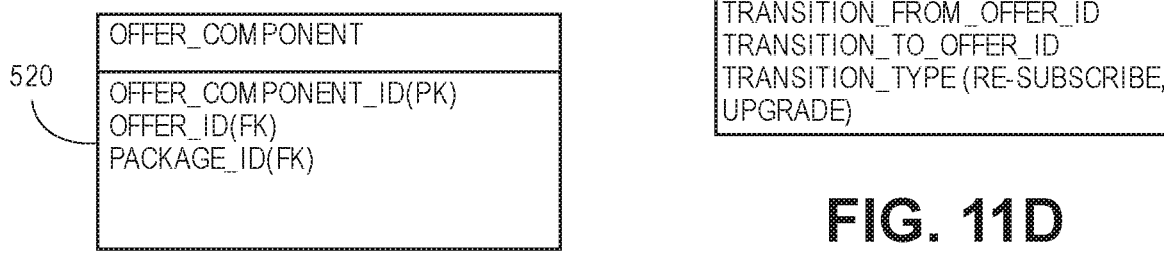
FIG. 11B
FIG. 11D

Offers

QBO Essentials ROW USD Monthly Base Offer

Offer — 518

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-01 | PAID | QBO Essentials ROW USD Monthly Base Offer | QuickBooks Essentials ROW USD Monthly Base Offer | | | Active | 10-01-2014 | |

Offer Component — 520

| OFFER_COMPONENT_ID | OFFER_ID | PACKAGE_ID |
|---|---|---|
| 061-01 | 05-01 | 05-01 |

Offer Attributes — 522

| OFFER_ATTRIBUTE_ID | OFFER_ID | REGION | CURRENCY | CUSTOMER_SEGMENT | SALES_CHANNEL |
|---|---|---|---|---|---|
| 062-01 | 06-01 | ROW | USD | | |

Offer Transition — 512

| OFFER_TRANSITION_ID | TRANSITION_FROM_OFFER_ID | TRANSITION_TYPE | TRANSITION_TO_OFFER_ID |
|---|---|---|---|
| 063-01 | 06-01 | RE-SUBSCRIBE | 06-01 |
| 063-02 | 06-01 | UPGRADE | 06-04 |

FIG. 11E

QBO Essentials ROW USD Monthly Trial (1 Month) Offer

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-02 | TRIAL | QBO Essentials ROW USD Monthly Trial For One Month Offer | QuickBooks Essentials ROW USD Monthly Trial For One Month Offer | Month | 1 | Active | 10-01-2014 | |

← 518

Offer Component

| OFFER_COMPONENT_ID | OFFER_ID | PACKAGE_ID |
|---|---|---|
| 061-02 | 05-02 | 05-02 |

← 520

Offer Attributes

| OFFER_ATTRIBUTE_ID | OFFER_ID | REGION | CURRENCY | CUSTOMER_SEGMENT | SALES_CHANNEL |
|---|---|---|---|---|---|
| 062-02 | 06-02 | ROW | USD | Default | Direct |

← 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-03 | 06-02 | RE-SUBSCRIBE | 06-01 |
| 063-04 | 06-02 | UPGRADE | 06-05 (Applicable only when customer is in trial period) |
| 063-05 | 06-02 | UPGRADE | 06-04 (Applicable only when customer is not in trial period) |

QBO Essentials ROW USD Monthly Buy Now Offer - With 30 Percent Off For 12 Months

Offer — 518

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-03 | PAID | QBO Essentials ROW USD Buy Now Offer - With 30 Percent Off For 12 Months | QuickBooks Essentials ROW USD Monthly Buy Now Offer - With 30 Percent Off For 12 Months | | | Active | 10-01-2014 | |

Offer Component — 520

| OFFER_COMPONENT_ID | OFFER_ID | PACKAGE_ID |
|---|---|---|
| 061-03 | 05-03 | 05-03 |

Offer Attributes — 522

| OFFER_ATTRIBUTE_ID | OFFER_ID | REGION | CURRENCY | CUSTOMER_SEGMENT | SALES_CHANNEL |
|---|---|---|---|---|---|
| 062-03 | 06-03 | ROW | USD | * | * |

Offer Transition — 512

| OFFER_TRANSITION_ID | TRANSITION_FROM_OFFER_ID | TRANSITION_TYPE | TRANSITION_TO_OFFER_ID |
|---|---|---|---|
| 063-06 | 06-03 | RE-SUBSCRIBE | 06-01 |

QBO Plus ROW USD Monthly Base Offer

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-04 | PAID | QBO Plus ROW USD Monthly Base Offer | QuickBooks Plus ROW USD Monthly Base Offer | | | Active | 10-01-2014 | |

↙ 518

Offer Component

| OFFER_COMPONENT_ID | OFFER_ID | PACKAGE_ID |
|---|---|---|
| 061-04 | 05-04 | 05-04 |

↙ 520

Offer Attributes Map

| OFFER_ATTRIBUTE_ID | OFFER_ID | REGION | CURRENCY | CUSTOMER_SEGMENT | SALES_CHANNEL |
|---|---|---|---|---|---|
| 062-04 | 06-04 | ROW | USD | Default | Direct |

↙ 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-07 | 06-04 | RE-SUBSCRIBE | 06-04 |

QBO Plus ROW USD Monthly Trial (1 Month Offer)

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-05 | PAID | QBO Plus ROW USD Monthly Trial Offer (1 Month) | QuickBooks Plus ROW USD Monthly Trial (1 Month) Offer | Month | 1 | Active | 10-01-2014 | |

← 518

Offer Component

| OFFER_COMPONENT_ID | OFFER_ID | PACKAGE_ID |
|---|---|---|
| 061-05 | 05-05 | 05-05 |

← 520

Offer Attributes Map

| OFFER_ATTRIBUTE_ID | OFFER_ID | REGION | CURRENCY | CUSTOMER_SEGMENT | SALES_CHANNEL |
|---|---|---|---|---|---|
| 062-05 | 06-05 | ROW | USD | Default | Direct |

← 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-08 | 06-05 | RE-SUBSCRIBE | 06-04 |

QBO Plus ROW USD Monthly Buy Now Offer - With 40 Percent Off For 12 Months

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-05 | PAID | QBO Plus ROW USD Monthly Buy Now With 40% Off For 12 Months | QuickBooks Plus ROW USD Monthly Buy Now With 40% Off For 12 Months Offer | | | Active | 10-01-2014 | |

↙ 518

Offer Component

| OFFER_COMPONENT_ID | OFFER_ID | PACKAGE_ID |
|---|---|---|
| 061-06 | 05-06 | 05-06 |

↙ 520

Offer Attributes

| OFFER_ATTRIBUTE_ID | OFFER_ID | REGION | CURRENCY | CUSTOMER_SEGMENT | SALES_CHANNEL |
|---|---|---|---|---|---|
| 062-06 | 06-06 | ROW | USD | Default | Direct |

↙ 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-09 | 06-06 | RE-SUBSCRIBE | 06-04 |

| Field | System Generated, Defined in ICS (310a) |
|---|---|
| Code | Revstream Key - systematically generated by the publish process TAG+Charge Record ID+Start Date (QBO1-121114) |
| Meaning | Revstream Key - systematically generated by the publish process (same value as Code) |
| Description | Defined in ICS - Charge Name |
| Tag | Defined in ICS |
| Start Date Active | Defined in ICS - has to be published - Charge date Creation |
| End Date Active | None - this will be set in price change scenario (see above) |
| Enabled Flag | Defaulted - Yes |
| Item | Defined in ICS - has to be published - Charge ID |
| Category One | Defined in ICS - QBO |
| Fair Value Basis | Defined in ICS - BESP (other value is VSOE) |
| FV Method | Defaulted - Amount[Mid]No Test (not clear if we need other vales in drop down) |
| Currency | Defined in ICS |
| Strat Set | Defaulted - Intuit Stratification Set |
| FV Low | Defined in ICS |
| FV Medium | Defined in ICS |
| FV High | Defined in ICS |

FIG. 14

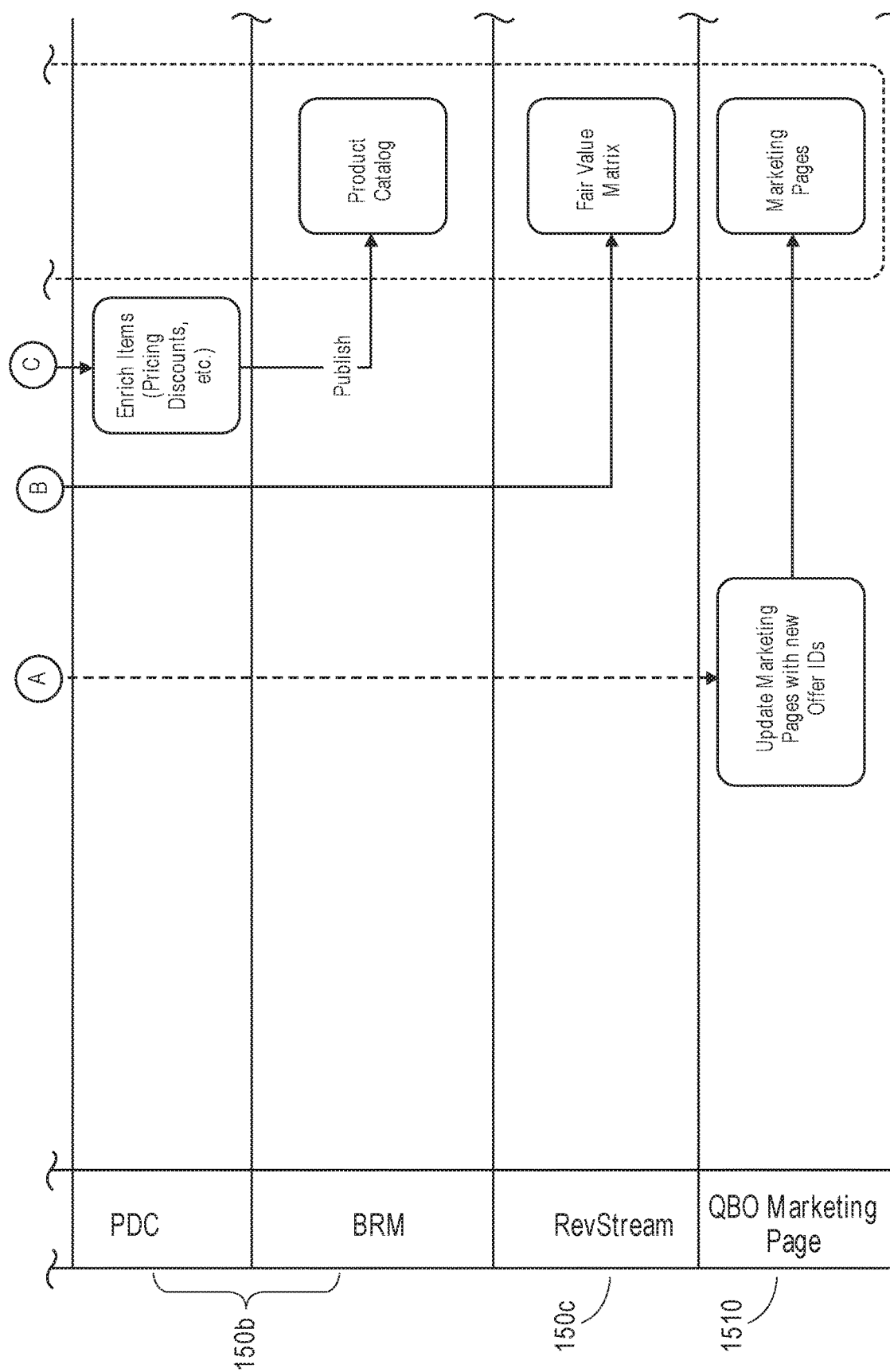

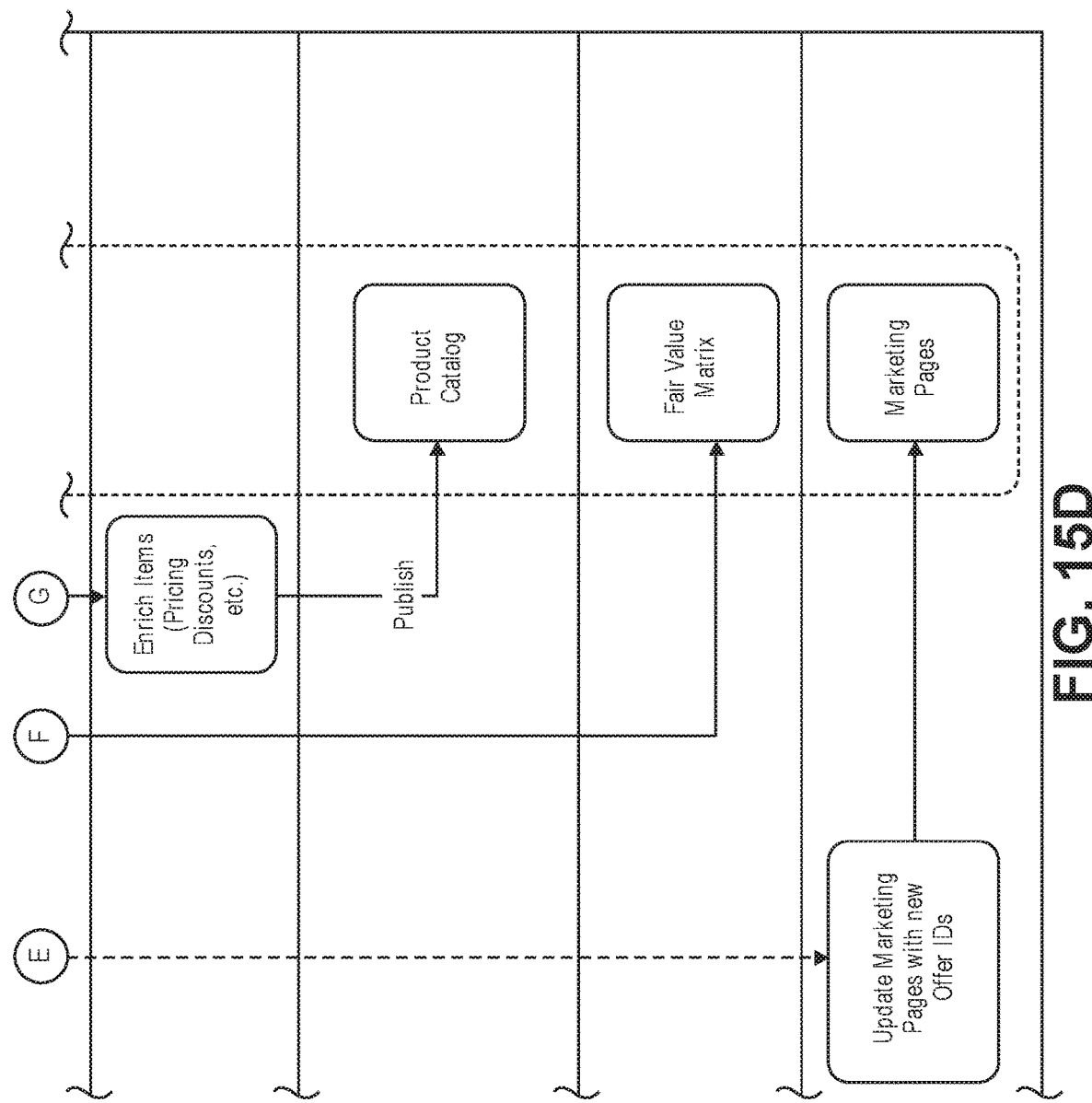

RUNTIME COMPUTER SOFTWARE PRODUCT MANAGEMENT SYSTEM

CROSS-REFERENCE TO RELATED APPLICATION

This application is related to U.S. application Ser. No. 15/011,326, filed Jan. 29, 2016, entitled SOFTWARE MANAGEMENT SYSTEM.

SUMMARY

Embodiments are related to computer-centric technologies such as computer databases, computer software product models, design time computer software product configuration and management, runtime computer software product management and deployment of computer software program products, end-to-end design time—runtime computer software product systems, user interfaces, computer software model publishing systems, computerized software entitlement and enforcement systems, reusable software product definition elements and Software as a Service (SaaS) systems.

Embodiments relate to computer software product definitions and computer software product definition systems for design time computer software management, and certain embodiments involve runtime state models and runtime computer software management systems. Other embodiments involve end-to-end, design time to runtime computing systems for configuration, deployment and enforcement of computer software programs and use or access of same by a subscriber or customer at different runtime stages.

Embodiments are also related to design time and runtime computing systems for managing how computer software products, including Software as a Service (SaaS) and desktop software products (generally, computer software products), are activated, deployed or made accessible to a customer, using remote access or executing on a user's local computing device, which may be a desktop computer or mobile communication device, and how a customer may transition to a different computer software product configuration or feature set, controlling runtime access to computer software products and controlling which actions a customer can perform given runtime entitlement and service states of an integrated or hybrid state model that contains both entitlement state and service state data.

Embodiments are also related to systems for configuring managing computer software product monetization.

Embodiments are also related to computer software product management systems including systems that include data models that integrate entitlement definitions and monetization definitions that are related to and inextricably tied to each other and data models that integrate entitlement state data or definitions and service state data or definitions related to and inextricably tied to each other.

Embodiments are also related to computer software product management systems that include agnostic data models that integrate design time entitlement definitions and monetization definitions and runtime state models and that can be utilized to configure various computer software products and manage access thereto by a customer.

Embodiments are also related to computer software product management systems including systems that include data models that integrate entitlement definitions and monetization definitions and/or data models that integrate entitlement state and service state data or definitions.

Embodiments are also related to user interfaces generated by a computer software product management systems for configuring computer software products by configuration of data models that integrate entitlement definitions and monetization definitions.

Embodiments are also related to computer software product management systems that publish different elements of, or portions of, a data model that integrates entitlement definitions and monetization definitions of a computer software product.

Embodiments are also related to computer software product management systems that publish different portions of a data model that integrates entitlement definitions and monetization definitions, for runtime processing including processing of customer requests.

Embodiments are also related to adaptive computer software product management systems that involve design time integrated or hybrid entitlement-monetization models for software product configuration and runtime integrated or hybrid entitlement state—service state models.

Embodiments are also related to data models and computer software product management systems that utilize data model elements, modules, records or objects and that integrate entitlement and monetization definitions such that a feature set can be monetized differently based on factors such as charge type, charge frequency and currency, and whether a customer is eligible for certain pricing attributes is specified by other charge attribute portions of the data model.

One embodiment is directed to a computerized system for design time computer software product management, which involves an integrated or hybrid entitlement-monetization data model and that may be in a networked computing environment and involve different computing systems or platforms. A computing system constructed according to one embodiment includes a computer database, a hybrid entitlement-monetization data model, a publishing service and spoke computing systems. The data model is an integrated or hybrid entitlement-monetization data model in which an entitlement definition, which specifies a computer software product and attributes thereof, is inextricably tied to, or integrated with, a monetization definition, which specifies terms that govern use of the computer software product specified by the entitlement definition. The publishing service is in communication between the computer database and spoke computing systems and is configured to provide elements of the entitlement-monetization data model to respective spoke computing systems for subsequent runtime processing of a customer request made through a customer-facing application concerning a computer software product. The spoke computing systems are configured to process the request to deploy or provide access to the computer software product through a network in response to the request.

Another embodiment is directed to a computing system for automated runtime computer software product management in a networked computing environment and that can operate across different computing systems. A runtime computer software product management system constructed according to one embodiment comprises a computer database, an event generation system, and a computer software product access control or enforcement system. The computer database is programmed or configured as a special purpose computing component that includes a runtime subscription model executed or processed by a host computer or the computer database to govern use of a computer software product by a customer and includes an integrated or hybrid runtime entitlement-service state model. According to one embodiment, the integrated or hybrid runtime entitlement-service state model comprises first state data specifying access to the computer software product by the customer and second state data specifying a service state and utilized to indicate permissible customer actions involving the computer software product based at least in part upon the first state data. The event generation system is programmed or configured as a special purpose computing component that is in communication with the database of the host computer and is programmed or configured to automatically generate and publish system generated events to which the computer database is subscribed to receive. An automatic runtime modification to the entitlement-service state model is executed based at least in part upon a published event. The access control or enforcement system is programmed or configured as a special purpose computing component that is in communication with the computer database and a computing apparatus of the customer and is configured or programmed to receive data of the integrated entitlement-service state model from the database or host computer, receive a request to access the computer software product through a customer facing application accessible by the customer's computer, and automatically respond to the request through the customer-facing application based at least in part upon the received runtime subscription model data.

Other system embodiments include a host computer or database comprising an integrated or hybrid runtime subscription model for automatically governing use of a computer software product by a customer and that includes a runtime integrated or hybrid entitlement state—service state model. Embodiments may also include one or more other computing systems or components such as one or more of an event generation system, an access control or enforcement system, and a customer facing application for interacting with the customer.

Further embodiments are directed to integrated or hybrid data models utilized in a computerized system for design time and/or runtime computer software product management. In one embodiment, an integrated or hybrid design time data model includes an entitlement definition, which specifies a computer software product and attributes thereof. The entitlement definition is inextricably tied to, or integrated with, a monetization definition that specifies terms that govern use of the computer software product specified by the entitlement definition. In another embodiment, an integrated or hybrid runtime subscription model governs runtime use of a computer software product by a customer and includes an integrated or hybrid entitlement-service state model. A hybrid state is reflected by the integrated or hybrid entitlement-service state model including first state data specifying access to the computer software product by the customer (such as whether access is permitted and access type such as full access or read only access) and second state data specifying permissible customer actions involving the computer software product based at least in part upon the first state data (e.g., during a service state of "trial" when the entitlement state is "active," a customer may opt-out of a trial subscription, opt-in to a paid subscription or opt to purchase the computer software produce immediately).

Additional embodiments involve an integrated or hybrid data model for computer software product management that provides for re-use of data model elements, records or objects, which may involve design time and/or runtime applications.

Further embodiments are directed to computer-implemented methods for design time and/or runtime computer software product management in a networked computing environment and that may involve different computing systems or platforms. Embodiments may utilize a design time data model that is an integrated or hybrid entitlement-monetization data model and/or a runtime data model that is an integrated entitlement state—service state data model.

Additional embodiments are directed to computer program products or articles of manufacture comprising a non-transitory computer readable medium embodying instructions executable by a computer to execute a process for design time and/or runtime computer software product management.

In a single or multiple embodiments, the computer database is executed by a first computer that is in communication through a first network with the event generation system executed by a second computer and in communication through a second network with the access control system executed by a third computer. The event generation system automatically generates events in response to, for example, a user action of opting in from a trial subscription to another subscription, or as an indicator of subscription payment or non-payment or other pre-determined trigger. In one computing system configuration, the computer database, the event generation system and the access control system are independent of, and not accessible by, a customer or subscriber through the customer facing application utilized by the customer to transmit a request concerning a computer software product.

In a single or multiple embodiments, the runtime subscription model includes a customer account identification element comprising a unique identifier for the customer, a subscription element comprising the integrated or hybrid entitlement-service state model representing an instance of a computer software product to which the customer is entitled to access, an entitled product element associated with the subscription element and the customer account identification element and identifying an offer related to the entitled product, and an entitled product attribute element associated with the entitled product element and specifying a feature or feature set of the entitled product. According to one embodiment, the integrated or hybrid entitlement-service state model is exclusively contained within the subscription element such that no portion of the integrated entitlement-service state model is included in the entitled product element or the entitled product attribute element.

In a single or multiple embodiments, the runtime subscription model is adaptable to and modifiable for an add-on to a software product, which may be a separate, independent product that is made accessible to a customer when the customer has already subscribed to another computer software product. An integrated or hybrid runtime subscription model may include a subscription add-on element identifying an offer for an add-on to the computer software product, and the integrated entitlement-service state model or portions thereof may be included in the subscription add-on element. An entitled product element is associated with the subscription add-on element and the customer account identification element and identifies the add-on product identified in the subscription add-on element offer, and an entitled product attribute element is associated with the add-on product and specifies a feature or feature set of the add-on product.

In a single or multiple embodiments, first state data of the integrated or hybrid entitlement-service state model includes, indicates or identifies a system generated entitlement state, system generated or selected first access data and system generated or selected second access data. First access data is associated with the entitlement state (such as "active," "inactive" and "closed" computer software product) and specifies whether the subscriber is granted access to the computer software product. The second access data of the integrated or hybrid entitlement-service state model is associated with the entitlement state and specifies a level of access to the computer software product (e.g., whether access is granted or not and level of same such as full access, read-only or restricted access or no access).

In a single or multiple embodiments, the second state data of the integrated or hybrid entitlement-service state model includes, indicates or identifies a service state of the computer software product applicable to the subscriber (such as trial subscription, trial with opt-in to purchase or transition to a paid subscription, paid subscription, pending cancellation, collection). Actions that a customer is allowed to perform are specified based at least in part upon pre-determined combinations of first and second state data, or pre-determined combinations of entitlement state and service state.

In a single or multiple embodiments, the integrated or hybrid entitlement-monetization data model includes a plurality of related model elements, objects, records, tables, or other data structures (generally, model element) including a product model element, a feature set model element, a charge model element, a package model element and an offer model element. The product model element identifies a core or primary computer software product (such as QUICKBOOKS ONLINE, or "QBO"), the feature set model element is associated with the product model element and defines a set of features or limitations of the core computer software product (e.g., a particular version of the software product, such as QBO ESSENTIALS). The charge model element is associated with the product model element and the feature set model element and defines monetization of the feature set model element. The package model element includes the feature set model element and the charge model element for the core computer software product, and an offer or promotion model element includes the package model element and offer terms for the user. A promotion based on the offer model element is presented to the user through a customer-facing offer application during runtime. With the discrete, modular configuration of the integrated model, various model elements can be used for different purposes, or repackaged, once they have been defined. For example, product, feature set, charge and package model elements can be reused. A feature set model element and a charge model element are reusable model elements or modules that can be incorporated into other package model elements, and after a feature set model element has been defined, that feature set model element can be monetized differently for different users, different markets, and other criteria.

In a single or multiple embodiments, the integrated or hybrid entitlement-monetization data model also includes a reusable discount model element that can be applied to the charge model element of the package model element such that a discount model element can be incorporated into other package model elements. In a single or multiple embodiments, the integrated or hybrid entitlement-monetization data model includes a promotion or offer transition model element that specifies other promotions to which a customer can transition from a currently active promotion or computer software product. Given the multiple model elements or objects, the entitlement definition is based at least in part upon a plurality of entitlement definition model elements, the monetization definition is based at least in part upon a plurality of monetization definition model elements, and certain model elements may involve both entitlement definition and monetization definition. For example, in a logical representation of an integrated or hybrid entitlement-monetization data model, a feature set model element includes elements for only entitlement definition, a charge model element includes elements for only monetization definition, and a package model element includes elements for both entitlement definition and monetization definition (e.g., feature set charge (and discount if applicable)). The entitlement-monetization model may also include a charge attribute model element (or a charge attribute element may be integrated into a charge element) that includes elements of both the entitlement definition and the monetization definition and specifies a price and eligibility for the price (e.g., for users in different geographic locations, or different types of users such as an accountant versus a corporate entity).

In a single or multiple embodiments, spoke computing systems include a spoke computing system to which the entitlement-monetization data model is published and serves as an electronic catalog that is accessible by a customer through the customer facing application, a spoke computing system that hosts or utilizes a billing application and a spoke computing system that hosts or utilizes a revenue recognition application. According to embodiments, different parts of the integrated entitlement-monetization data model are published to different spoke computing systems. For example, the entire data model may be published to at least one spoke computing system (which may or may not utilize the entire data model), whereas selected or pre-determined portions of the data model are published to other spoke computing systems for billing and revenue recognition.

In a single or multiple embodiments, the second spoke computing system executes a billing application that is independent of the integrated entitlement-monetization data model such that it may be necessary transform the data model elements by mapping terms of the selected model elements to terms utilized by the billing application, whereas mapping may not be required when publishing data model elements to a spoke computing system that is accessed by the customer through the customer-facing application. Further, if necessary, the second spoke computing system may be configured to further modify or transform the received elements of the entitlement-monetization model by enriching received data model element data by adding one or more of pricing and discount data to create a new set of data for processing by the second spoke or billing computing system.

In a single or multiple embodiments, the same computer database includes both the design time entitlement-monetization data model and the runtime entitlement state—service state data model.

Thus, as will be understood by persons of ordinary skill in the art, computer-centric embodiments provide improvements to various technical fields including, but not limited to, automated computer software product configuration, management, promotion and/or deployment, one or more of which may occur during runtime, computer software product monetization, databases, data models including data models for computer software product configuration and data models for computer software product access and subscriber action management, relational data models, data models with modular elements or objects that can be reused or repurposed for other applications, computerized entitlement definitions, computerized monetization definitions, computer-based publishing services, design time computer applications and runtime computer applications. Further, embodiments involve modification or transformation by generating or modifying computer software product configurations, e.g., by use of reusable entitlement-monetization data model elements and mapping and/or enriching selected portions of the entitlement-monetization data model for processing by spoke computing systems and by automatically modifying the state of an integrated or hybrid entitlement-service state model, for example, based on automatic modifications in response to system generated events and/or user actions. Embodiments also provide improvements to the functioning of one or more computing devices by, for example, providing for more efficient use of computing resources (including processor, memory, network communications, bandwidth consumption) by utilizing a single, centralized computer software product management system that executes based on an integrated or hybrid entitlement-monetization data model and/or an integrated or hybrid entitlement state—service state data model, and eliminating the need for additional computer processing and communications with additional configuration and deployment computing systems in design time and/or runtime applications. Embodiments also provide improvements to the functioning of computing device by, for example, providing for an integrated or hybrid entitlement-monetization computer software product model that can be utilized during both design time and runtime to provide for end-to-end configuration to deployment of computer software products via an integrated or hybrid entitlement state—service state data model utilized to govern access to computer software products and actions that can be performed given a pre-determined combination of entitlement state and service state. Embodiments also provide improvements to the functioning of computing device by, for example, providing for an integrated or hybrid computer software product model or models that include elements, objects or modules that can be re-used for other purposes or in other applications once defined.

BRIEF DESCRIPTION OF THE DRAWINGS

FIGS. 4A-B are examples of a user interface generated for integrated entitlement-monetization model configuration;

FIGS. 5A-E illustrate an entitlement-monetization model constructed according to one embodiment and how different model elements are related to each other compiled in order to generate an offer to be presented to a customer;

FIGS. 6A-B illustrate a "Product" element of the embodiment of the entitlement-monetization model shown in FIGS. 5A-E and examples of how the "Product" element may be populated;

FIGS. 7A-D illustrate "Feature Set" and "Feature" elements of the embodiment of the entitlement-monetization model shown in FIGS. 5A-E and examples of how the "Feature Set" and "Feature" elements may be populated;

FIGS. 8A-F illustrate "Charge" and "Charge Attribute" elements of the embodiment of the entitlement-monetization model shown in FIGS. 5A-E, how monetization definition via a Charge Attribute can be used to define both price and eligibility for the specified price, and examples of how the "Charge" and "Charge Attribute" elements may be populated;

FIGS. 10A-H illustrate "Package" and "Package Component" elements of the embodiment of the entitlement-monetization model shown in FIGS. 5A-E, and examples of how the "Package" and "Package Component" elements may be populated;

FIGS. 11A-J illustrate "Offer," "Offer Component," "Offer Attribute" and "Offer Transition" elements of the embodiment of the entitlement-monetization model shown in FIGS. 5A-E, and examples of how the "Offer," "Offer Component," "Offer Attribute" and Offer Transition elements may be populated;

FIG. 14 is a table illustrating data utilized by a revenue management spoke computing system and which data is defined by an entitlement-monetization model;

FIGS. 15A-D is a system flow diagram illustrating how a software product defined or configured according to an integrated entitlement-monetization model shown in FIGS. 5A-E is defined or configured in design time, tested and validated in pre-production, and eventually activated for production and use, access or purchase by customers;

DETAILED DESCRIPTION OF ILLUSTRATED EMBODIMENTS

Figure 1:
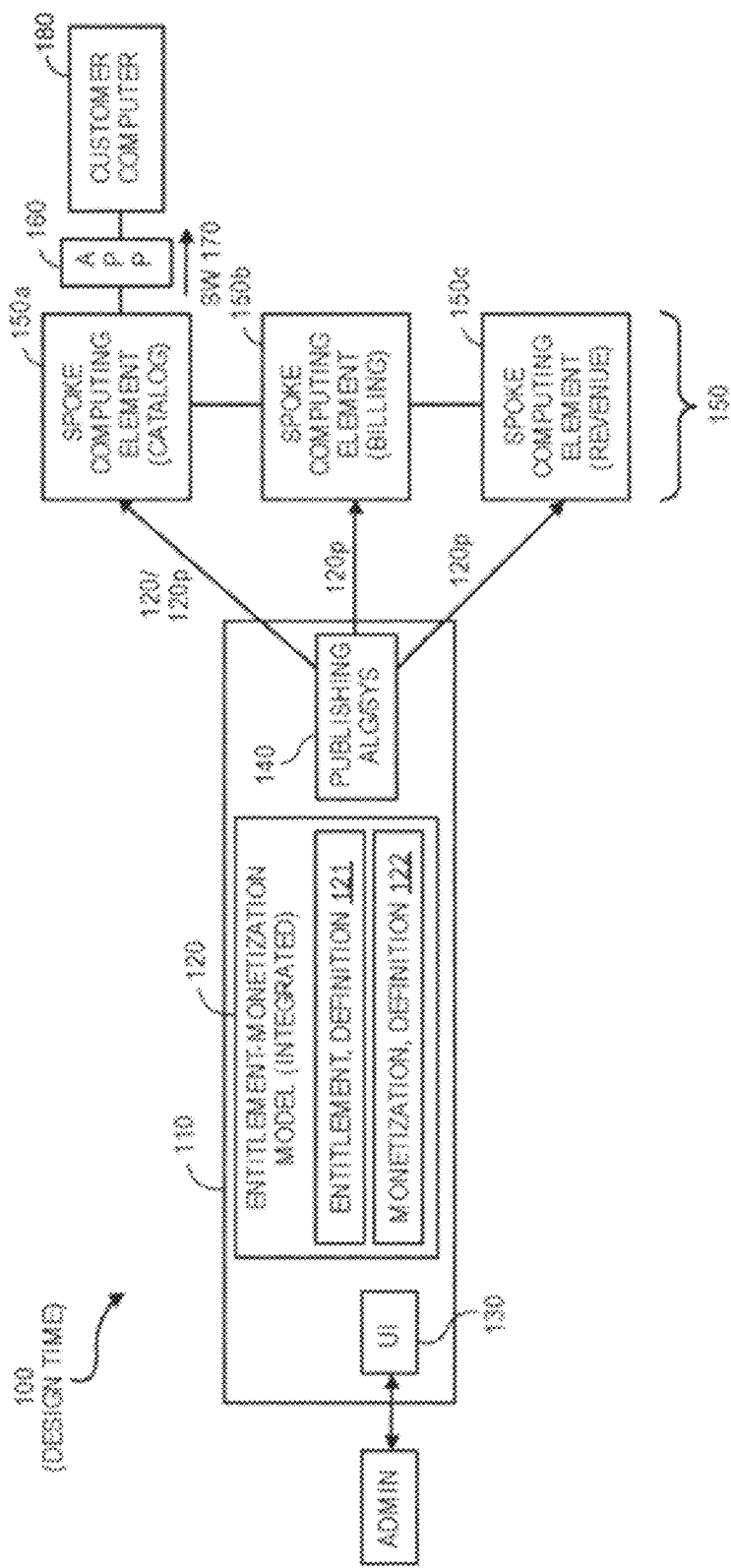
FIG. 1 is a system flow diagram illustrating a computerized software management system constructed according to one embodiment including an integrated entitlement-monetization model.

Embodiments of the invention relate to design time applications involve how computer software products, such as QUICKBOOKS ONLINE (QBO) as one example, are configured for different features, functions or capabilities and corresponding pricing and use restrictions for respective end users or customers. Embodiments of the invention involve a computer database that includes a data model that integrates entitlement definitions that specify the computer software product and features thereof and monetization definitions that specify the terms governing use of the computer software product (e.g., pricing, whether a free offer, whether a discount applies, end users or customers for which monetization terms apply, etc.). Given the manner in which the data model is structured, the integrated entitlement and monetization definitions are interwoven with each other, or tied together, rather than being different models or models that are managed by different computing systems, thus improving the functioning of computing systems utilized for computer software product configuration and deployment by, for example, eliminating the need for additional communications and processing associated with interfacing with other computing devices that utilize their own entitlement and monetization models. Given the manner in which systems are configured, the integrated entitlement-monetization model also provides for reuse of model elements for other software configurations and monetization.

Embodiments of the invention related to runtime applications involve management of access to or use of a computer software product, such as QUICKBOOKS ONLINE (QBO) as one example. Embodiments of the invention involve a computer database that includes a data model that integrates entitlement state and service state that govern subscriber access to computer software products and actions that are permitted by the subscriber. For example, a state generated or represented by the integrated entitlement state—service state data model may specify full access or restricted/read-only access and what actions, such as opt in from a trial subscription, are permitted given a current service state such as pricing, whether a free offer, whether a discount applies, end users or customers for which monetization terms apply, etc.). Given the manner in which the hybrid state model is structured, the entitlement state and service state data or attributes are interwoven with each other, or tied together, rather than being different models or models that are managed by different computing systems, thus improving the functioning of computing systems utilized for computer software product configuration and deployment by, for example, eliminating the need for additional communications and processing associated with interfacing with other computing devices that manage independent entitlement and service states.

Embodiments are also related to design time—runtime systems that include both a data model that integrates entitlement definitions that specify the computer software product and features thereof and monetization definitions and a data model that integrates entitlement state and service state.

Further aspects of embodiments including a design time model that integrates entitlement definitions monetization definitions and a runtime model that integrates entitlement state and service state are described with reference to FIGS. 1-22.

Referring to FIG. 1, in a computerized software management system 100 constructed according to one embodiment, an item configuration system (ICS) hosted on a computer database 110 includes or is structured according to an integrated entitlement-monetization data model 120. According to embodiments, the entitlement-monetization data model 120 includes an entitlement definition 121 that specifies the computer software product 170 and attributes of the computer software product 170, and a monetization definition 122 that specifies terms governing use of or access to the specified software product 170 such as by attributes of price, use, discount, duration, customer and location. The entitlement definition 121 and the monetization definition 122 are integrated with each other, or inextricably tied together, within the entitlement-monetization model 120. The entitlement-monetization model 120 can be generated or modified in order to configure a software product 170 during design time via a generated user interface 130, which is presented to an administrator or host of the system 110 or source of the software product 170, and allows for entitlement-monetization data model 120 generation, configuration and modification.

Figure 2A:
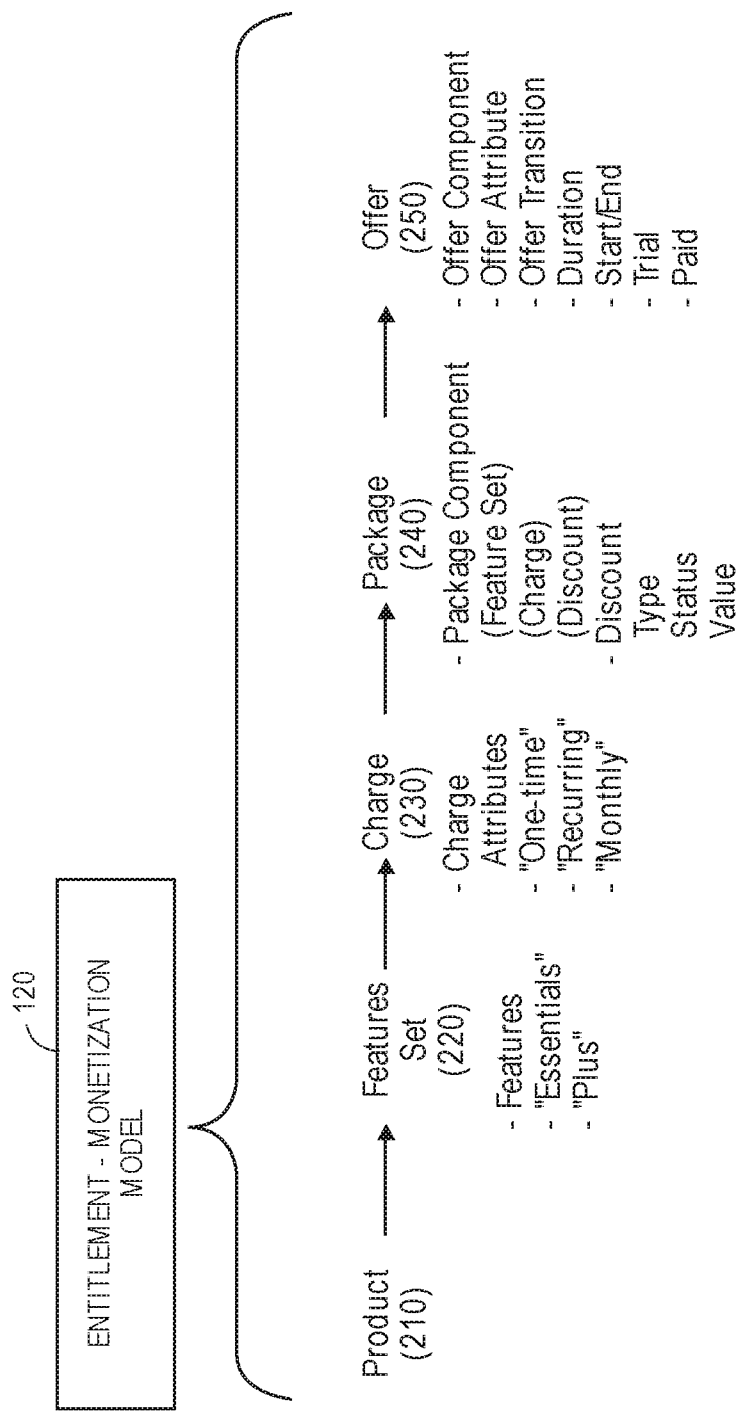
FIGS. 2A and FIGS. 2B-C are system flow diagrams illustrating one manner in which entitlement-monetization model definitions may be structured and related to each other.
Figure 2B:
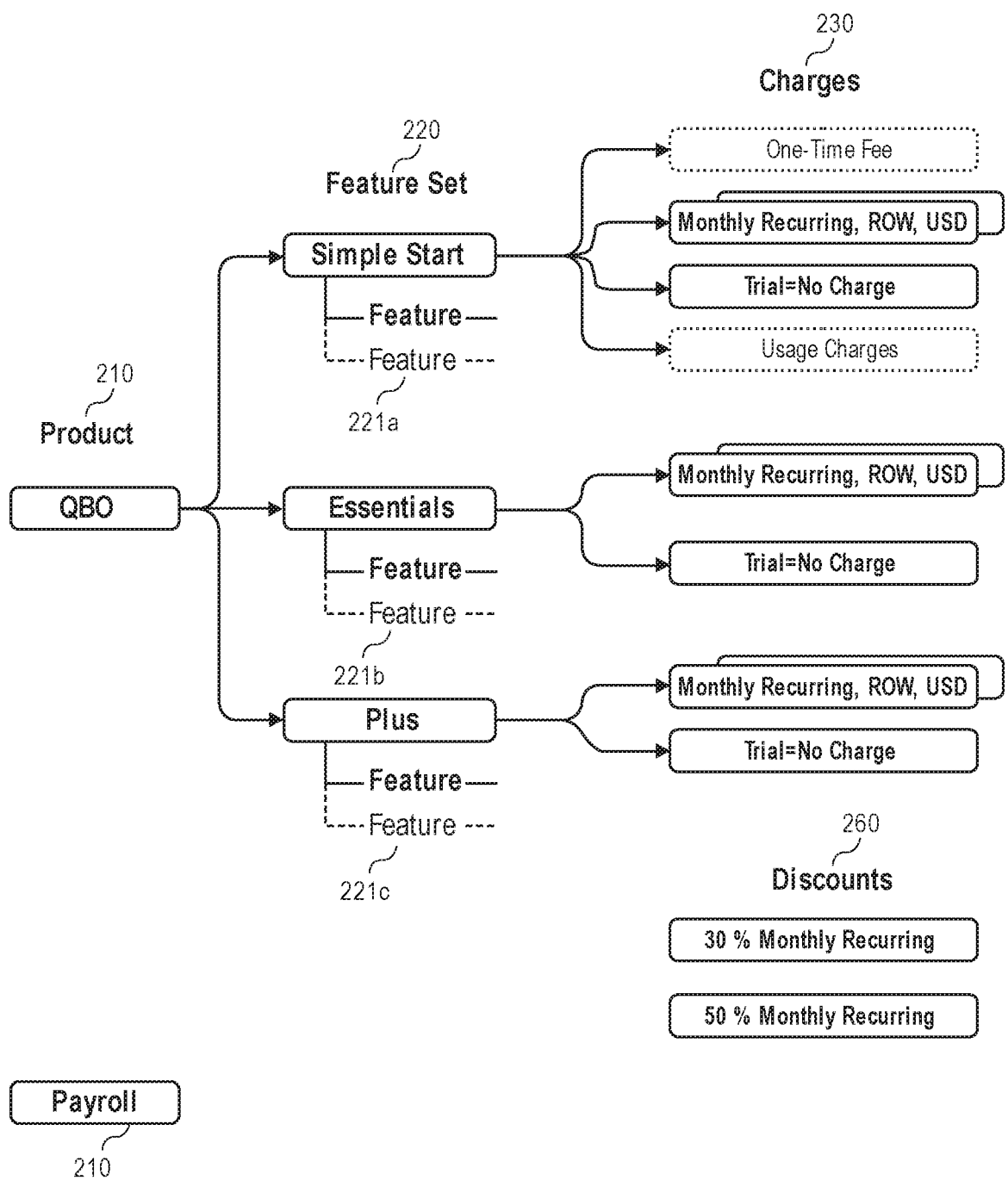
Figure 2C:
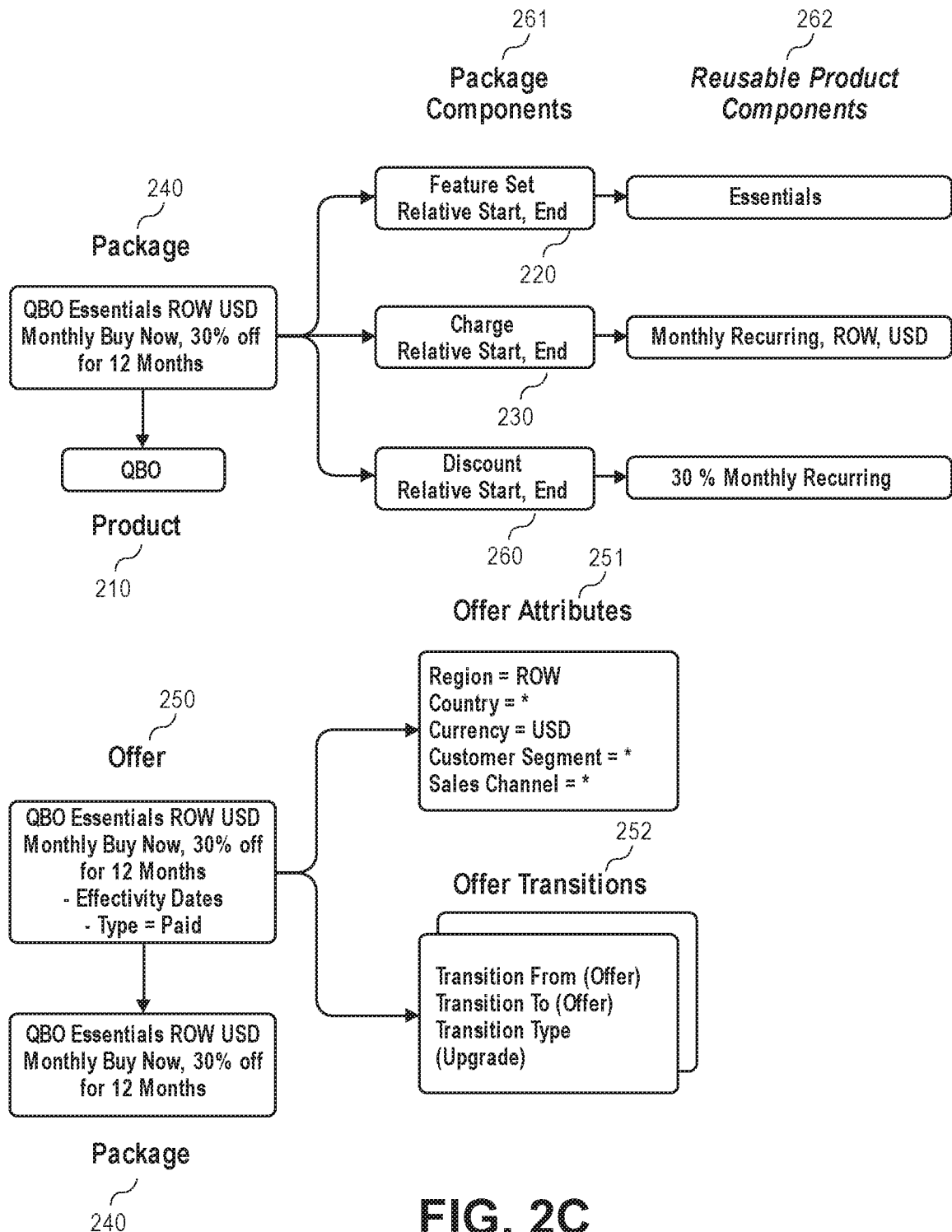

For example, with continuing reference to FIG. 1 and with further reference to FIGS. 2A-C, an entitlement-monetization data model 120 constructed according to one embodiment includes a product record, object, table, or other data element, record, table or object (generally, "element") that uniquely identifies, defines or specifies a core or base software product or offering (such as QBO accounting program, or a payroll program as shown in FIG. 2B). A feature set element 220 associated with the product element 210 specifies a pre-determined set of features or versions of the specified product. Continuing with the example of the specified QBO product, a feature set element 220 may specify a certain version, set of features 221*a-c* (generally, feature 221) or capabilities, limits on features or capabilities, other attributes of QBO, which has predefined "feature sets" limits or capabilities such as QBO "Simple Start," QBO "Essentials," or QBO "Plus."

For example, QBO "Simple Start" may be operable on different computing devices and include capabilities of tracking sales, expenses and profiles, creating and sending itemized invoices, tracking and managing sales tax, whereas QBO "Essentials" may include the "Simple Start" feature set as well as managing and paying bills, performing transactions in multiple currencies, generating sales quotes, and QBO "Plus" may include the "Simple Start" and "Essentials" features as well as tracking inventory, creating purchase orders, tracking product or job profitability. It will be understood that these "feature" elements 221 or "sets" 220 of features are provided as illustrative examples and as an example in the context of QBO, and that embodiments are agnostic and can be applied to various other types of software products 170 including payroll software products and tax return preparation applications such as TURBOTAX tax return preparation application, and other computerized financial management systems. For ease of explanation, reference is made to QBO as an illustrative example, and to "software product."

With continuing reference to FIGS. 1 and 2A-C, the entitlement-monetization model 120 also includes a charge element 230 for the specified software product element 210 and applicable feature set element 220 and according to embodiments, represents different ways a feature set may be monetized. Feature set monetization may be based on one or more attributes or combinations of attributes reflected in the entitlement-monetization model 120 such as price, currency, geographic considerations (whether attributes concern a certain state, location, country or "rest of the world (ROW)), frequency of charge (such as on-time, recurring, monthly, annual), usage limitations, whether the use is trial or free and if so, the duration, etc.

In the illustrated embodiment, the entitlement-monetization data model 120 also includes a package element 240, which includes the specified feature set element 220 and charge element 230 for the identified product 210 and, if applicable, a discount data from a discount element 260. For example, a discount element 260 may specify a 30% discount for monthly recurring charges. Thus, the package element 240 represents a combination of entitlement definition components and monetization definition components, which are specified in related package component elements 261, which indicate whether a package component 261 is a feature set element 220, a charge element 230 or a discount element 260, and package data such as when the package element 240 would be activated or be available and when the package element 240 would terminate or be deactivated.

Further, given the how the entitlement-monetization data model 120 is structured in an integrated manner using separately definable, modular or block model elements, various elements of the entitlement-monetization model 120 can be reused or used in different applications. As generally illustrated in FIG. 2, embodiments may include reuse of a feature set element 220 or feature element (indicated by "Essentials"), reuse of a charge element 230 or charge attribute element (indicated by "Monthly Recurring, ROW, USD), and reuse of a discount element 260 (indicated by "30% Monthly Recurring"), e.g., in other package elements 240. Thus, a package element 240 may specify the software product, feature set and monetization attributes (such as QBO Essentials, "Rest of World," US dollars, monthly payment, buy now for 12 months and receive 30% discount) and may serve as a re-usable container for a specific product 210 including certain feature sets, charge(s) that tie to those feature sets, and discounts that need to be applied to those charges, and once a feature set element is defined, that feature set can be monetized differently for different markets, e.g., for different countries.

Having configured the product element 210, feature set element 220, charge element 230 and package element 240, an offer element 250 that represents a bundle for the software product that is available for purchase, use or access is configured. The offer element 250 and any associated offer attribute element 251 and offer component elements may include one or more previously defined package elements 240 (which themselves include feature set elements 220, charge elements 230 that tie those feature set elements 220 and any applicable discount elements 260 for the product element 210) and offer data that is specific to the customer for which the offer element 250 is configured such as the type of offer (e.g., whether paid, trial, free), a duration of trial if applicable, an offer start date and an offer end data, and a status of the offer (e.g., new, pending approval, active, inactive). This is illustrated in FIGS. 2A-C showing "Offer" element 250 associated with "Package" element 240 and "Offer Attributes" element 251. FIG. 2B also illustrates an embodiment involving an offer transition element 252, which specifies target offers a customer can transition to from a current offer, e.g., upgrading from QBO "Simple Start" to QBO "Essentials."

Embodiments described above involve "design time" configurations, as distinguished from "runtime" processing that involves a customer or end user accessing runtime components regarding computer software products 170 to be utilized, purchased or accessed, as defined by the entitlement-monetization definition model 120. With continuing reference to FIG. 1, having configured to entitlement-monetization data model 120, a publishing module or algorithm 140 is utilized to publish some or all of the definition data of the entitlement-monetization data model 120 to runtime spoke computing systems 150a-c (generally, spoke computing system), which are utilized for runtime processing. Runtime processing may, for example, involve a spoke computing system 150 serving as an electronic catalog of configured software products and that interfaces with a customer facing application 160. A spoke computing system 150 may also involve orders, billing, correspondence, assets/entitlements, revenue recognition, etc. related to user requests transmitted through the customer facing offering application 160.

If necessary, published entitlement-monetization model 120 data can be modified or transformed, e.g., according to pre-determined mapping and/or enrichment, in order to properly interface with a spoke system computing system 150 that utilizes a different data format and/or by adding other data for use by a spoke computing system 150. For example, a billing application executed by a spoke computing system 150 may require that a certain set of data of the entitlement-monetization model 120 be mapped to different model terms and/or that certain data be added to item model 120 data received by the spoke computing system (e.g., data for pricing, discounts, and specifically, enrichment for Balance Impact (price)). It will be understood that whether enrichment is necessary when publishing to some or all of the spoke computing systems 150 may depend on the particular applications executed thereby and corresponding data structures. Further embodiments and aspects of various embodiments are described in further detail with reference to FIGS. 3A-16C.

Figure 3A:
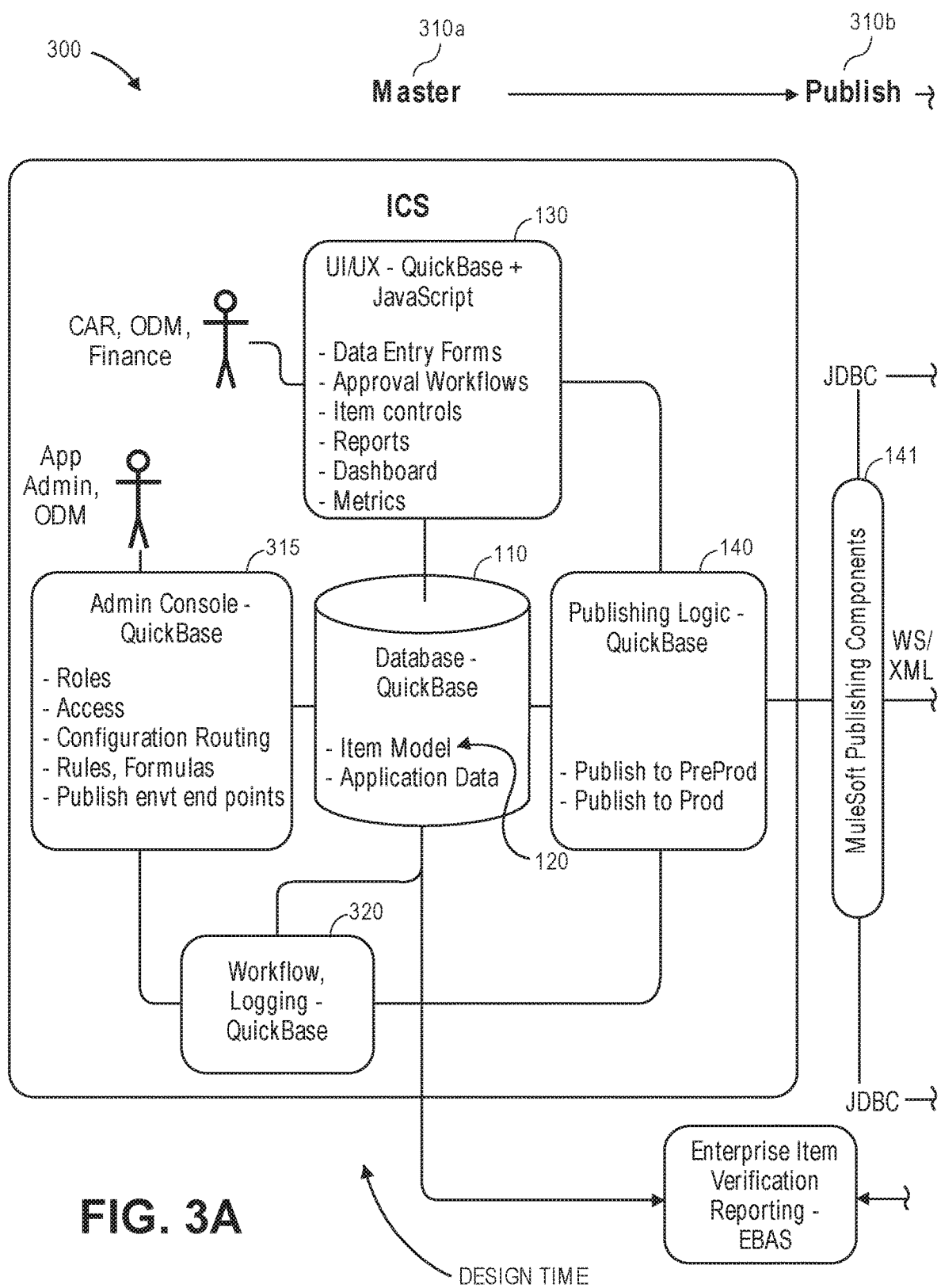
FIGS. 3A-B are system flow diagrams illustrating in further detail a computerized software management system constructed according to one embodiment that includes an integrated entitlement-monetization model, all or a portion of which is published to spoke computing systems, and design time and runtime processing utilizing system components.
Figure 3B:
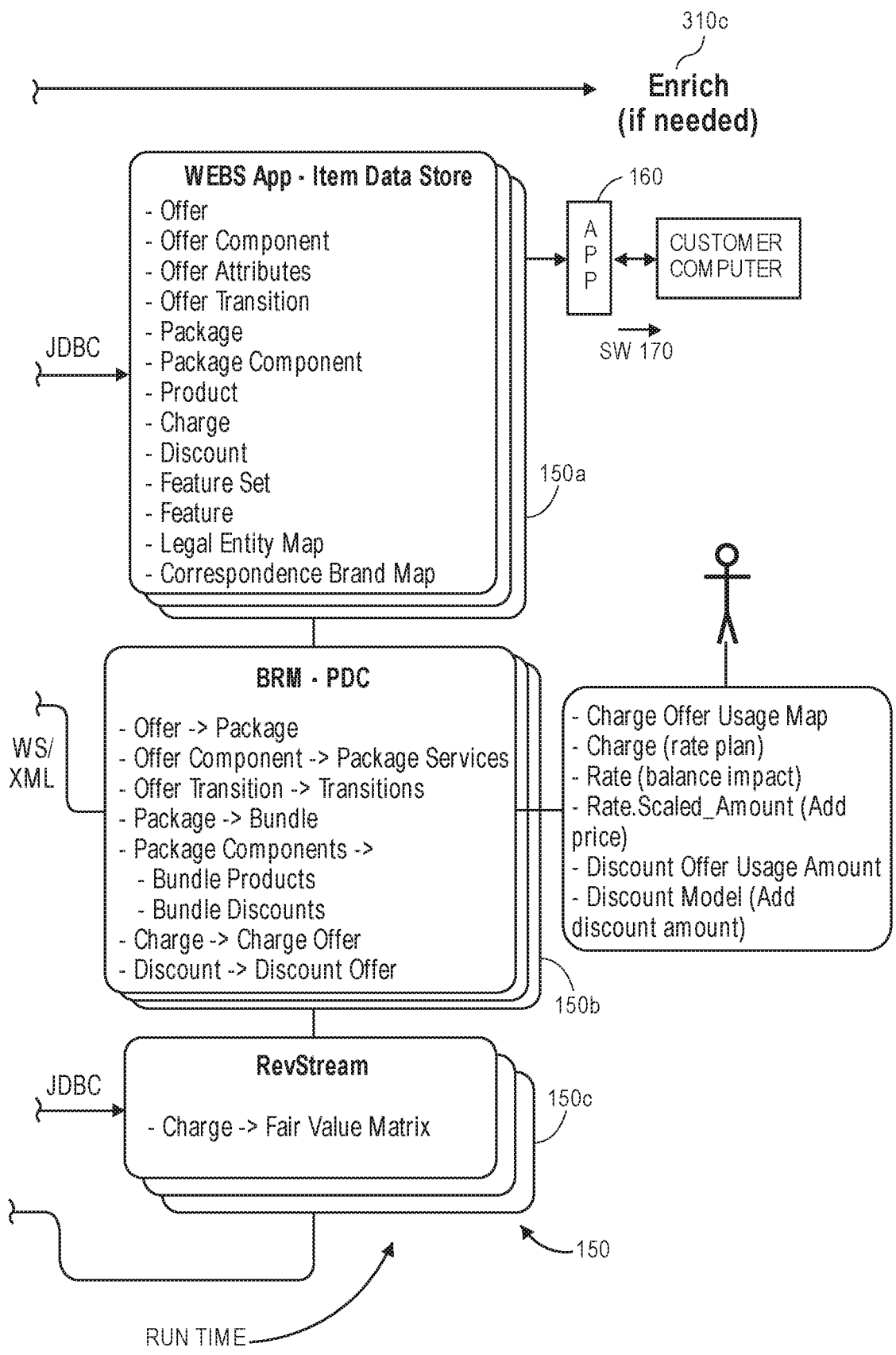
Figure 5B:
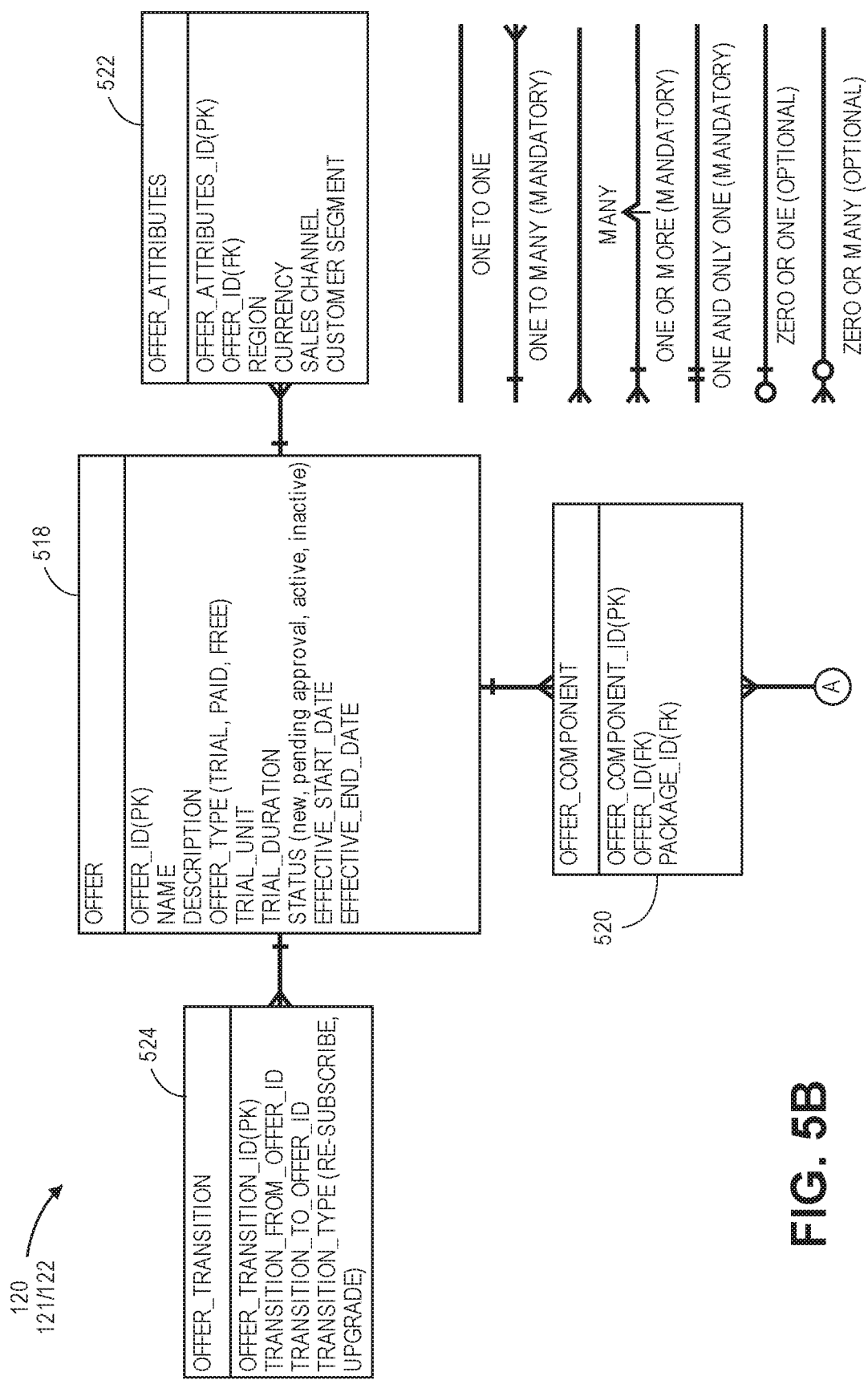
Figure 5C:
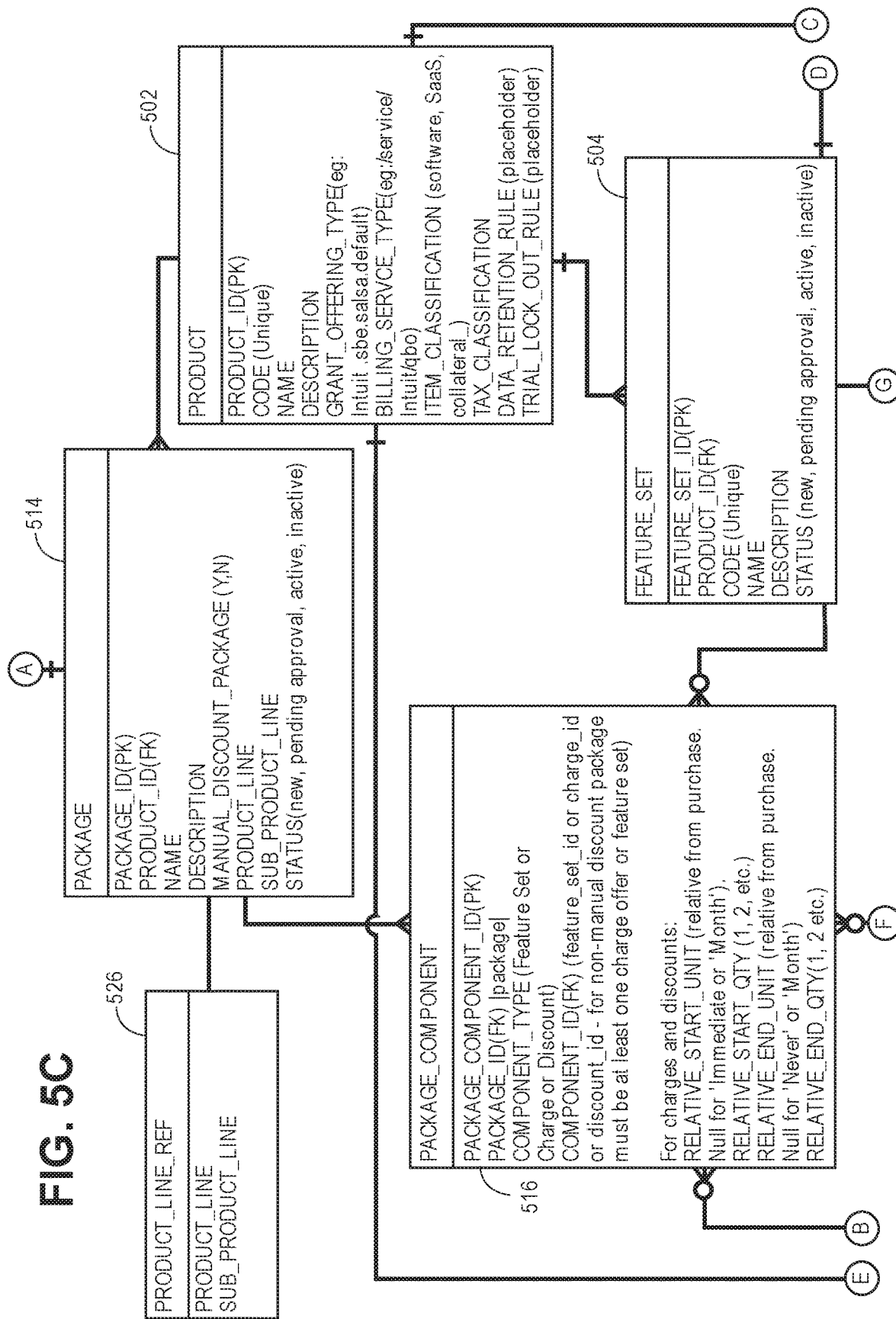
Figure 5D:
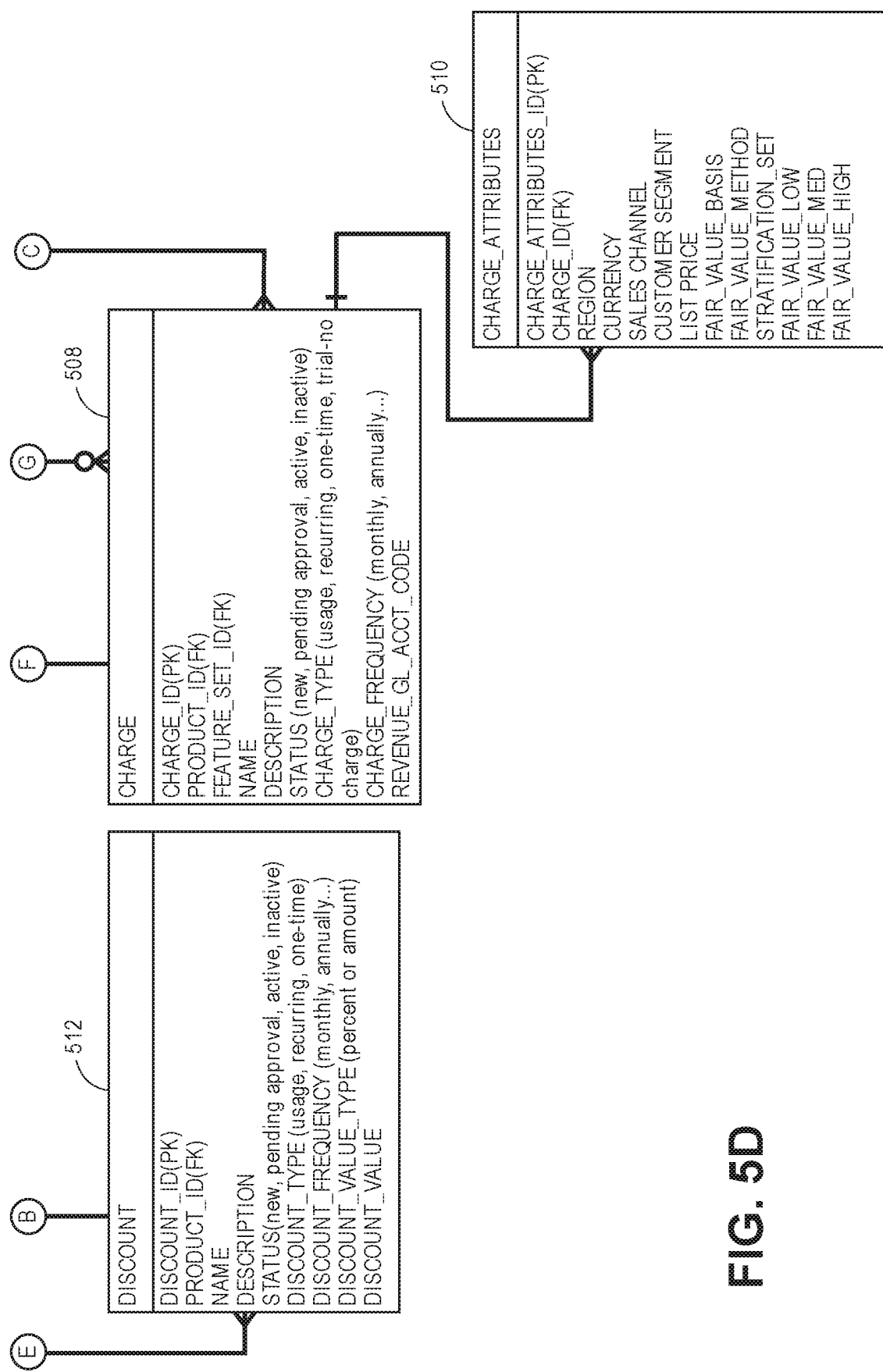
Figure 5E:
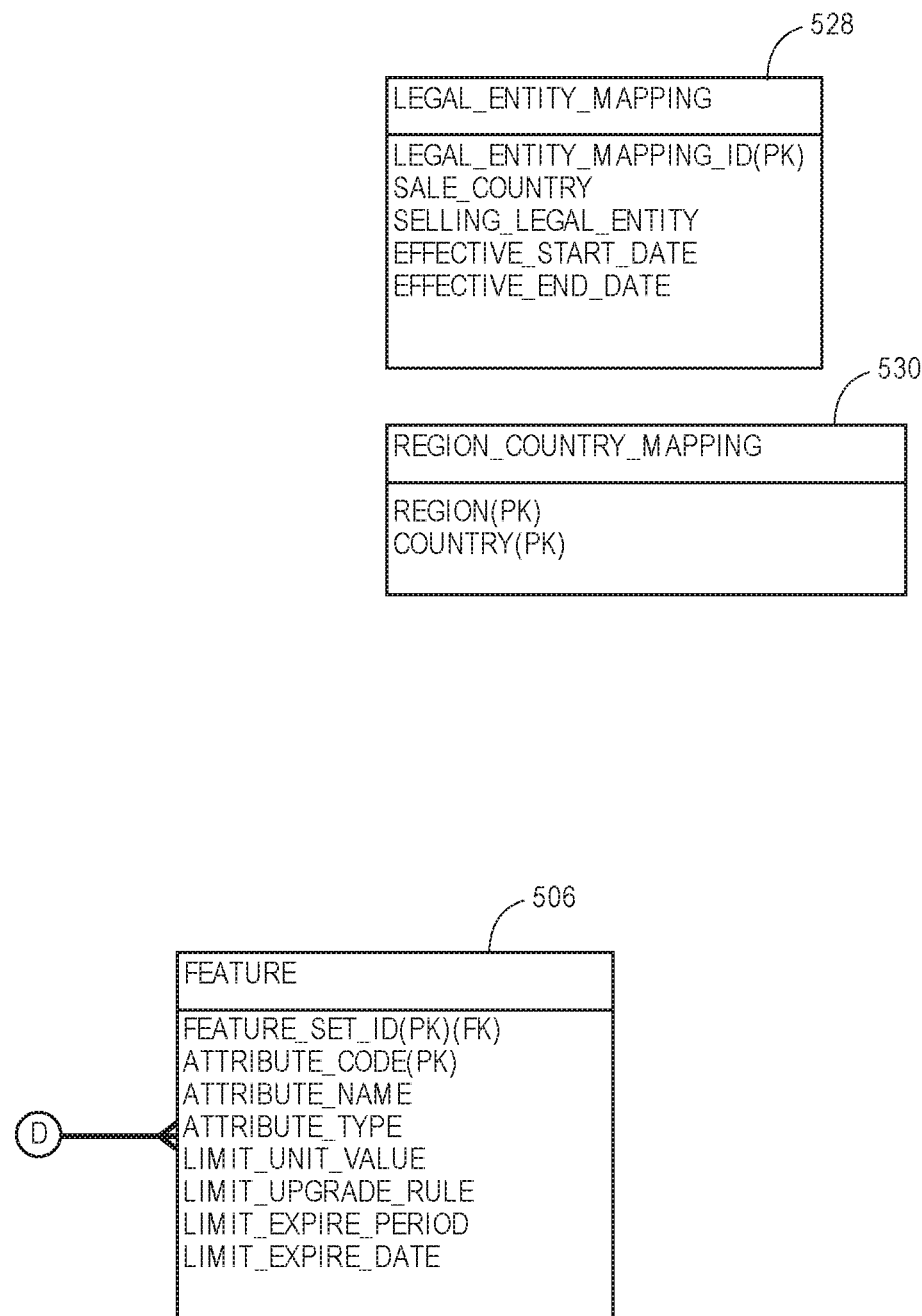

Referring to FIGS. 3A-B, a more detailed system 300 configuration according to one embodiment is illustrated and illustrates the design time "master" central system 310a, also referred to as Item Configuration System (ICS), which hosts the database 110 including the integrated entitlement-monetization model 120 and serves as a "single source of truth." The system 300 also includes an administrative console 315, an administrator user interface 130 for generating or modifying the entitlement-monetization model 120, and a publishing algorithm or system 140, spoke computing systems 150a-c (generally, 150), and a workflow logging module 150 and a reporting module 325 to update the database 110 regarding implemented changes.

In the illustrated embodiment, the database 110, or ICS 310a, is a centralized system for setup and configuration of the entitlement-monetization model 120 (referred to as "item model" in FIG. 3A), and software product 170 management across the item lifecycle, from original definition, modification, pre-production testing/approval, to deployment and use, access or purchase by a customer via the customer-facing application 160. In the illustrated embodiment, the design time ICS system includes the database 110 and UI 130, and workflow, audit/logging 320 and publishing 140/ integration middleware 141, and an administrative console 315.

In the illustrated embodiment, the administrative console 315 defines various administrative protocols such as administrative "roles," "access," "configuration routing," "rules," "formulas," "and publishing environment end points," or, in other words, specifying administrator or host personnel authorized administrative personnel who may access and make changes to the database 110 and entitlement-monetization model 120, modify or specify which model 120 attributes are allowed, and how model publishing via logic or middleware 140/141 is performed. FIG. 3A identifies these personnel as application admin, or "App Admin" and Offer Design Management" (ODM) who are allowed to specify these administrative protocols concerning access to and use of the database 110 and entitlement-monetization model 120 and application data hosted by the database 110.

In FIG. 3A, the workflow/logging module 320 includes workflow tools utilized to guide the change control and approval processes and to manage the item set up process as guided tasks. Audit or logging components 320 are utilized to log changes to software products 170 defined by entitlement-monetization model 120 and published to production, provide an audit trail to meet compliance requirements and to assist in troubleshooting. One example of an application that may be utilized for these purposes of QUICKBASE online database software program. QUICKBASE is a registered trademark of Intuit Inc., Mountain View, Calif.

Also illustrated in FIG. 3A, the ICS 310a provides a user interface (UI) 130 through which users of the ICS 310a can interact with ICS 310a and make modifications to the entitlement-monetization model 120 by creating or configuring various model elements such as product 210, feature set 220 or feature 221 elements, charge elements 230, package elements 240 and offer elements 250 (described in further detail with reference to FIGS. 5A-E). In the illustrated embodiment, this is also implemented by QUICKBASE online database software program.

The UI 130 generated via QUICKBASE online database software program includes data entry forms to create or update model items and for generating and/or presenting data about the entitlement-monetization model 120 and software product 170 deployment or status such as reports, metrics, dashboards and personalized task lists 325 reported back to ICS 310a. The UI 130 in conjunction with workflow components 320, also facilitate the approval and publishing process, as described in further detail below.

Figure 4A:
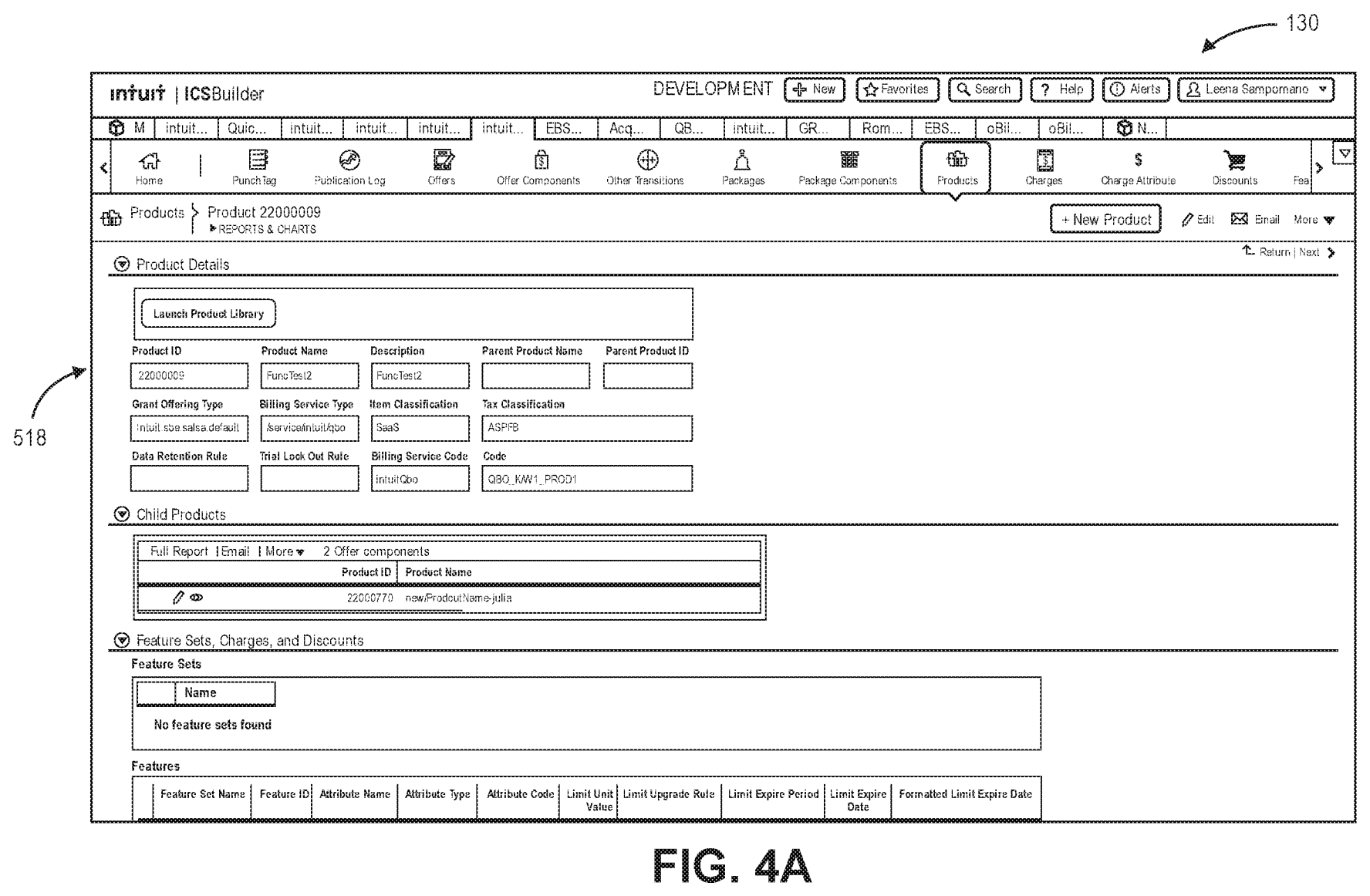
Figure 4B:
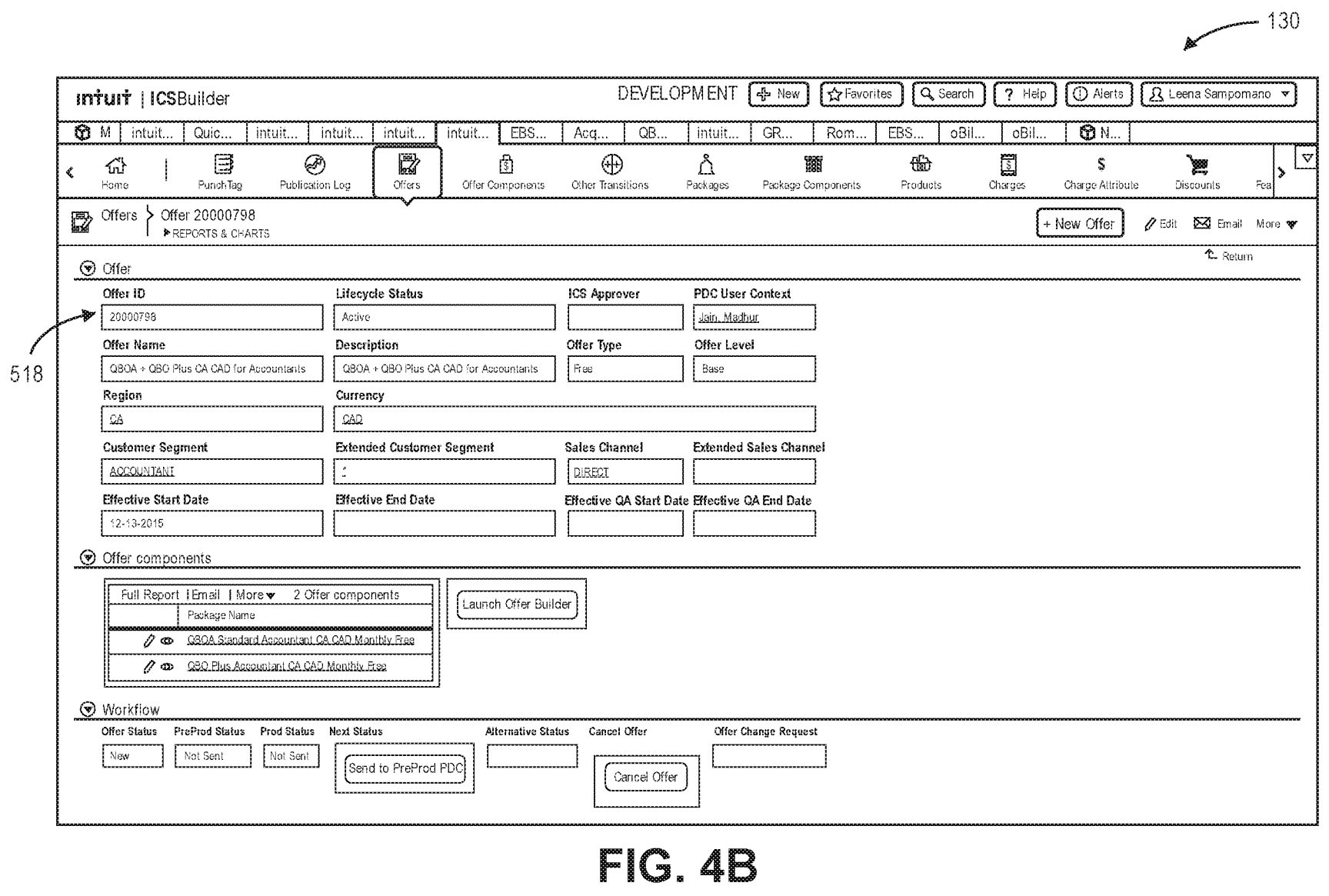

Referring to FIGS. 4A-B, one example of the generated in response to selection of Product 22000009 from the presented list of products, and including fields corresponding to those shown in FIGS. 5 and 6A-B (described in further detail below) that can be populated or modified by an administrator. FIG. 4B illustrates another example of a UI 130 screen generated in response to selection of Offer 20000798 and including fields corresponding to the data model 120 described in further detail with reference to FIGS. 5A-E.

As described in further detail with reference to FIGS. 5A-E, the entitlement-monetization model 120 includes fields for Product element data such as a universal Product ID, Name, Description, Grant offering type, and other fields, which can be selected or entered by the UI 130 by an authorized administrator or Offer Definition Management (ODM) administrator, an authorized person from Finance or Corporate Accounting review (CAR), or other personnel authorized to make decisions about products and product attributes expressed in the entitlement-monetization model 120. A UI screen 130 generated by the ICS system 310a for an Offer element record of the entitlement-monetization model 120 may include fields for Offer record data such as Offer ID, Offer Name, Description, Effective Start Date and Effective End Data.

Referring again to FIGS. 3A-B, the ICS system 310a includes a publication system that includes a publication module or logic 140 and/or associated middleware 141, which is utilized to publish some or all elements of the entitlement-monetization model 120 to spoke computing systems 150, and may do so depending on whether the entitlement-monetization model 120 is in pre-production or has approved to go live for production after approval, testing and validation. One example of a publication or integration platform or middleware 141 that may be utilized for these purposes is the MuleSoft platform available from Intuit Inc. For purposes of publication to spoke computing systems 150, the middleware 141 may utilize various application programming interfaces (APIs) such as Java Database Connectivity (JDBC) API for the JAVA programming language Java (e.g., for communicating with a spoke computing system 150a and to write the entitlement-monetization model 120 to the item data store 110 (e.g., for use as a catalog or item data store) and to data to be utilized in billing to a second spoke computing system 150b (e.g., Billing and Revenue Management (BRM) system, available from Oracle Corporation), and to write charge/fair value matrix data to a REVSTREAM spoke computing system 150c, which is utilized to for revenue compliance, or other interfaces, e.g., depending on whether a spoke computing system 150 is accessed utilizing a different programming language, such as WS/XML as shown in FIG. 3A, in order to communicate with a spoke computing system 150 that may operate a separate application such as BRM/Pricing Development Center (PDC) illustrated in FIG. 3B. It will be understood that other publishing platforms 140/141 and applications may be utilized and spoke computing systems 150 may be accessed utilizing different interface programming languages and that FIG. 3B is provided as one example of how entitlement-monetization model 120 publication to spoke computing systems 150 may be performed.

Having describes aspects of the ICS system 130a and how they are related to each other for design time configuration of an entitlement-monetization model 120, further details regarding one embodiment of an entitlement-monetization model 120 are described with reference to FIGS. 5A-E.

Referring to FIGS. 5A-E, an entitlement-monetization model 120/500 constructed according to one embodiment and that includes entitlement definition elements 121 and monetization definition elements 122 that are integrated into a single entitlement-monetization model 500 and inextricably tied to each other, is illustrated. As illustrated, the entitlement-monetization model 500 includes multiple elements, tables, objects or records (generally, "element")

including those that are only for entitlement definition 121, those that are only for monetization definition 122, and data item elements that include both entitlement and monetization data elements 121, 122.

In the embodiment illustrated in FIGS. 5A-E, a logical representation of the integrated entitlement-monetization data model 500 constructed according to one embodiment includes data item or model elements for product 502, feature set 504, feature 506, charge 508, charge attributes 510, discount 512, package 514, package component 516, offer 518, offer component 520, offer attribute 522, offer transition 524, and other model elements for product line reference 526, legal entity mapping 528 and region country mapping 530.

In the illustrated embodiment, the Product element 502 is associated with, related to, linked to, or cross-referenced with, a Package element 514, a Feature Set element 504, a Discount element 512, and a Charge element 508; the Feature Set element 504 is associated with, related to, linked to or cross-referenced with, the Product element 502, the Package Component element 516, a Feature element 506, and a Charge element 508; the Charge element 508, either directly or as part of a Package 514, is associated with, related to, linked to or cross-referenced with, the Product element 502, the Feature Set element 504, the Package Component element 516, and the Charge Attribute element 510. Further details regarding possible ways data item elements may be structured such that entitlement definitions 121 and monetization definitions 122 are inextricably tied to each other are described in further detail below.

Referring to FIG. 6A, a Product element 502 specifies a base or core software product offering which may be identified, or created, based on the host or administrator identifying the product as satisfying a customer need, or in response to a customer request or feedback. For example, a Product element 502 may be generated for a core product or offering, such as Intuit QUICKBOOKS ONLINE accounting application, or other core software applications including other financial management systems such as payroll applications, and tax return preparation applications, as examples. A Product element 502, configured according to one embodiment, includes fields or attributes:

PRODUCT_ID (PK) (a unique identifier and that serves as a primary key and identifies a core software product or offering), CODE (a unique human readable, non-translatable code for the core Product or Offering (e.g., QBO or QBOP), NAME (product name, such as QUICKBOOKS Online), DESCRIPTION (a more detailed described of the named product (e.g., QuickBooks Online—Cloud Accounting for small business), GRANT_OFFERING_TYPE (references the One Intuit Identity (OII) OFFERING_ID, which is used as the common identification for an offering between the customer-facing or offering application utilized during runtime, and an entitlement provisioning module, or enforcement/access control system, referred to as OII Grant in one implementation (described with reference to FIGS. 16A-C), which generates a response to a customer so that the customer can proceed with using or accessing the requested software product. In other words, the OII Grant module provides for access control, entitlement provisioning to the customer. An example of GRANT_OFFERING_TYPE, for an Offering of QuickBooks Online for Accounts (QBOA), may be Intuit.apd.qboa.

BILLING_SERVICE_TYPE (references a billing spoke computing system type (e.g., service/intuit/qbo))

ITEM_CLASSIFICATION (whether the product identified is software, Software as a Service (SAAS), collateral, etc.

TAX_CLASSIFCATION (which may identify a product class tied to this item (e.g., ASPB) for a tax data management program such as VERTEX tax data management program)

In certain embodiments, a Product element 502 may also include fields or attributes of:

DATA_RETENTION_RULE (rules for determining duration of retention of Product or Offering data and access attributes such as whether customer has read-only access and/or re-subscription rights during that period)

TRIAL_LOCKOUT_RULE (rules for determining a minimum period that a customer that had signed up for a trial needs to wait before the customer can avail of a trial offer on that same service).

FIG. 6B illustrates one example of how a Product element 502 can be populated 610.

Referring to FIG. 7A, a Feature Set element 504 represents a collection of re-usable Feature elements 506 and limits a Product element 502 in terms of functionality, capabilities, access, etc. A Feature Set element 504 configured according to one embodiment includes fields or attributes:

FEATURE_SET_ID (a unique identifier that serves as a primary key to identify a feature set)

PRODUCT_ID (FK) (a unique identifier that is a foreign key and identifies a core software product or offering), CODE (a unique human readable, non-translatable code for the core Product or offering feature set (e.g., QBO_SIMPLE_START), NAME (feature set name, such as QBO Simple Start), DESCRIPTION (feature set description such QUICKBOOKS Online Plus), STATUS (status for the feature set, whether new, pending approval, inactive or active; status can be set to "inactive" if no active charge and no active PACKAGE is referencing this Feature Set).

Thus, as shown above in FIGS. 6A and 7A, the Feature Set element 504 includes a reference to a portion of the Product element 502.

Referring to FIG. 7B, a Feature element 506 defines the feature or limit that is tied to and references a particular Feature Set element 504 and may include fields or attributes:

FEATURE_SET_ID (FK) (PK) (a unique identifier that serves as a foreign key or reference to identify a feature set that feature attributes define)

ATTRIBUTE_CODE (PK) (unique (within a Feature Set 504) human readable, non-translatable code for the core Product or offering feature set (e.g., QBO_SIMPLE_START), ATTRIBUTE_TYPE (defines a type of attribute, which may be, for example, Feature Value, Pre-paid Consumable Resource Limit, Concurrent Resource Limit, Identified Resource Limit, and/or an attribute related to a capability or functionality of the Product)

ATTRIBUTE_NAME (defines the attribute name that applies; for Feature Value attribute types, the actual feature name such as Simple Start" may be utilized by OII Grant Feature; for limit attribute types, the ATTRIBUTE_NAME defines the unit to which the limit applies such as "individual returns," "business returns," "#users," "#employees," "GB of storage" and will be used by OII Grant Limit as the LIMIT_TYPE)

LIMIT_UNIT_VALUE (for "Sign-up" or "Buy now" the LIMIT_UNIT_VALUE indicates the initial unit value or wheat does the customer receive in terms of unites when an Entitled Offering is first established. For upgrades, the LIMIT_UPGRADE RULE drives how to apply LIMIT_UNIT_VALUE to the Entitled Offering)

LIMIT_UPGRADE_RULE (in cases involving an upgrade, the LIMIT UPGRADE RULE indicates whether the unit value associated with the Entitled Offering is replaced with the LIMIT_UNIT_VALUE, or whether LIMIT_UNIT_VALUE is to be added to the unit value)

LIMIT_EXPIRE_PERIOD (if applicable, this refers to the time interval that applies to the limit, and generally would apply to a pre-paid consumable limit. LOV: per month, per year, for example)

LIMIT_EXPIRE_DTE (if applicable, this refers to a hard expiration date/time that applies to the limit for all users; generally, applies to pre-paid consumable resource limit).

Figure 7C:
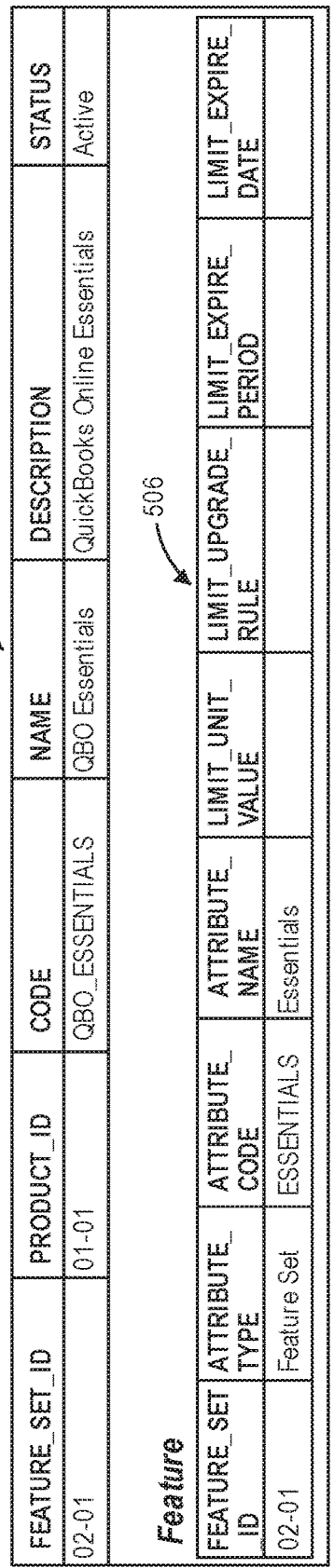
Figure 7D:
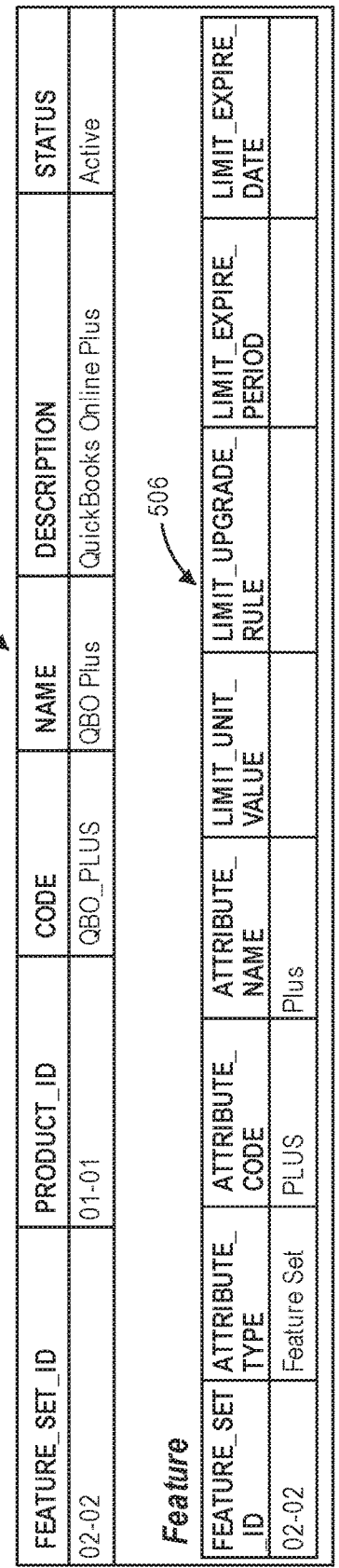

Examples of how a Feature Set element 504 and a Feature element 506 may be populated are illustrated in FIGS. 7C-D. FIG. 7C illustrates an example of how respective Feature Set and Feature elements 504, 506 are populated for QBO Essentials, and FIG. 7D illustrates an example of how respective Feature Set and Feature elements 504, 506 are populated for QBO Plus.

Referring to FIG. 8A, a Charge element 508 represents a re-usable monetization of a Feature Set element 504 (i.e., for a specific price for a currency or different regional price within a currency per charge type and charge frequency, such as QBO Plus USD monthly recurring price for Brazil vs. QBO Plus USD monthly recurring price for all other countries in the rest of the world (ROW)). A Charge element 508 configured according to one embodiment includes fields or attributes:

CHARGE_ID (PK) (a unique identifier that serves as a primary key or reference to identify a charge)

PRODUCT_ID (FK) (a unique identifier that is a foreign key and identifies a core software product or offering)

FEATURE_SET_ID (FK) (a unique identifier that serves as a foreign key or reference to identify a Feature Set element 504 that is monetized by a Charge element 508. This reference may be utilized to support a charge for a purchase that does not result in an entitlement)

NAME (charge name displayed on transactional correspondence)

DESCRIPTION (description of charge)

STATUS (status of the charge (e.g., new, pending approval, inactive, active). Status can be set as "inactive" if there is no active Package element 514 that references the Charge element 508)

CHARGE_TYPE (specifying the type of charge such as on-time, recurring, usage (or trial (no charge)—once a trial is moved out of the BRM spoke computing system 150b; charges of this type will not be published to BRM spoke computing system 150b in embodiments involving enrichment)

CHARGE_FREQUENCY (applicable to "recurring" charges and specifies the frequencies such as monthly, quarterly or annual charge)

REVENUE_GL_ACCT_CODE (GL account used for tracking (deferred) revenue

Referring to FIG. 8B, a Charge Attribute element 510 allows for specification of price terms and eligibility for price terms. A Charge Attribute element 510 configured according to one embodiment may specify a price and fair value for a set of pricing attributes such as Region, Country, Currency, Customer Segment, Sales Channel and may include fields or attributes:

CHARGE_ATTRIBUTE_ID (PK) (a unique identifier that serves as a primary key or reference to a charge attribute)

CHARGE_ID (FK) (a unique identifier that serves as a foreign key or reference to identify a charge for which the Charge Attribute element 510 map defines eligibility attributes (e.g., based on Region, Customer Segment)

REGION (a continent, country or other region, such as Europe, Canada, rest of world (ROW), to which a Charge Attribute element 510 applies CURRENCY (a currency code such as USD, HKD, etc.)

CUSTOMER_SEGMENT (a pre-defined customer segment or category of users, such as "accountant" or "business' or 'individual"; "default" may represent a case in which a customer segmentation has not been specified)

SALES_CHANNEL (a sales channel such as "direct" or "retail")

LIST_PRICE (specifies a list price that applies to a specific set of pricing attributes, and in embodiments involving enrichment of a billing spoke computing system 150b, the actual price may be set as part of a charge offer enrichment in the billing spoke computing system 150b rather than by a list price)

FAIR_VALUE_BASIS (specifies the revenue recognition basis such as Vendor Specified Objective Evidence (VSOE) or Best Estimated Selling Price (BESP)

FAIR_VALUE_METHOD (specifies the actual method used by a revenue recognition application executed by a spoke computing system 150c (such as REVSTREAM revenue recognition system).

STRATIFICATION_SET (a rule set utilized by a revenue recognition application executed by a spoke computing system 150c for complex allocation based on select transaction values)

FAIR_VALUE_LOW (specifies a low point of a Fair Value for the specified price point FAIR_VALUE_MED (specifies a medium point of Fair Value for the specified price point)

FAIR_VALUE_HIGH (specifies a high point of Fair Value for the specified price point)

Figure 8F:
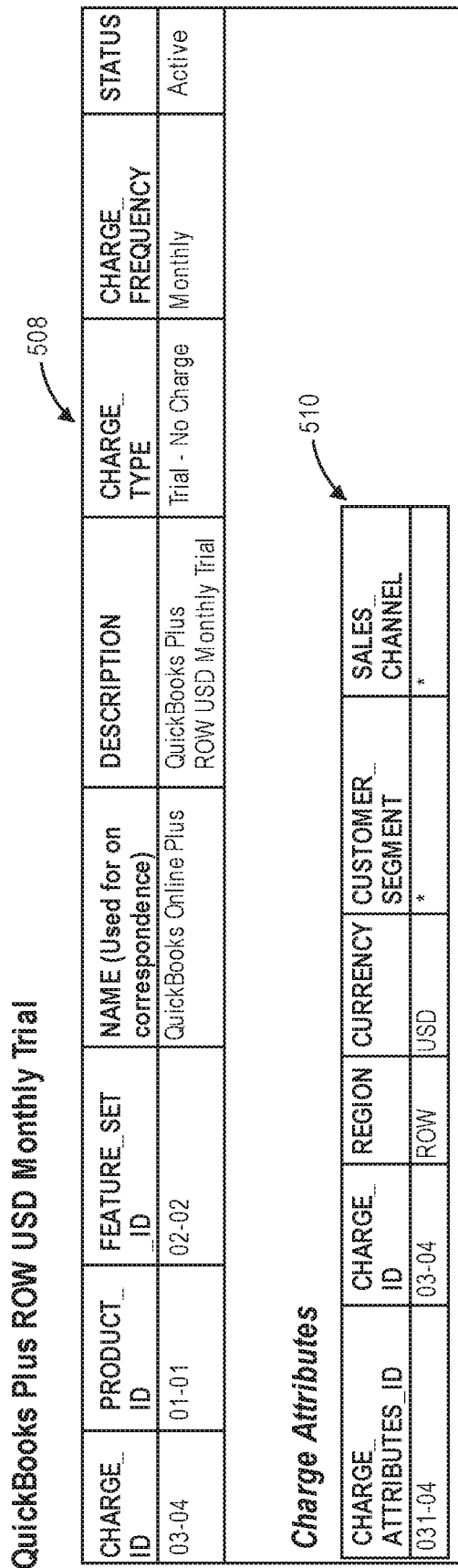

Examples of how Charge/Charge Attribute elements 508, 510 may be populated are illustrated in FIGS. 8C-F. FIG. 8C illustrates examples of populated Charge/Charge attribute elements 508, 510 for QBO Essentials, Rest of World (ROW), U.S. Dollar (USD), and Monthly charges. FIG. 8D illustrates examples of populated Charge/Charge attribute elements for QBO Essentials, Rest of World (ROW), U.S. Dollar (USD), and rather than a Monthly charge as shown in FIG. 8C, this example involves a monthly trial. FIG. 8E illustrates examples of populated Charge/Charge attribute elements 508, 510 for QBO Plus (rather than a Feature Set element 504 for "Essentials"), Rest of World (ROW), U.S. Dollar (USD), and Monthly Charge, and FIG. 8F illustrates an example similar to that shown in FIG. 8E except that this example involves a monthly trial.

Thus, as shown in the logical representation of an entitlement-monetization model 500 in FIGS. 5A-E and FIGS. 8A-F, the Charge/Charge Attribute elements 508, 510 can be used to specify monetization in the form of price data and eligibility for that price data, together with PRODUCT_ID and FEATURE_SET cross references (in the logical representation with separate CHARGE and CHARGE ATTRIBUTE elements 508, 510).

Figure 9A:
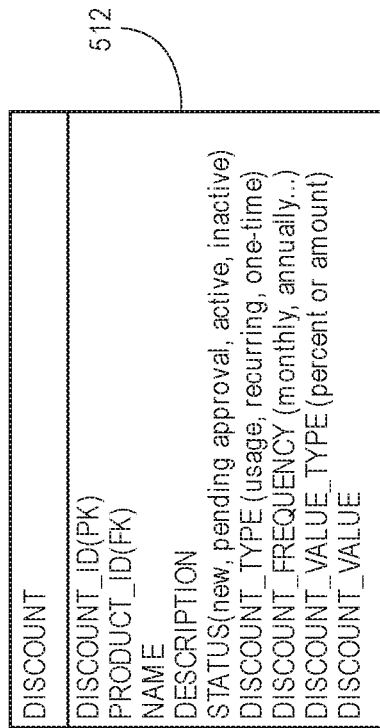
FIGS. 9A-B illustrate a "Discount" element of the embodiment of the entitlement-monetization model shown in FIGS. 5A-E, and how an example of how the "Discount" element may be populated.

Referring to FIG. 9A, a Discount record 512 represents a re-useable discount that may be applied to a charge and may include the following fields or attributes:

DISCOUNT_ID (PK) (a unique identifier that serves as a primary key or reference to a discount)

PRODUCT_ID (FK) (a unique identifier that is a foreign key and identifies a core software product or offering)

NAME (discount name)

DESCRIPTION (description of a discount)

STATUS (a discount status such as "New," "Pending Approval," "Inactive," and "Active," and in the case that no active Package is referencing the discount, the status can be set to inactive)

DISCOUNT_TYPE (type of discount such as "One-Time," "Recurring," "Usage.' A discount of a certain type applies to a Charge of the same type)

DISCOUNT_FREQUENCY (if applicable, in cases involving recurring discounts, a discount frequency may be, for example, monthly, quarterly or annual)

DISCOUNT_VALUE_TYPE (specifies discount in the form of a discount percentage or discount amount DISCOUNT_VALUE (a value of the discount)

Figure 9B:
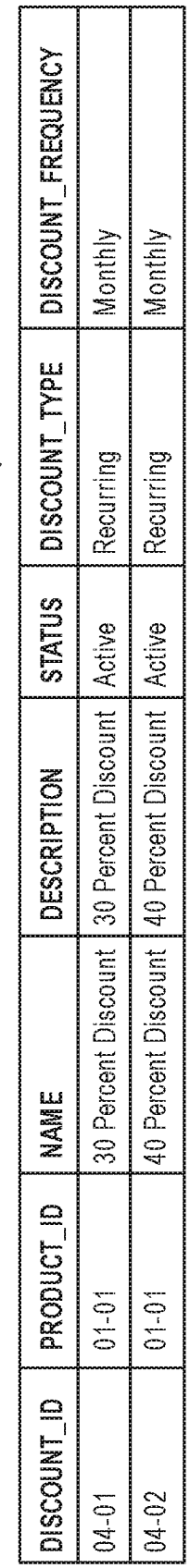

FIG. 9B illustrates one example of a populated Discount element 512 involving different Discount elements for the same Product (01-01).

Referring to FIG. 10A, a Package element 514 represents a re-useable data structure for a specific Product element 502 that includes one or more Feature Set elements 504 or Feature elements 506 and one or more Charge elements 508 or Charge Attribute elements 510 that are tied to respective one or more Feature Set element 504 and, if applicable, any Discount elements 512 to be applied to those Charge elements 508 as noted above. A Package element 514 represents a service bundle packaged within an Offer element 518 for which a customer signs-up to ensure that the customer is entitled to and charged correctly with any applicable discount applied. A "non-concession" Package element 514 includes either a feature set element 504 or a charge—if a charge that references a feature set, then the non-concession package also includes the referenced feature se 504. A "concession" Package 514 includes discounts only.

As shown in FIG. 10A, a Package element 514 configured according to one embodiment includes fields or attributes including:

PACKAGE_ID (PK) (a unique identifier that serves as a primary key or reference to a package)

PRODUCT_ID (FK) (a unique identifier that is a foreign key and identifies a core software product)

NAME (package name)

DESCRIPTION (package description)

PRODUCT_LINE (for reporting purpose)

MANUAL_DISCOUNT_PACKAGE (If set (Y), it marks this package as available to the agent for applying manual discounts. If set (Y), this package CANNOT include a charge or feature set. If set (Y), this package CANNOT be included in an Offer.

SUB_PRODUCT_LINE (for reporting purpose)

STATUS (The Package status (new, pending approval, inactive, active). The status can be set to 'inactive' if no active Offer is referencing this Package.)

A Package Component record 516, which is related or linked to a Discount Record 512, Charge Record 508 and Feature Set Record 504, provides for re-use of Feature Set elements 504, Charge elements 508 and Discount elements 512 across different Package elements 514 and allows for defining how a certain component is utilized in the context of a specific Package element 514. For these purposes, a Package Component element 516 configured according to one embodiment includes fields or attributes including:

PACKAGE_COMPONENT_ID (PK) (a unique identifier that serves as a primary key to identify a Package Component)

PACKAGE_ID (FK) (a unique identifier that serves as a foreign key or reference to a Package for which the Package Component is specified)

COMPONNENT_TYPE (indicates whether a Package Component is Feature Set, a Charge or a Discount)

COMPONENT_ID (FK) (a unique identifier that serves as a foreign key to identify a Feature Set (Feature Set ID), a Charge (Charge ID), or a Discount (Discount ID). In the case of a non-manual Discount package, or a Package included in an Offer, there is at least one Charge or Feature Set. Manual Discount Packages include only discounts.)

RELATIVE_START_UNIT (indicator of whether the Component, when purchased, is effective immediately, or whether the Component is a unit interval from purchase. For example, when the Charge for a one-month trial starts immediately upon purchase). No value in this field indicates "immediate" by default or other pre-determined default such as "month," etc.)

RELATIVE_START_QTY (If Relative_Start_Unit is populated then, this indicates the number of unit offset from purchase (e.g., if unit is set to 'Month', then quantity set to "1" indicates 'relative start is one month from purchase'.)

RELATIVE_END_UNIT (Indicates whether the Component, when purchased, is effective forever (never ends), or whether the Component ends at some unit interval from purchase (e.g., Trial Charge ends one month after purchase). No value in this field indicates 'Never' or some other pre-determined default)

RELATIVE_END_QTY (indicates number of unit offset from purchase. Thus, if unit is "Month" then quantity is set to "1" to indicate "relative end is one month from purchase")

Examples of how a Package element 514 and a Package Component element 516 may be configured according to embodiments are illustrated in FIGS. 10C-H. FIG. 10C illustrates an example of how Package and Package Component elements 514, 516 may be populated for QBO Essentials, for Rest of World (ROW), U.S. Dollar (USD), Monthly Charge for a Base Edition. FIG. 10D illustrates an example of how Package and Package Component elements 514, 516 may be populated for QBO Essentials, for Rest of World (ROW), U.S. Dollar (USD), but for one month. FIG. 10E illustrates an example of how Package and Package Component elements 514, 516 may be populated for QBO Essentials, for Rest of World (ROW), U.S. Dollar (USD), for Monthly Charge, and for a "Buy Now" options while offering a 30% discount for a 12 month purchase. FIG. 10F illustrates examples of how Package and Package Component elements 514, 516 may be populated for a different Feature Set element for QBO Plus, for Rest of World (ROW), U.S. Dollar (USD), for a Base Edition. FIG. 10G illustrate an example of how Package and Package Component records may be populated for QBO Plus, for Rest of World (ROW), U.S. Dollar (USD), but for one month, and FIG. 10H illustrates an example of how Package and Package Component elements 514, 516 may be populated for QBO Plus, for Rest of World (ROW), U.S. Dollar (USD), for Monthly Charge, and for a "Buy Now" options while offering a 30% discount for a 12 month purchase.

Referring to FIG. 11A, an Offer element 518 represents a bundle that is presented and provided to the customer. A single Offer may involve a single product or bundle multiple products into a single offer. An Offer element 518 configured according to one embodiment includes fields or attributes:

OFFER_ID (PK) (a unique identifier that serves as a primary key to identify an Offer)

OFFER_TYPE (identifies a type of offer, such as "Trial" or "Paid" offer)

NAME (an Offer Name)

DESCRIPTION (an Offer description)

TRIAL_UNIT (indicates a unit of a trial, such as "Day," "Week" or "Month")

TRIAL_DURATION (indicates a trial duration, such as 1 week, 1 month, 2 months, etc.)

STATUS (indicates the status of an Offer, such as "New," "Pending Approval" (e.g., approval by accounting or finance of the host or administrator), "Inactive" or "Active"). Active and Current offers are eligible for purchase by a customer).

EFFECTIVE_START_DATE

EFFECTIVE_END_DATE

Referring to FIG. 11B, an Offer Component element 520 provides for re-usability of Package elements across different Offer elements 518. An Offer Component element 520 configured according to one embodiment includes fields or attributes:

ID (PK) (a unique identifier that serves as a primary key to identify an Offer Component)

OFFER_ID (FK) (a unique identifier that serves as a foreign key to identify an Offer)

PACKAGE_ID (FK) (a unique identifier that serves as a foreign key to identify the Package that is referenced by the Offer tied to the Offer Component)

Referring to FIG. 11C, an Offer Attribute element 522 allows for specifying a set of five attribute values (Region, Country, Currency, Customer Segment & Sales Channel) that determine eligibility for an Offer 520. The logical data model allows for the same offer to support multiple rows, (due to decision to have a flat implementation). An Offer Attribute element 522 configured according to one embodiment includes fields or attributes:

ID (PK) (a unique identifier that serves as a primary key to identify an Offer Attribute)

OFFER_ID (FK) (a unique identifier that serves as a foreign key to identify an Offer for which Offer Attributes define eligibility)

REGION (identifies a region such as Europe, Rest Of World (ROW), or other country or pre-defined region)

CURRENCY (ISO Currency code (e.g., USD, HKD, etc.)

CUSTOMER_SEGMENT (identifies a pre-determined segment such as "Accountant," and "Default" may apply if a Customer Segment has not been specified)

SALES_CHANNEL (identifies a sales channel such as "Direct" or "Retail" sales channel)

Referring to FIG. 11D, an Offer Transition element 524 defines target Offer elements 518 to which a customer can transition or "upgrade" to from a currently active offer or Product element 502. An Offer Transition element 524 configured according to one embodiment includes fields or attributes:

OFFER_TRANSITION_ID (PK) (a unique identifier that serves as a primary key to identify an Offer Transition)

TRANSITION_FROM_OFFER_ID (identifies the current or active product or offer from which a transition is to be implemented)

TRANSITION_TO_OFFER_ID (identifies a product or offer to which a transition from the current or active product is to be implemented)

TRANSITION_TYPE (specifies a type of transition such as "Upgrade" or "Re-Subscribe")

FIGS. 11E-J illustrate examples of how Offer, Offer Component, Offer Attribute and Offer Transition elements 518, 520, 522, 524 may be populated for different Packages/Feature Se elements 514, 504. FIG. 11E illustrates an example involving population of Offer, Offer Component, Offer Attribute and Offer Transition elements 518, 520, 522, 524 for QBO "Essentials," Row ("Rest Of World"), USD (payment in U.S. dollar currency), and a base offer with a monthly payment. FIG. 11F illustrates an example involving population of Offer, Offer Component, Offer Attribute and Offer Transition elements 518, 520, 522, 524 for QBO "Essentials," Row ("Rest Of World"), USD (payment in U.S. dollar currency), and rather than a base offer with a monthly payment, a 1 month trial offer (as reflected in Offer (Trial_Unit=Month). FIG. 11G illustrates an example involving population of Offer, Offer Component, Offer Attribute and Offer Transition elements 518, 520, 522, 524 for QBO "Essentials," Row ("Rest Of World"), USD (payment in U.S. dollar currency), and rather than a base offer with a monthly payment or a one-month trial offer, this example involves a monthly charge for a "Buy Now" option (as reflected in Offer (Trial_Unit=Month), e.g., as referenced in the Name and Description of the Offer record 518. FIG. 11H illustrates an example involving a different Package/Feature Set of QBO "Plus" rather than QBO "Essentials" and involves population of Offer, Offer Component, Offer Attribute and Offer Transition elements for QBO "Essentials," Row ("Rest Of World"), USD (payment in U.S. dollar currency), and a based offer for a monthly charge. FIG. 11I illustrates an example involving a different Package/Feature Set of QBO "Plus" rather than QBO "Essentials" and involves population of Offer, Offer Component, Offer Attribute and Offer Transition elements for QBO "Essentials," Row ("Rest Of World"), USD (payment in U.S. dollar currency) for a one-month trial offer, rather than a base offer for a monthly charge, and FIG. 11J illustrates an example for QBO Essentials, ROW, USD, and including a 40% discount for a 12 month purchase.

Referring again to FIGS. 5A-E, in the illustrated embodiment, the entitlement-monetization model 500 also includes a Product Line Reference element 526 that may be utilized to define Product Line and Sub-Product Line categories for reporting purposes. Attributes of a Product Line Reference record include:

PRODUCT_LINE (which provides for user defined values representing a product line)

SUB_PRODUCT_LINE (utilized to define values representing sub-product line under a product line)

Further, in the illustrated embodiment, the entitlement-monetization model also includes a Legal Entity Mapping record 528 enables the item data store spoke computing system 150c (also referred to as WEBS App), to determine the selling Intuit Legal Entity based on the country of sale.

The sales transaction (order) and account are stamped with this Legal Entity. Once determined, the Legal Entity is used for future processing such as Cybersource Merchant ID derivation, stamped on BRM customer Account, for determining the company segment of GLID, and tax calculation, sent to Correspondence system for branding etc.).

This element supports date effectivities to enable changing the Selling Legal Entity for a sale country over time, if required (e.g., Sales from Australia are funneled into Intuit SG, until a Intuit Australia is established and functionality required to support moving Australia sales into the new Legal Entity is implemented at which point the old mapping record can be end-dated and a new one created). Attributes of a Legal Entity Mapping record may include:

LEGAL_ENTITY_MAPPING_ID (PK) (a unique identifier and that serves as a primary key and identifies a legal entity mapping)

SALE_COUNTRY (PK) (identifies an ISO country code)

LEGAL_ENTITY (identifies an Intuit Legal Entity that is a selling party (e.g., SG—Intuit Singapore)

EFFECTIVE_START_DATE

EFFECTIVE_END-DATE

In the illustrated embodiment, the entitlement-monetization model 500 also includes a Region to Country Mapping element 530 that provides for defining the countries that fall within a pricing region. The 'Region' offer/charge attribute provides a way to set a single price point/offer for a group of countries. Attributes of a Region to Country Mapping element may include:

REGION (PK) (a continent, country or other region, such as Europe, Canada, rest of world (ROW), to which a charge attribute record applies)

COUNTRY (PK) (ISO country code)

Referring to FIGS. 12A-C, and referring again to FIGS. 1 and 2A-C, having described how an entitlement-monetization model 500 may be configured to integrate entitlement definitions 121 and monetization definitions 122 into a single, integrated entitlement-monetization model 500, system flow diagrams of FIGS. 12A-C illustrate how the entitlement-monetization model 500 may be utilized to generate different Package elements 514 and Offer elements 518 for a base offer, a discount offer and a trial offer.

Figure 12A:
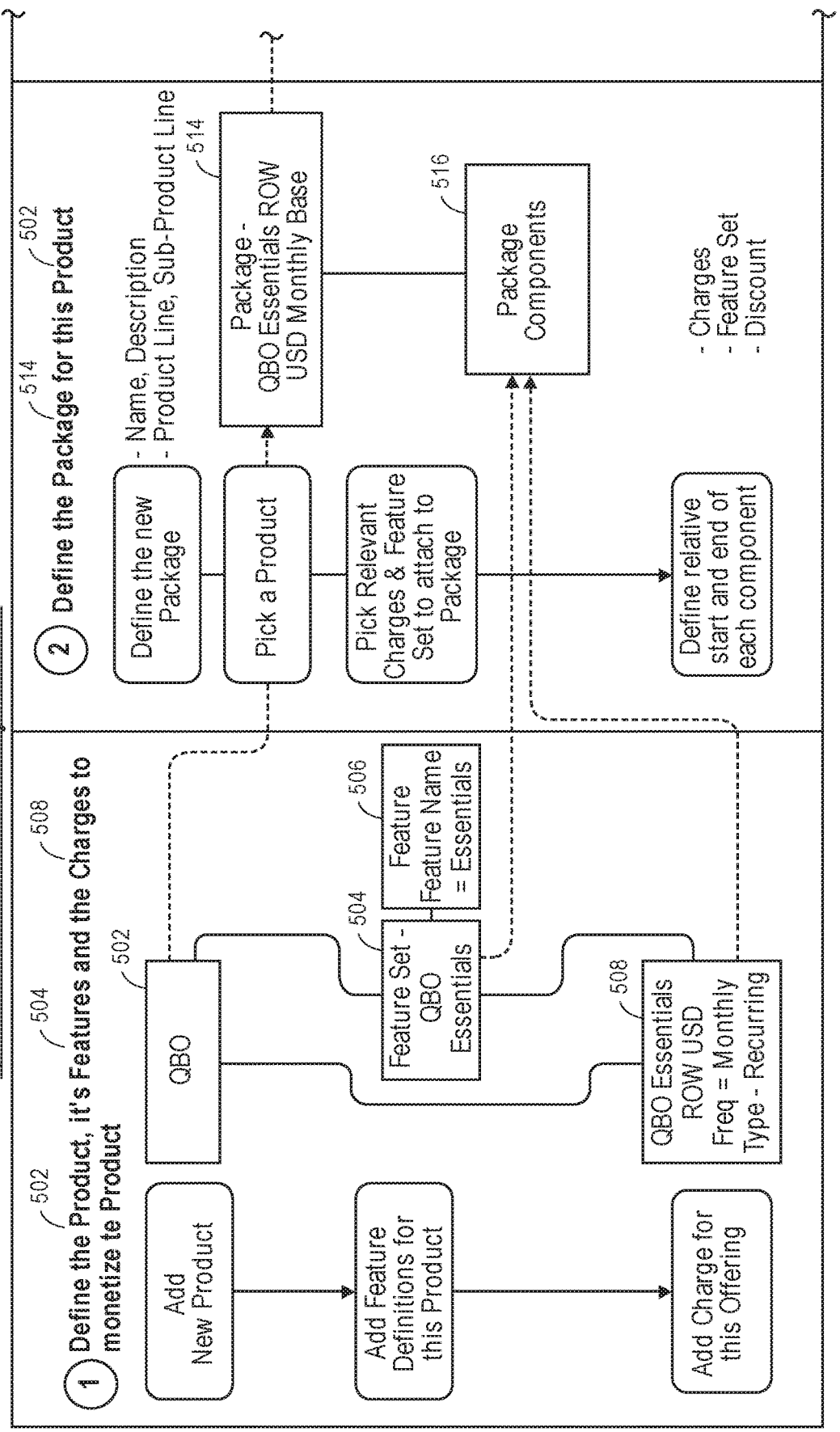
FIGS. 12A-F are respective system flow diagrams of different use cases in which a the entitlement-monetization model shown in FIGS. 5A-E is used to define a product, features and charges to monetize the product, define a package for the product, and create an offer, for different cases involving a base monthly charge offer, a discount, and a trial offer.

FIG. 12A is a system flow diagram that illustrates how the entitlement-monetization model 500 is used to define a product (QBO) via Product element 502, the Feature elements 506 or Feature Set element 504 for QBO (e.g. "Essentials" and Charge or Charge Attributes 510 (e.g., Rest of World, USD, Monthly Recurring charge). The Feature Set element 504 and the Charge/Charge Attributes elements 508, 510 are integrated into a Package element 514 which, as described above, enable re-usability of Feature Set elements 504, Charge elements 508 and Discount elements 512 across different Package elements 514. These are used to define a Package element 514 which, in the illustrated example, is for QBO, Essentials, Rest of World (ROW), charges in U.S. Dollars (USD), monthly, base. This Package element 514 is utilized to generate an Offer element 518 that includes specific offer terms applicable to the Package element 514 (e.g., including effective dates, offer type) with corresponding Offer Attribute elements 522 and an Offer Transition element 524 (if applicable).

Figure 12B:
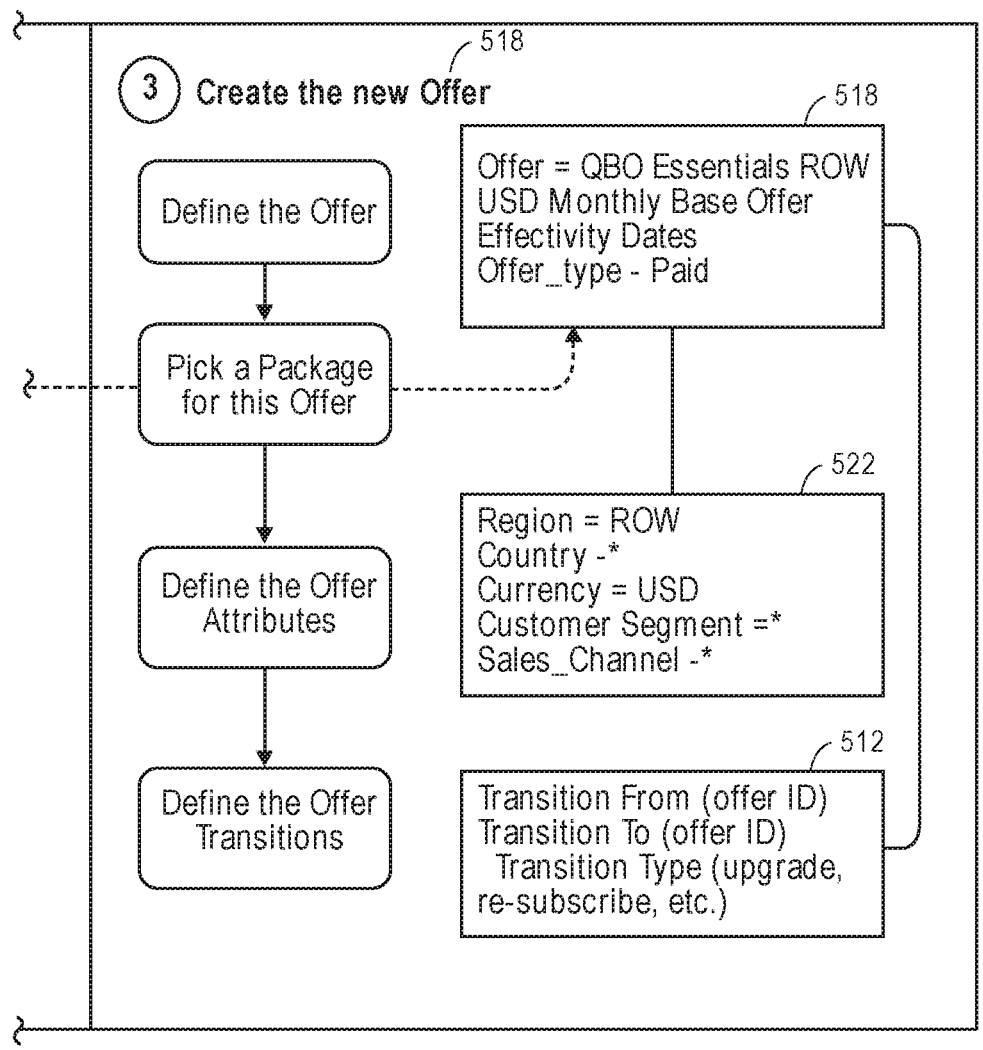

FIG. 12B is a system flow diagram that includes definitions discussed with reference to FIG. 12A above (including Product: QBO, Feature Set: Essentials, Charge: ROW, USD, Monthly, Recurring), and further integrates a Discount element 512 (30% recurring monthly discount) into a second or different Package 514. Thus, FIG. 12B further illustrates the "modular" nature and re-usability of elements of an entitlement-monetization model 500, e.g., re-use of Product 502, Charge 508 and Feature Set 504 data model 500 elements. A second or different Offer element 518 based on the second Package element 514 (which embodies the Discount element 512) and including specific offer terms applicable to the Package element 514 is generated.

Figure 12C:
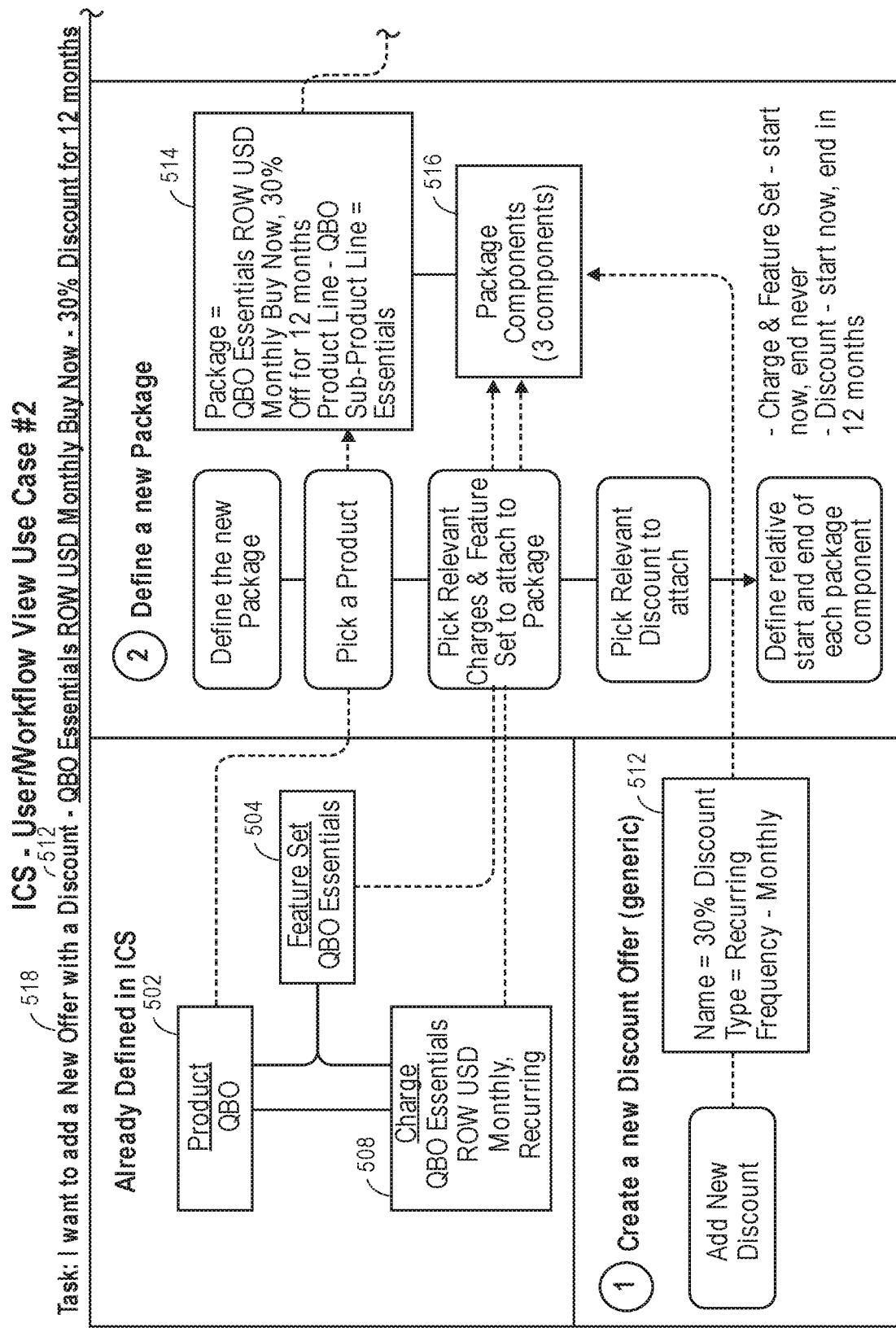
Figure 12D:
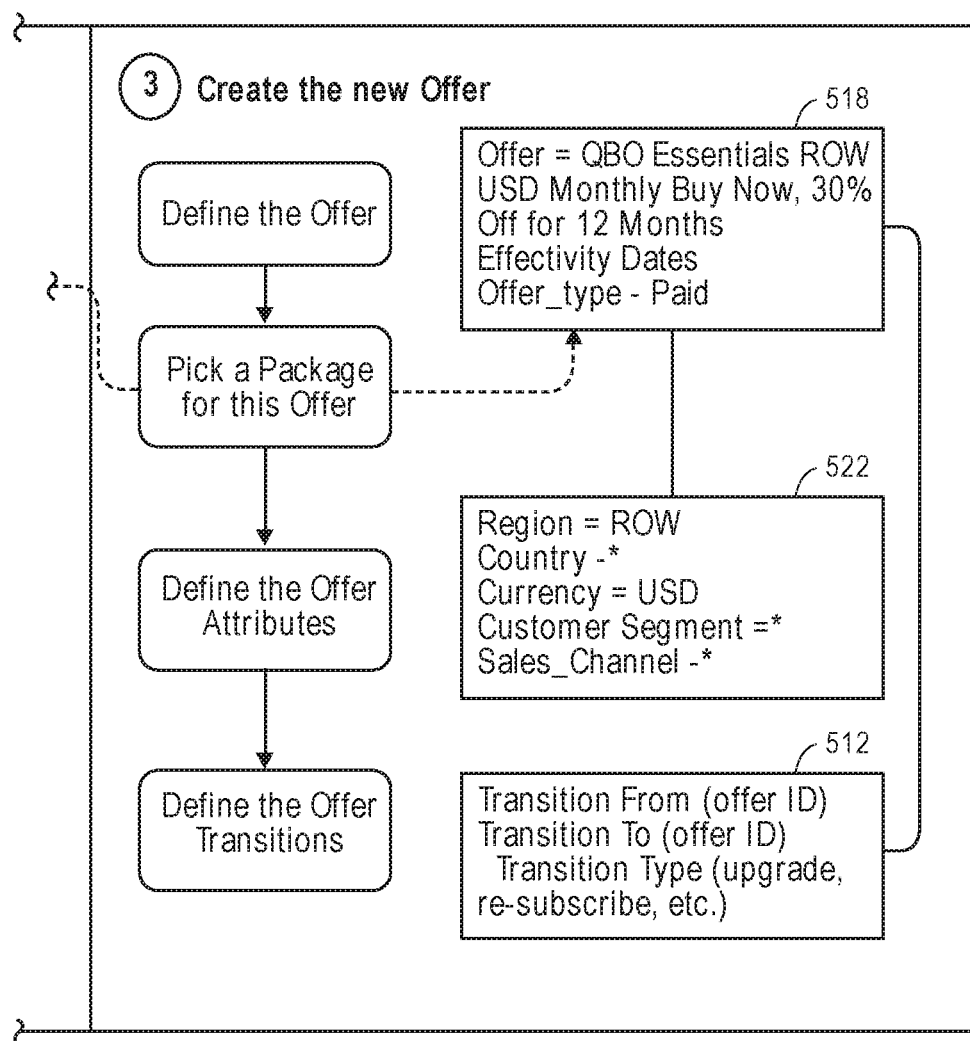
Figure 12E:
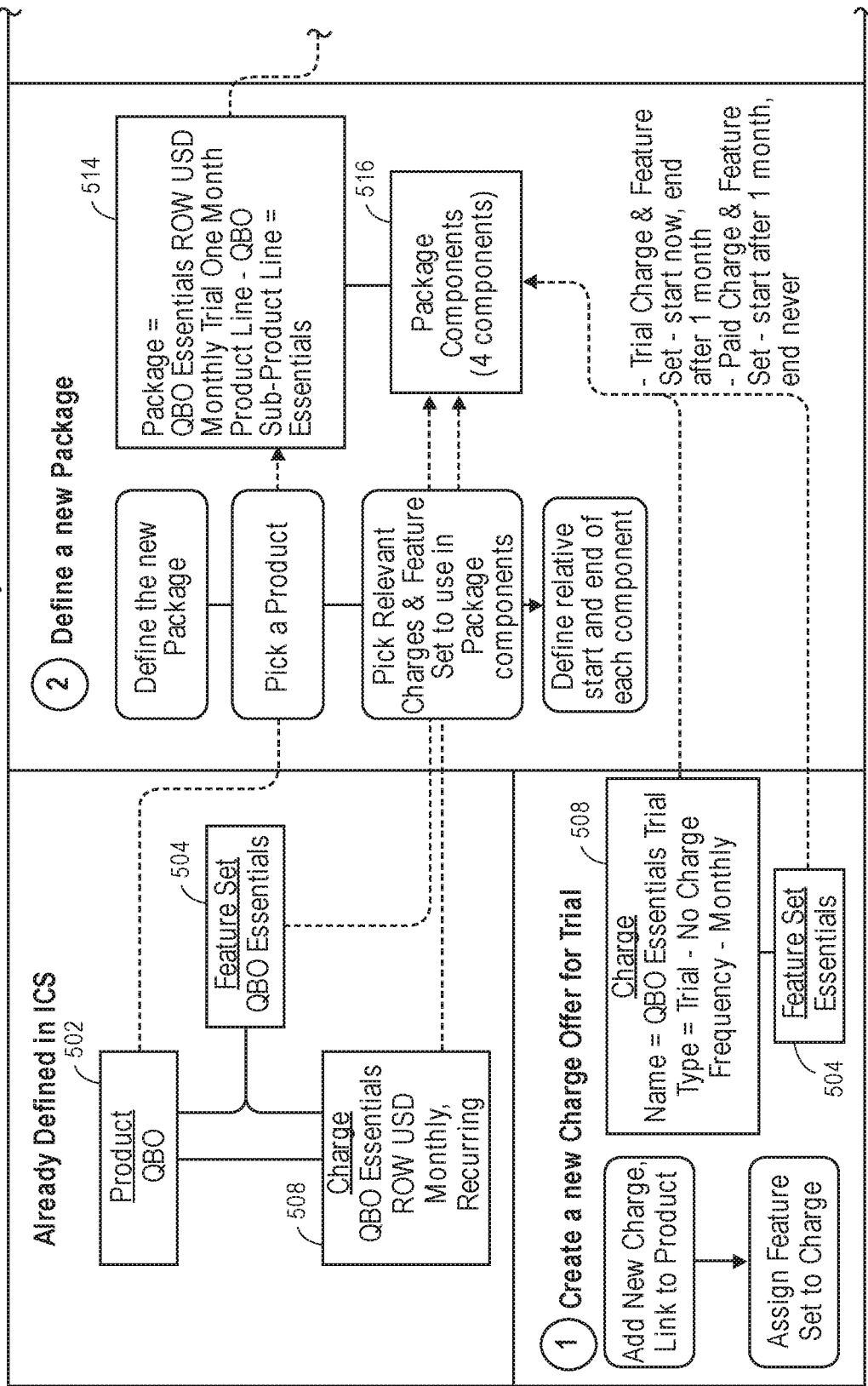
Figure 12F:
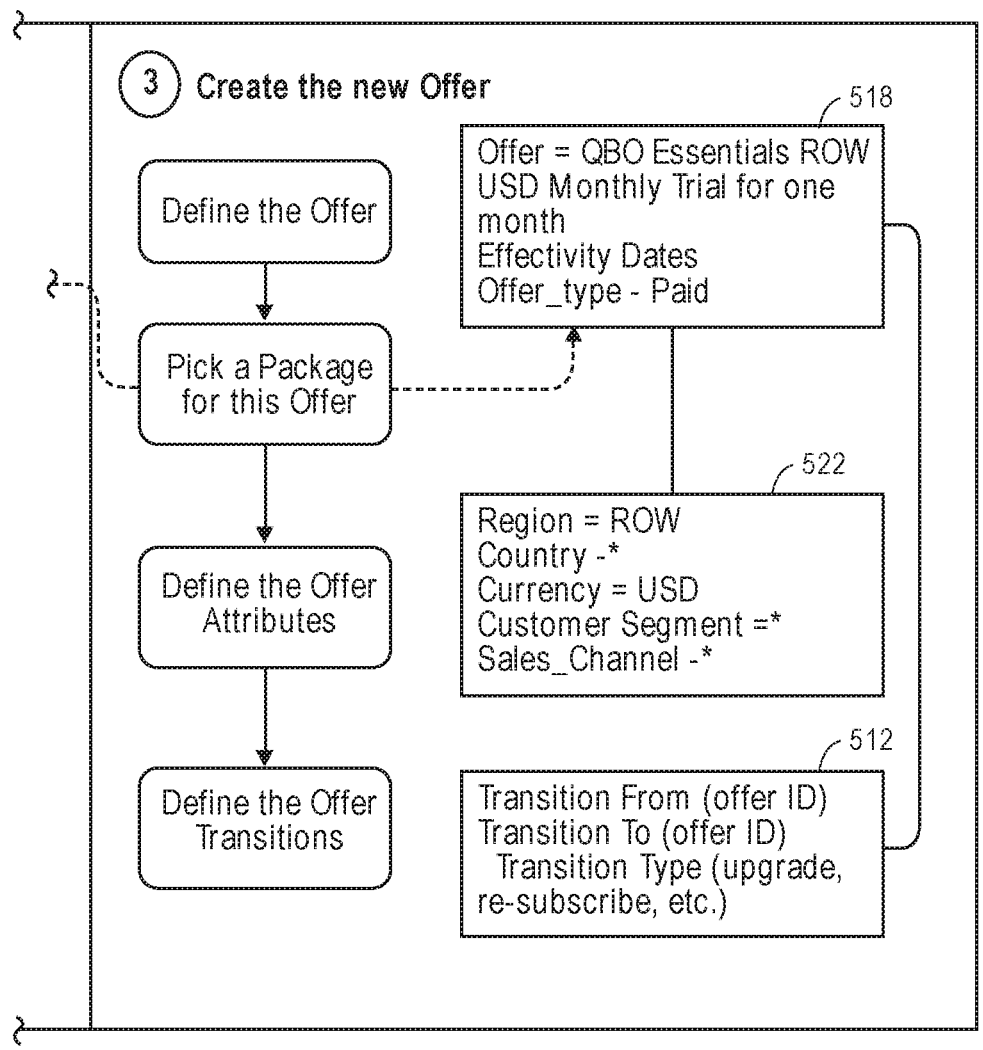

FIG. 12C is yet another system flow diagram that illustrates another example of implementation of embodiments and includes definitions discussed with reference to FIG. 12A above (including Product: QBO, Feature Set: Essentials, Charge: ROW, USD, Monthly, Recurring), and further integrates a no-charge trial Offer element 518 into a different Feature Set element 504 and Package element 514. Thus, FIG. 12B further illustrates the "modular" nature and re-usability of elements of an entitlement-monetization model 500, e.g., re-use of Product 502, Charge 508 and Feature Set 504 model 500 elements. A third or different Offer element 504 based on the third Package element 514 (which embodies the trial offer) and including specific offer terms applicable to the package is generated.

Referring again to FIGS. 1 and 3A-B, after the entitlement-monetization model 500 has been generated as described above, the publishing system/middleware 140/141 is utilized to publish the entitlement-monetization data model 500, or a portion thereof (500p, "p" referring to "portion") to runtime spoke computing systems 150a-c, which are utilized for runtime processing (as distinguished from deign time model 500 configuration and definition).

As described above, spoke computing system 150a-c include a first spoke computing system 150a that that interfaces with a customer facing application 160, a second spoke computing system 150b that is a billing spoke computing system and a third spoke computing system 150c that is a revenue recognition or revenue management spoke computing system.

In one implementation, all of the entitlement-monetization model 500 elements are published to the first spoke computing system 150a, also referred to as a catalog, item data store, or WEBS Items Data store, which supports interactions with the customer computer 180 via the customer-facing application 160 and other spoke computing systems 150. According to one embodiment, no subsequent mapping, enrichment or other modification is required for publication to the first spoke computing system 150a.

The second or billing spoke computing system 150b (identified as BRM/PDC) supports Package, Bundle, Discount and Charge Offer element configurations, and these item definitions of the entitlement-monetization model 500 are published to the billing spoke computing system 150b, and mapped and enriched as necessary. For example, terms of the of the entitlement-monetization model 500 may be mapped to terms utilized by the billing application (e.g., BRM/PDC) hosted by the second spoke computing system 150b, or certain types of data may be added to the entitlement-monetization model 500 data, e.g., for interfacing with a billing application of the spoke computing system 150b that is a separate or independent billing application that utilizes different types or data or data identifiers compared to the entitlement-monetization model, or that may not include all of the data required to implement certain billing functions performed by the second spoke computing system 150b. For example, in one embodiment, the ICS system 310a is integrated with an off-the-shelf billing application BRM/PDC that operates using a terms or data structures, in this example, and with further reference to mapping/enrichment 1300 table shown in FIG. 13, certain terms of the entitlement-monetization model 500 are converted or mapped to other terms that can be processed by the billing application (reflected in column 1302).

Figure 13:
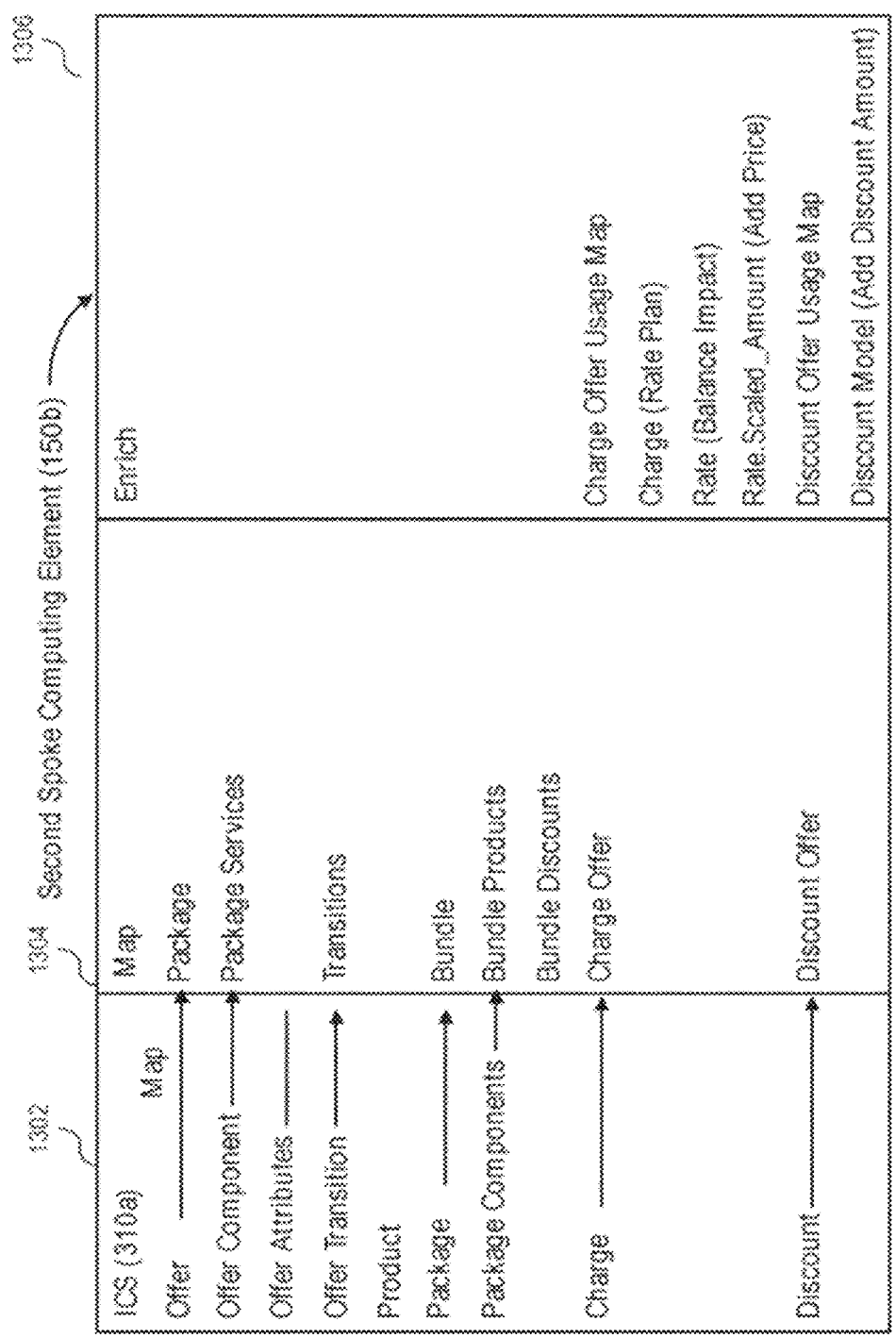
FIG. 13 is a table illustrating how publishing of all or selected elements of the entitlement-monetization model to spoke computing systems may involve mapping of model terms to spoke computing terms or enriching the model data with additional data for use by a spoke computing system, such as enrichment of charge and discount data for use billing spoke computing system.
Figure 15A:
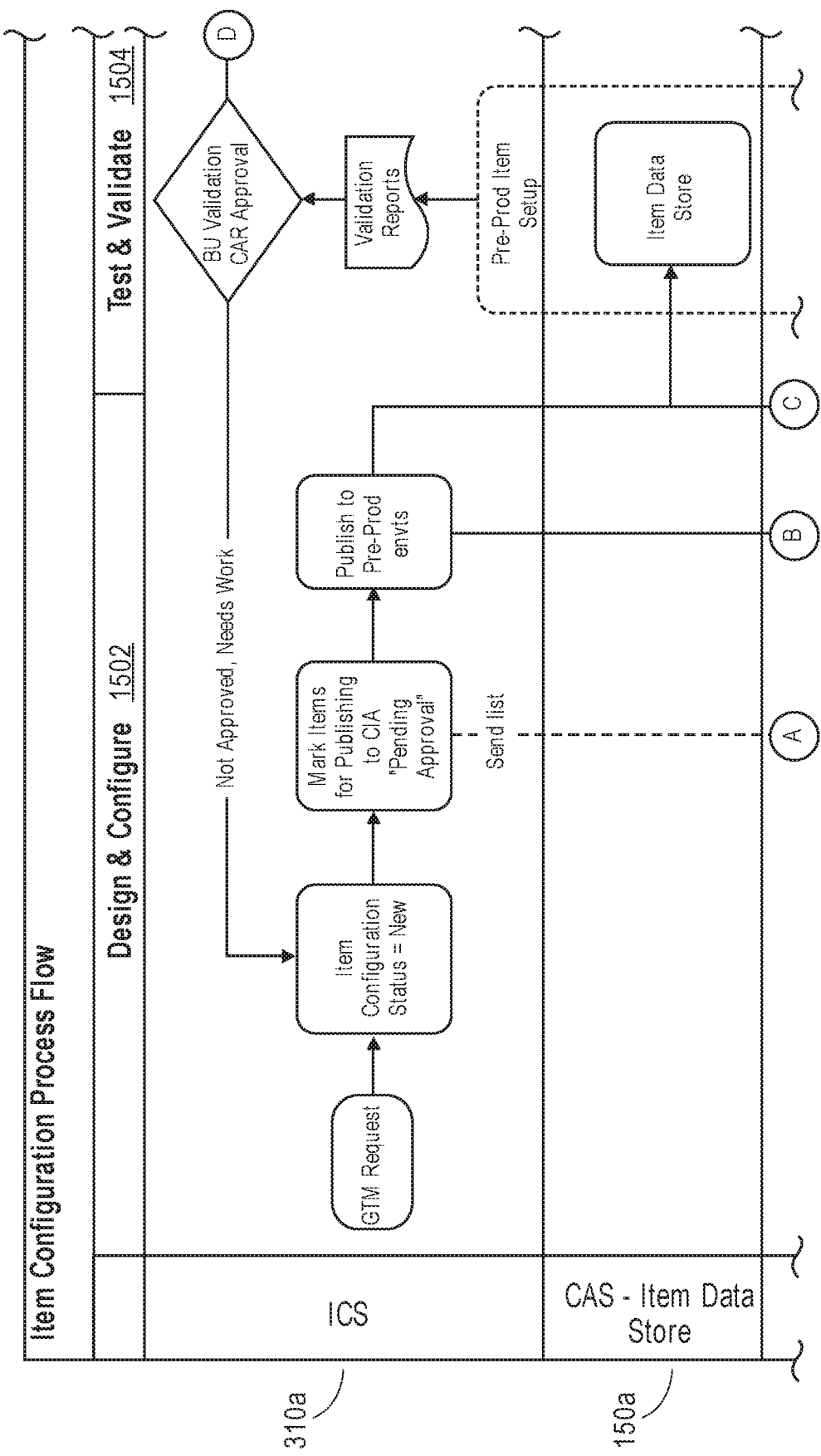
Figure 15B:
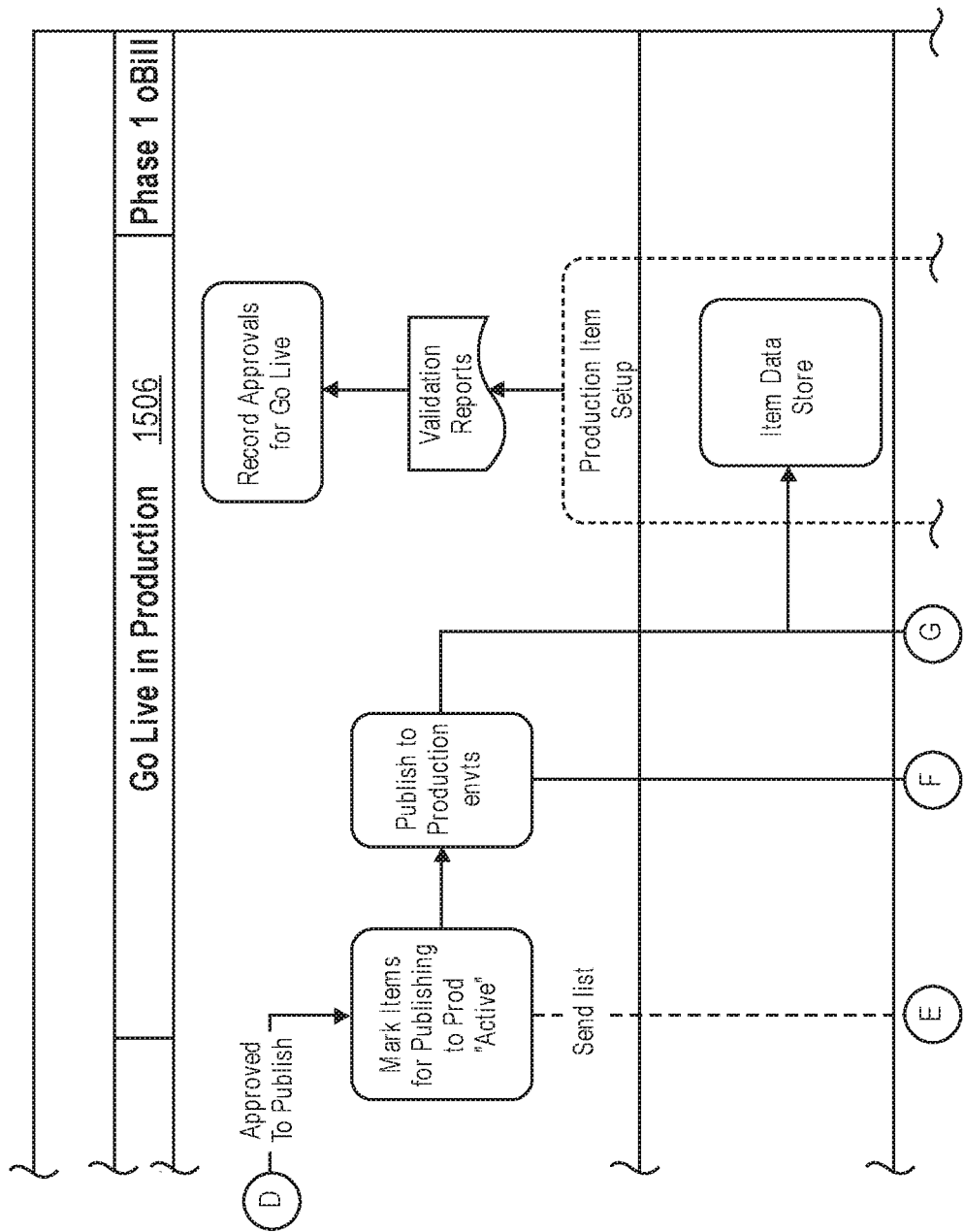

For example, as shown in columns 1302, 1304 of FIG. 13, "Offer" of the entitlement-monetization model 500 is converted to "Package" such that data of a populated "Offer" element 518 (e.g., as discussed with reference to FIG. 11A), corresponds to "Package" data in the billing application of the spoke computing system 150b. As another example, "Package" of the entitlement-monetization model 500 is converted to "Bundle" such that data of a populated "Package" element 514 corresponds to "Bundle" data in the billing application of the spoke computing system 150b. It will be understood that FIG. 13 illustrates one example of how mapping may be performed, and that whether such mapping is necessary depends in part upon how the ICS system 310b and spoke computing system 150b interface with each other. Thus, mapping may not be required depending on the system configuration and which billing application is utilized by the second spoke computing system 150b.

Further, as shown in column 1306 of FIG. 13, in certain embodiments involving a separate or independent billing application as illustrated, it may be necessary to "enrich" the entitlement-monetization model 500 data by adding or providing certain types of data that are necessary for various billing functions performed by the second spoke computing system 150b. Enrichment may involve, for example, enriching a Charge element 508, e.g., by adding more specific charge element data such as "charge offer usage map," "rate plan, "balance impact," as shown in FIG. 13 and/or adding more specific discount element 512 data such as "discount offer usage map" and details about a "discount model' as shown in FIG. 13. It will be understood that enrichment may not be required depending on the billing application utilized and that data of one or more model 500 elements, or different model elements 500, may be enriched depending on the spoke computing system 150b configuration.

Referring to FIG. 14, in the illustrated embodiment, the third spoke computing system 150c, which executes a revenue recognition application, such as REVSTREAM revenue recognition application, is utilized to determine how to process or recognize revenue resulting from customer payments for use, access or purchase of the software product 170 configured according to the entitlement-monetization model 500. For these purposes, the third spoke computing system 150c receives Charge data, e.g., in the Charge_Attribute element 510 (which includes fields or attributes of FAIR_VALUE_BASIS, FAIR_VALUE_METHOD, FAIR_VALUE_LOW, FAIR_VALUE_MED, AND FAIR_VALUE_HIGH) such that data for each valid currency and data needed for the Fair Value matrix table for Revenue recognition or revenue management are received, and this data is used to determine how to process the received revenue, e.g., how to handle revenue received from a customer one month in advance. As shown in FIG. 14, fields or attributes of the entitlement-monetization model 500, identified in the first column 1402, are mapped to for use by REVSTREAM (as shown in the second column 1404). It will be understood that mapping may or may not be required depending on how the third spoke computing system is configured, and other mapping methods may be utilized if mapping is performed.

Referring to FIGS. 15A-D, the entitlement-monetization model 500, as discussed above, may be utilized for generating offers reflected in Offer elements 518 for configured software products 170, which may be done in response to a "Go To Market" request by a host, or in response to a customer request. Before being activated or released for live production, the configured software product 170 may have to go through a review/approval processing and testing and validation. For example, these stages of software product 170 configuration, testing and validation, and production are indicated by "Design and "Configure," 1502 "Test and validate" 1504 and "Go Live in Production" 1506 stages.

As discussed above, the entitlement-monetization model 500 is generated or configured, and publishing logic publishes the model 500 or portions thereof to spoke computing systems 150, which, as discussed above, may involve a spoke item data store or catalog element 150a that is also used for customer interface, a billing system 150b, and a revenue recognition system 150c, and other spoke computing systems 150 that may be utilized (such as a marketing pages 1510 as shown in FIG. 15C). This pre-production software product configuration is tested, and if not approved by an administrator/host or otherwise validated at 1504, the flow returns back to "design and configure" 1502, else the software product configured as expressed in the entitlement-monetization model 500 that has been tested and validated can proceed to be activated to go live in production at 1606, and similar publishing to spoke computing systems 150 is performed again for production, and a customer can interface with the customer facing application 160 to access the Webs App or item data store/catalog 150a to browse generated offers 518 and select a software product/feature set to purchase, access or use—this runtime flow is further summarized in FIGS. 16A-C.

Figure 16A:
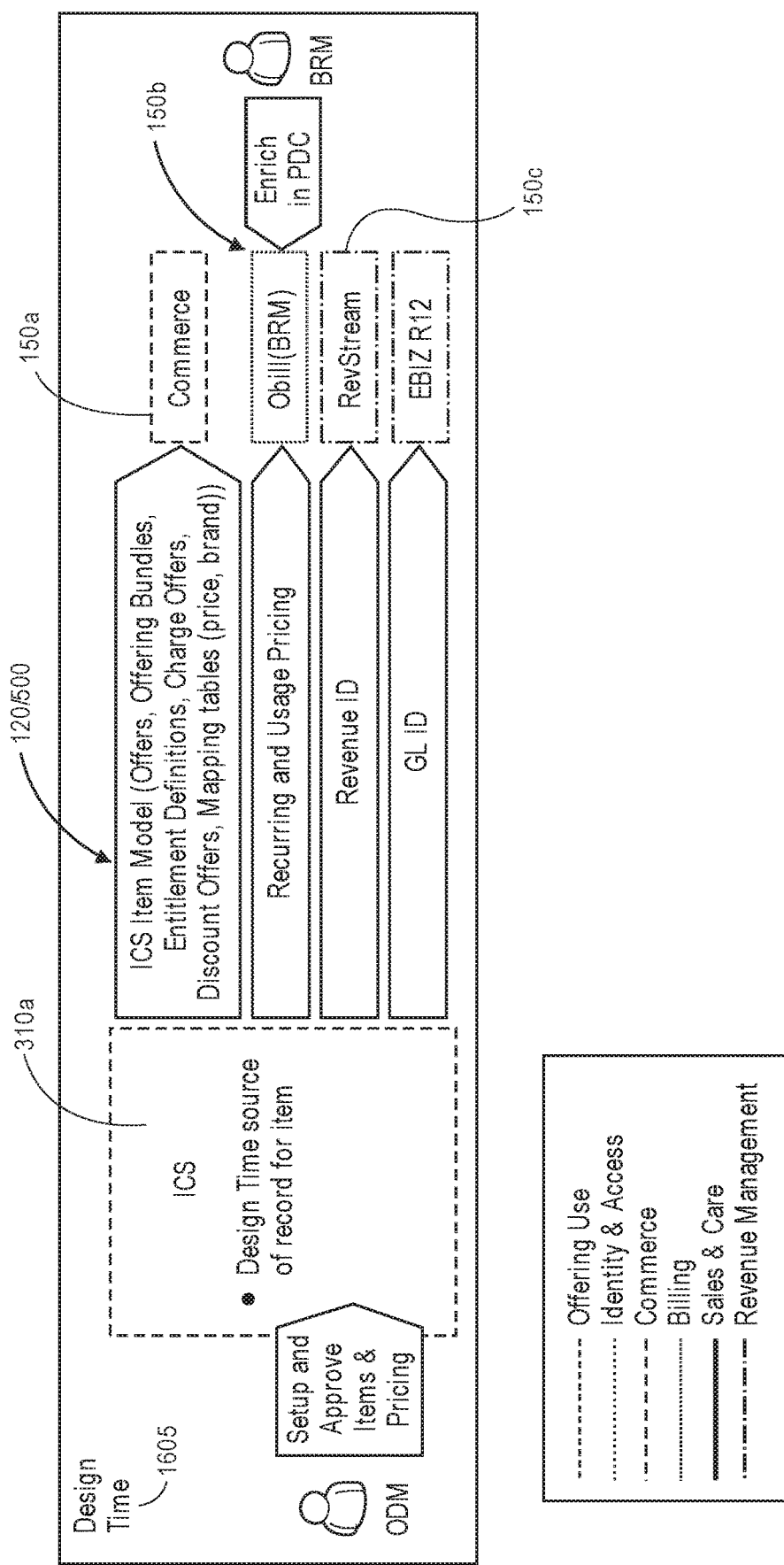
FIGS. 16A-C illustrate an example of a system configured according to one embodiment for design time and runtime processing involving an integrated entitlement-monetization model shown in FIGS. 5A-E, runtime subscription and entitlement management involving an integrated or hybrid entitlement state—service state model and runtime processing based on customer interactions with a customer-facing offering application.
Figure 16B:
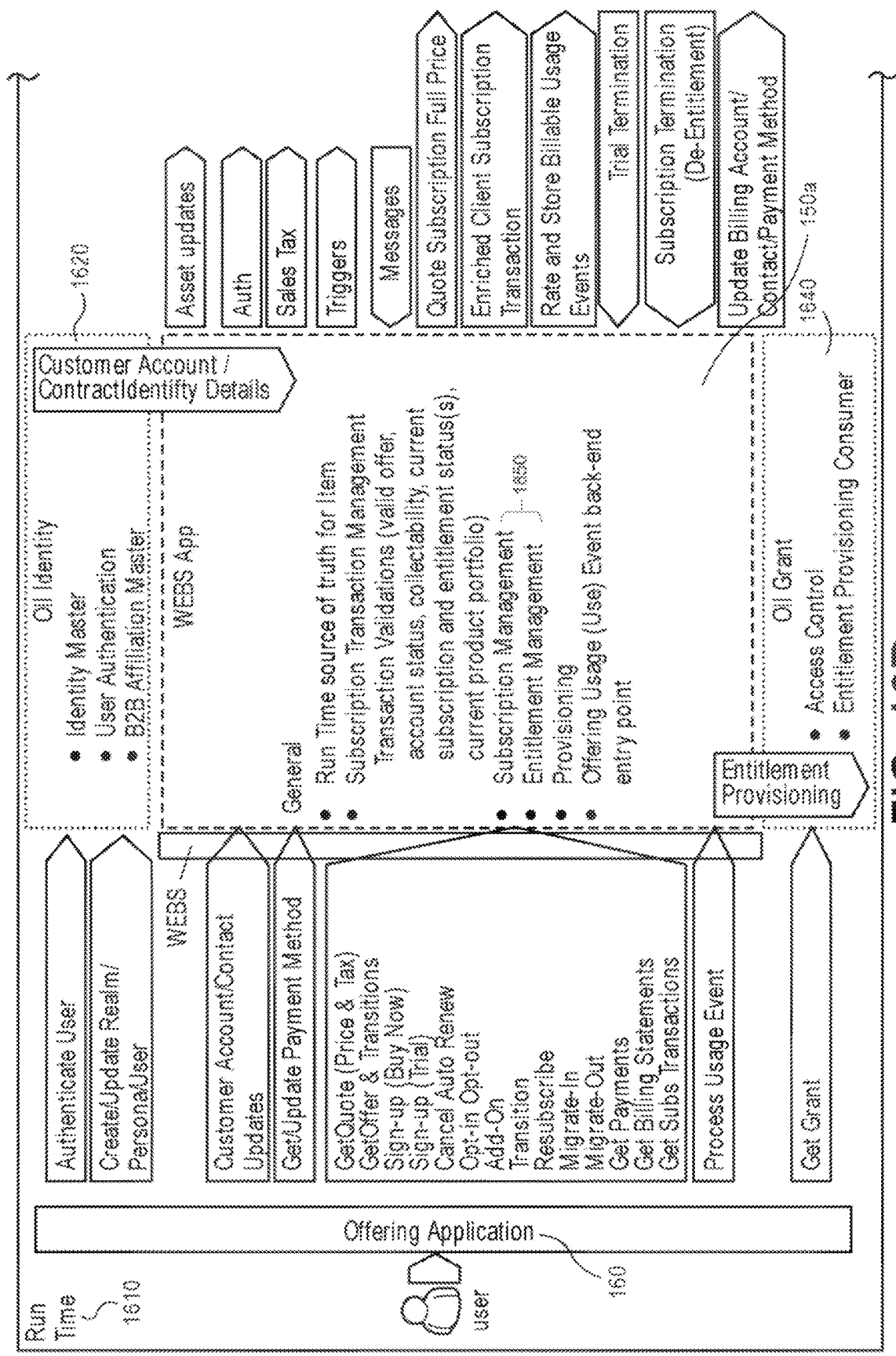
Figure 16C:
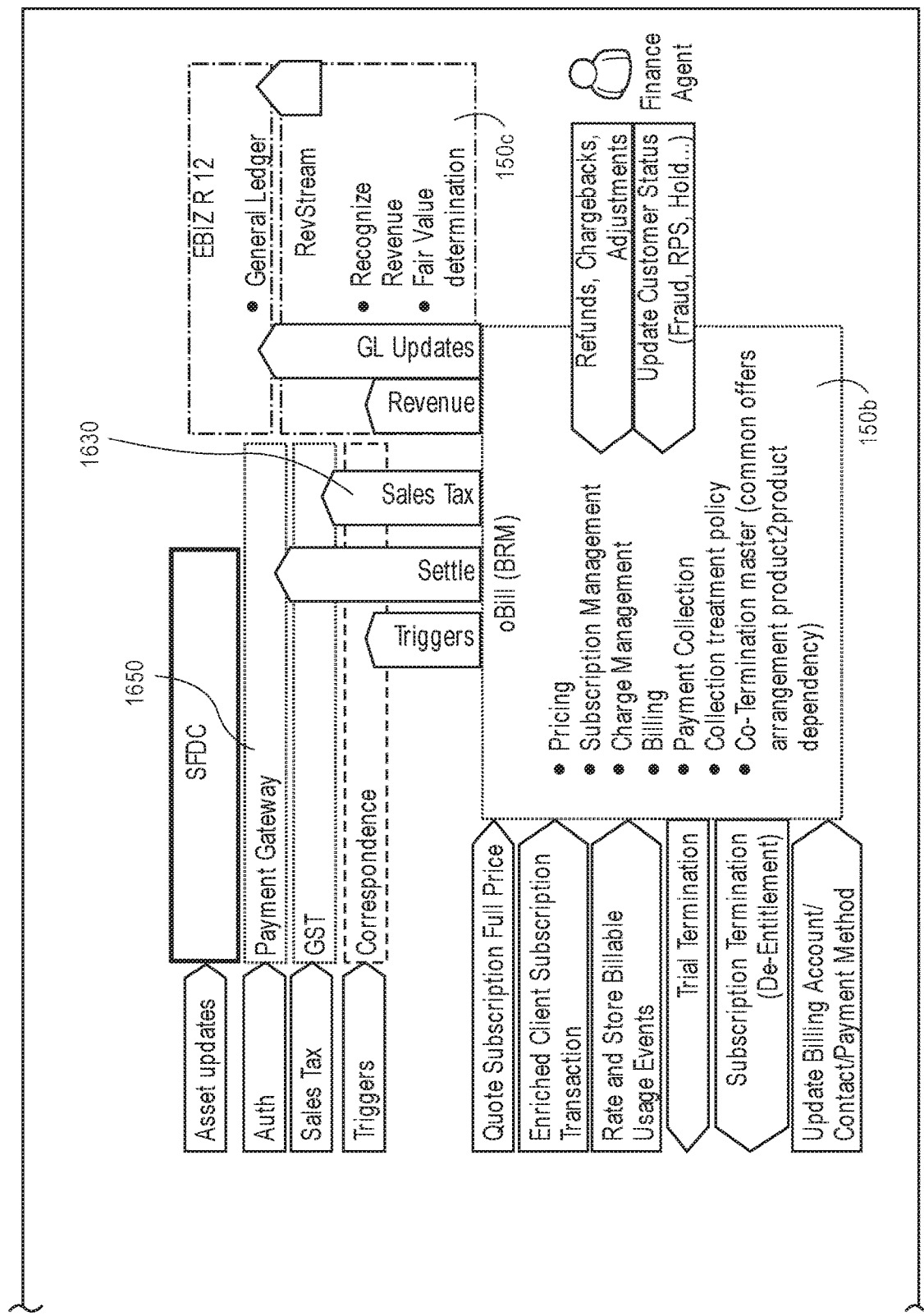

FIGS. 16A-C include sections identified as design time processing 1605 and runtime processing 1610 that utilize integrated or hybrid data models and that may involve different systems or platforms. After the entitlement-monetization model 500 has been configured, and is activated or live for production as described with reference to FIGS. 15A-D, then the system is placed in a mode of runtime processing 1610 and available to receive customer requests through the customer facing offering application 160 through the first spoke computing system 150a, identified as the WEBS App or item model store 150a that serves as a catalog for the customer. Thus, FIGS. 16A-C further illustrate how embodiments can utilize the same entitlement-monetization model 500 or portions thereof according to embodiments in both design time 1605 and runtime 1610 environments, to provide an end-to-end, or software product configuration to deployment solution, as well as automated provisioning and enforcement to ensure that the customer receives or accesses what the customer is entitled to as defined by the entitlement-monetization model 500.

As shown in FIGS. 16A-C, beginning with design time 1602, having published or pushed the entitlement-monetization model 500 definitions or data from ICS 310a to the first spoke computing system 150a (WEBS App) and other spoke computing systems 150b-c for billing and revenue recognition (as discussed above), the customer accesses the system via the customer-facing offering application 160, e.g., via a browser executing on the customer computing device or some other program or interface for accessing the first spoke computing system 150a. Examples of browsers that may be utilized for this purpose include INTERNET EXPLORER, GOOGLE CHROME and MOZILLA FIREFOX browsers, via one or more networks such as Local Area Network (LAN), a Wide Area Network (WAN), Metropolitan Area Network (MAN), a wireless network, other suitable networks capable of transmitting data, and a combination of such networks.

When the customer first visits the system the customer establishes a user account or identity with the host system, as represented by One Intuit Identity (OII) 1620, which may involve, for example, user authentication, creating or updating user accounts or personas and customer contact information entry or updates. The customer account data can be written to the first spoke computing system 150a or item data store as reflected by arrow from OII Identity 1620. Thus, as shown in FIGS. 16A-C, the catalog or first spoke computing system 150a to which the entitlement-monetization model 500 has been published from the ICS system 310a, serves as a source of truth and provides for various runtime 1610 management tasks such as subscription management, entitlement management, provisioning.

With continuing reference to FIGS. 16A-C, after a user account or identification is established, the user proceeds with selection of an offer 518 or interaction with the customer-facing offering application 160. This may involve the user navigating, browsing and selecting a software product configured according to the entitlement-monetization model 500 published to the first spoke computing system 150*a* which is referred to items data store or the WEBS App catalog. This may involve the user selecting one of various options or menu items such as, for example, get quote, get offer and transitions to other software products or versions, sign up/buy now, sign up/trial, cancel an automatic renewal, opt-in or opt-out, add-on, transition to another software product or feature set, resubscribe, etc. Whatever action is initiated by the customer, the customer request is received by the WEBS app or first spoke computing system 150*a* that hosts the item data store/catalog and that is the runtime source of truth.

Depending on what is selected by the customer, the first spoke computing system 150*a* may communicate with the second spoke computing system 150*b* (for billing) to, for example, communicate a customer request for a quote (which includes any taxes, discounts). This may involve the billing second spoke computing system 150*b* accessing resources for quote generation, such as sales tax module (Global Sales Tax (GST) 1630 and incorporating sales tax data into the quote, and the quote is transmitted by the second or billing spoke computing system 150*b* in response to the quote request from the first spoke computing system 150*a*, which then communicates the quote with the applicable sales tax or other quote data (price, tax and any applicable discount) to the user via the customer-facing offering application 160.

For the offer 518 selected by the user, entitlement for that particular product/feature set is approved for that user via the first spoke computing system 150*a*, and entitlement authorization is transmitted to a grant/entitlement module (OII grant) 1640, such that when the customer receives a response from the first spoke computing system 150*a* regarding the quote/offer, upon acceptance, the customer is able to access or download the requested product per the entitlement provisioning of OII Grant 1640. Transaction data may then be passed by the first spoke computing system 150*a* to the second or billing spoke computing system (such as BRM) 150*b*, which may done asynchronously, to set up billing services for the entitlement or terms set forth in the offer 518.

As described in further detail with reference to FIGS. 17-21B, based on a system generated event indicating, for example, that a trial period has ended, the customer has not paid an invoice, or has not paid an invoice and has passed the grace period, the first spoke computing system (WEBS App) 150*a* may be modified to reflect the status. This may be based on an event generated by and received from an event generation system, such as the second or billing spoke computing system 150*b* to ensure that subscription termination is properly enforced, e.g., as reflected in in trial termination and subscription termination arrows from the second or billing spoke computing system (e.g., BRM) 150*b* to the first or catalog spoke computing system (e.g., WEBS App) 150*a*, which manages the subscriptions and pushes updates to the entitlement provisioning or enforcement module (e.g., OII Grant) 1640 to modify grant or enforcement provisions, in addition to serving as a catalog or source of offers for the customer-facing application 160. Otherwise, for subscriptions or purchases, the first or catalog spoke computing system (WEBS App) may interface with a payment module 1650 or payment gateway, e.g., as part of a validation process as part of a "buy now" action or request by the customer, which may involve credit card authorization, and correspondence to the customer can be updated to reflect any subscription changes, purchase, or transitions and to communicate invoices to the customer.

Thus, FIGS. 16A-C further illustrate how the entitlement-monetization model 500 may be utilized in both design time 1605 and runtime 1610 applications and associated automated system modifications, and further illustrates how the entitlement-monetization model 500 allows for centralized offer, subscription and entitlement enforcement, and being managed by the first computing spoke element that interfaces with computing elements for billing, revenue recognition, access control or entitlement provisioning and subscription changes or modifications. Further aspects of runtime processing and associated automated modifications are described with reference to FIGS. 17-21B.

Figure 17:
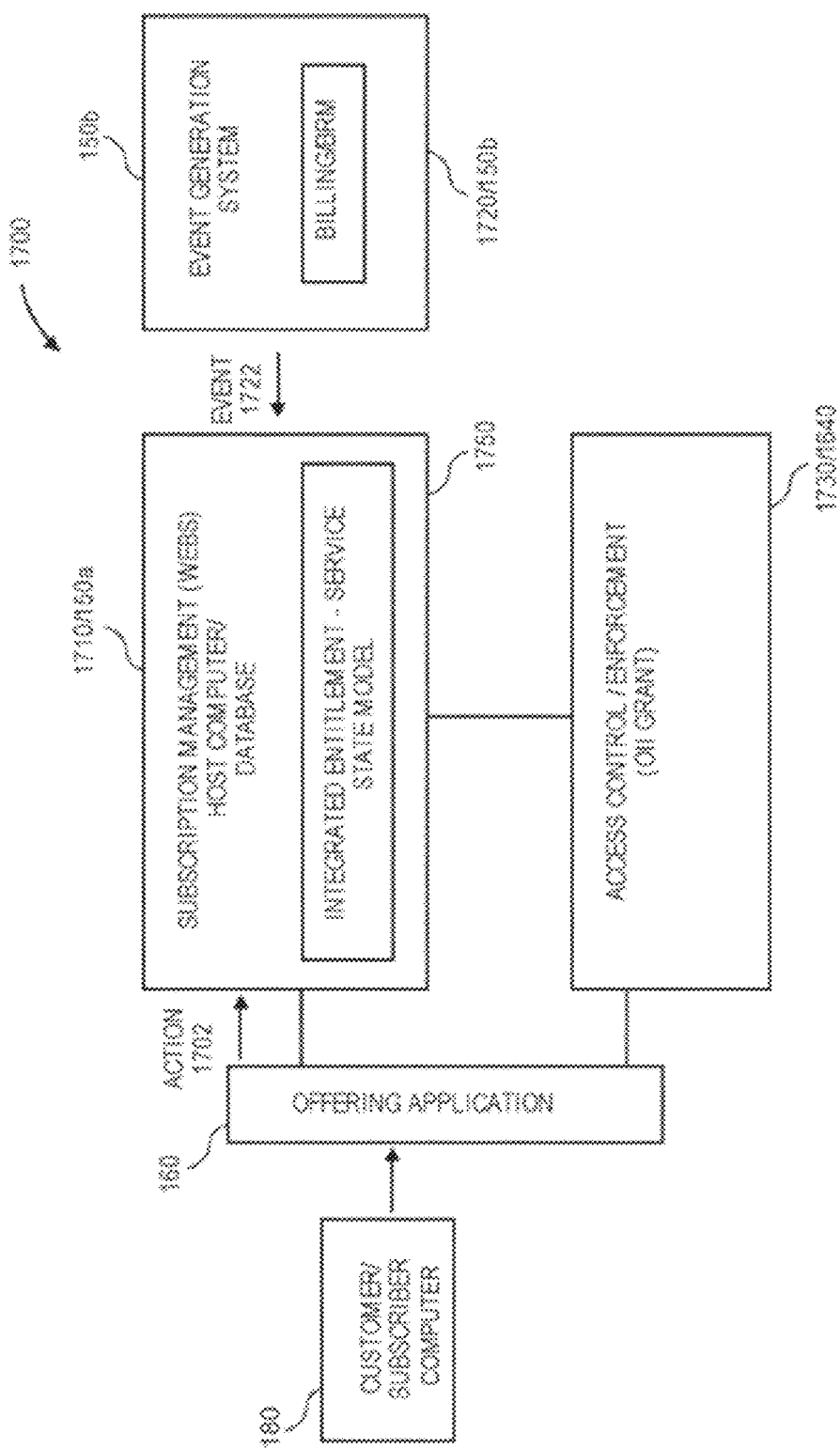
FIG. 17 is a system flow diagram illustrating a runtime computerized software management system constructed according to one embodiment including an integrated or hybrid entitlement-service state model.

Referring to FIG. 17, one embodiment of the invention is related to runtime applications (versus design time) that involve management or system control of access to or use of a computer software product, such as QUICKBOOKS ONLINE (QBO), as one example. Embodiments of the invention involve a host computing device, which may include a computer database 150*a* that includes or executes a hybrid runtime data model 1750 integrating entitlement state and service state to govern subscriber access to computer software products and actions permitted by the subscriber.

According to one embodiment, the integrated or hybrid entitlement state—service state data model 1750 may specify full access or restricted/read-only access and what actions, such as opt in from a trial subscription, are permitted to be performed by a customer given a current service state). Given the manner in which the integrated or hybrid state model 1750 is structured, the integrated entitlement state and service state data or attributes thereof are interwoven with each other, e.g., one being a sub-state of the other, rather than being distributed among different models or different computing systems or platforms, thus improving the functioning of computing systems utilized for computer software product configuration and deployment by, for example, eliminating the need for additional communications, which may involve additional network communications, and processing associated with interfacing with other computing devices that manage independent and distributed entitlement and service states.

In the illustrated embodiment, a computing system 1700 for runtime computer software product management in a networked computing environment includes a host computer or data base system 1710/150*a*, such as WEBS 150*a* as described above. For ease of explanation, reference is made to a database system. System embodiments may also include an event generation system 1720, which, according to one embodiment, may be billing system such as BRM 150*b* noted above or another separate system event generation system, and which automatically generates events or notifications concerning the computer software product and to which the database 1710 is subscribed to receive. Thus, the events are system generated events communicated to and processed by other system components for executing automated system modifications or transformations. System generated events 1722 may relate to, for example, payment or non-payment for a subscription, or transitioning from a trial subscription to a paid or upgrade subscription, and the database 1710 automatically modifies the integrated or hybrid entitlement-service state model 1750 in runtime based on the received system generated event 1722. The hybrid state represented by the integrated or hybrid state model 1750 is automatically transformed in runtime to reflect the system generated event 1722, without human intervention and/or to reflect an action 1702 performed by the customer, e.g., initiating a trial subscription or canceling a subscription. System embodiments may also include computer software product access control or enforcement system 1730, which receives updates from the database 1710 regarding how the state was modified or transformed during runtime to reflect both entitlement and service state and indicating which computer software product or version thereof the customer is entitled to access. Thus, when a user logs into the system through a customer computer 180 via the offering application 160, the access control or enforcement system 1730 automatically checks whether the customer is permitted to access the requested computer software product and if so, which version or capabilities thereof.

Figure 18A:
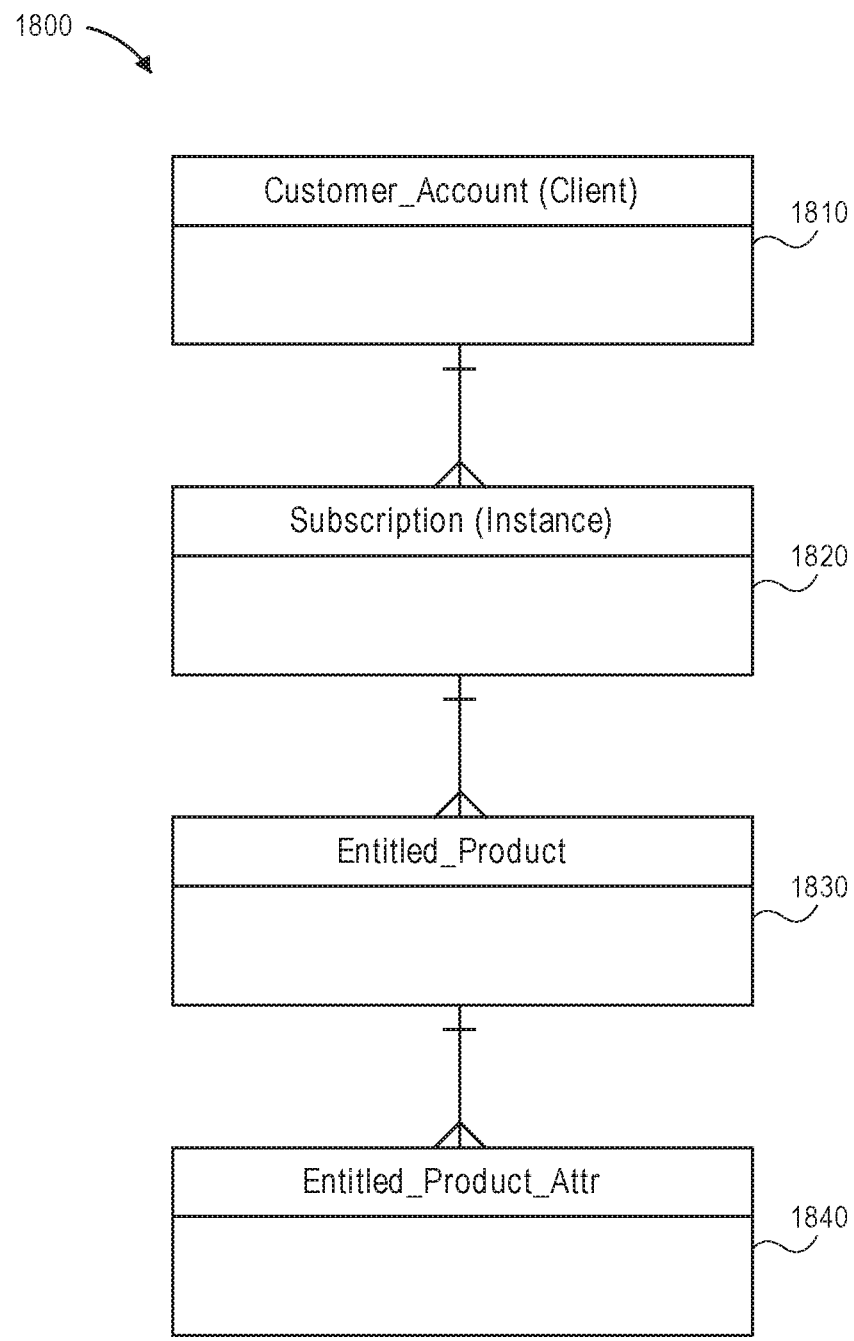
FIGS. 18A-B illustrate a subscription model constructed according to one embodiment that includes an integrated or hybrid entitlement-service state model and how different model elements are related to each other in order to control access to a computer software product that was the subject of a system generated offer and customer actions related thereto.
Figure 18B:
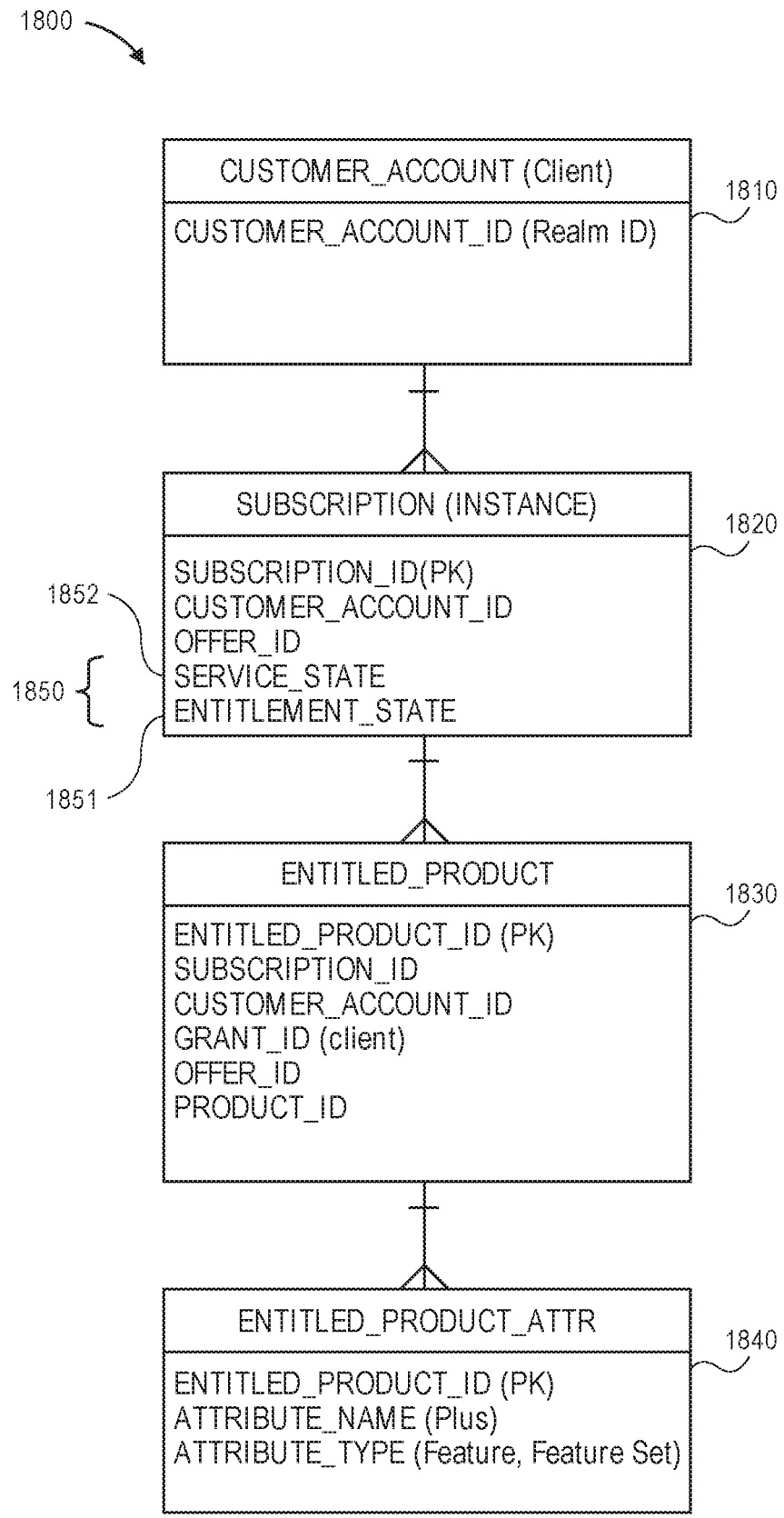

Referring to FIGS. 18A-B, logical representations of a runtime subscription model 1800 constructed according to embodiments for governing use of a computer software product by a subscriber or customer are illustrated. In the illustrated embodiment, the runtime subscription model 1800 includes multiple elements, tables, objects or records (generally, "element") that are linked or associated with each other and one data element includes an integrated or hybrid entitlement state—service state model 1850. The integrated or hybrid entitlement state—service state model 1850, according to one embodiment, includes first state data 1851 related to the customer's entitlement to a computer software product and for governing access to the computer software product by the customer, and second state data 1852 related to a service state and that is used to specify actions that can be requested or executed by the customer given the current combination of an entitlement state or first state data 1851 and service state or second state data 1852 of the integrated or hybrid runtime entitlement-service state model 1850 of the runtime subscription model 1800.

In the illustrated embodiment, the runtime subscription model 1800 includes runtime data model elements for customer account 1810, subscription (subscription instance) 1820, entitled product 1830 of the subscription instance and entitled product attributes 1840. More specifically, in the embodiment illustrated in FIG. 18B, the runtime subscription model 1800 includes a Customer Account (client) element 1810 that is associated with, related to, linked to, or cross-referenced with a Subscription (Instance) element 1820, which is associated with, related to, linked to, or cross-referenced with an Entitled Product element 1830, which is associated with, related to, linked to, or cross-referenced with, the Entitled Product Attribute element 1840.

A Customer Account (Client) element 1810 configured according to one embodiment includes fields or attributes:

CUSTOMER_ACCOUNT_ID: data for identifying a customer account. In the illustrated embodiment, is referred to as "Realm ID" which is a name or other identifier for a customer account identification generated by an access control or enforcement system 1640 such as OII Grant in FIG. 16B.

A Subscription (Instance) element 1820 configured according to one embodiment includes an identifier field or attribute:

SUBSCRIPTION_ID (PK): a unique ID to a customer that serves as a Primary Key and that is used to segregate multiple instances of a Sign-up or Buy Now offer. If a customer chooses to do another Sign-up or Buy Now instead of an upgrade of an existing offer to another offer, another instance of the Subscription is created. Future transactions would indicate the Subscription ID.

CUSTOMER_ACCOUNT_ID: as noted above regarding CUSTOMER_ACCOUNT, data for identifying a customer account, e.g., "Realm ID" generated by the access control or enforcement system 1640 such as OII Grant in FIG. 16B.

OFFER_ID: an external identifier reference on transactions from the initiating source application such as customer facing offering application 160 shown in FIGS. 1 and 16B. This identifier is received with transactions via the customer facing offering application 160 and re-populated when a subsequent transition is processed.

SERVICE_STATE: a component or state data 1852 of the integrated or hybrid entitlement-service state model 1850; the service state data 1852 indicates which status the subscription is in terms of, for example, whether the customer is paying or is not, and drives what actions a user can take next in terms of changing their subscription portfolio.

ENTITLEMENT_STATE: a component or state data 1851 of the integrated or hybrid entitlement-service state model 1850 that governs customer access to or use of the computer software product and in certain embodiments, may specify multiple access attributes such as whether access is allowed and the level of access.

An Entitled Product element configured according to one embodiment is configured to identify a specific computer software product to which customer is entitled to use or access in accordance with their subscription portfolio and includes fields or attributes:

ENTITLED_PRODUCT_ID (PK): unique identifier for the entitled software product

SUBSCRIPTION_ID: as noted above with reference to SUBSCRIPTION (INSTANCE), a unique ID to a customer that is used to identify a subscription or instantiation of an offer pertaining to the computer software product, e.g., to segregate multiple instances of a Sign-up or Buy Now offer.

CUSTOMER_ACCOUNT_ID: as noted above with reference to CUSTOMER_ACCOUNT(CLIENT), data for identifying a customer account, e.g., "Realm ID" generated by the access control or enforcement system 1640 such as OII Grant in FIG. 16B).

GRANT_ID (CLIENT): reference to a specific entry in an access control or enforcement system 1640 such as the OII Grant system that manages access to computer software products defined by ENTITLED_PRODUCT. For example, customer facing offering applications 160 check with the access control system 1640 to determine if the logged in user is allowed access or is allowed to perform the action they are attempting concerning the computer software product.

OFFER_ID: as with reference to SUBSCRIPTION (INSTANCE), an external identifier reference on transactions from the initiating source application such as customer facing offering application 160 shown in FIGS. 1 and 16B). This identifier is received with transactions via the customer facing offering application 160 and re-populated when a subsequent transition is processed.

PRODUCT_ID: as noted with reference to FIG. 6A and PRODUCT (of the integrated or hybrid design time model), a unique identification of a core software product or offering (such as "QBO").

An Entitled Product Attribute element 1840 configured according to one embodiment represents all of the features 221 or feature sets 220 that a customer has related to the product, e.g., identified by product element 220, that they own. For example, as discussed above with reference to FIGS. 7A-D, a core or primary computer software product may be QUICKBOOKS ONLINE, or "QBO"), and a feature set model element is associated with the product model element and defines a set of features or limitations of the core computer software product (e.g., a particular version of the software product, such as QBO ESSENTIALS, QBO PLUS or Advanced Reporting feature).

ENTITLED_PRODUCT_ID (PK): unique identifier for the entitled software product.

ATTRIBUTE_NAME: As discussed above with reference to FIG. 7b, a character value of the attribute, e.g., to signify QBO "Plus" or "Simple Start." This data defines the attribute name that applies. Changes to this value are reported to the access or enforcement control system 1640).

ATTRIBUTE_TYPE: Defines the attribute name that applies. Example: 'feature-set', 'feature'. In other words, this data defines a type of attribute, which may be, for example, Feature Value, Pre-paid Consumable Resource Limit, Concurrent Resource Limit, Identified Resource Limit, and/or an attribute related to a capability or functionality of the Product)

With continuing reference to FIG. 18B, a "subscription" element 1820 as shown in FIG. 18B serves as a "container" for computer software products to which the customer is entitled to use or access. A subscription instance 1820 may serve as a container for a single computer software product or for multiple computer software products. Thus, if a customer purchases QBO, the subscription instance 1820 would include one product to reflect instantiation of an offer involving that particular computer software product, but if a customer purchases QBO, QBO A (for accountants) and PAYROLL, then the subscription element 1820 would serve as a container for three entitled products to reflect instantiation of an offer that that involved the three computer software products.

In the illustrated embodiment, a runtime, integrated or hybrid entitlement-service model 1850 is contained exclusively within the SUBSCRIPTION (INSTANCE) element 1820 of the subscription data model 1800. The hybrid entitlement-service state model is also generally illustrated in FIG. 16B ("subscription management" and "entitlement management"—collectively, runtime, integrated or hybrid entitlement-service model 1850) of the WEBS database 150a, which is in communication with the access or enforcement control system 1640 (OH Grant) and an event generation system such as billing system 150b (such as BRM) as shown in FIGS. 1 and 16B-C, all of which are not accessible by the customer/subscriber, which instead only interacts with the customer facing offering application 160.

In the illustrated embodiment, no portion of the integrated or hybrid runtime state model 1850 is included in another other data element and is used for governing use of a computer software product by a customer. According to one embodiment, the integrated or hybrid runtime state model 1850 includes entitlement state data 1851 that specifies or defines access to the computer software product by the customer. For example, an "Active" entitlement state or entitlement state data 1851 may indicate that the customer is allowed access to the computer software product (e.g., by a "Y/N" binary indicator) and further indicate that such access is "full" or unrestricted access. As another example, an "Inactive" entitlement state or entitlement state data 1851 may indicate that the customer is allowed access to the computer software product, but that such access is restricted, such as "Read Only" such that the customer may no longer use the computer software product to enter or generate new accounting data, but may access previously entered or stored data on a read-only basis, which may occur when a customer previously paid for a subscription but the current payment is past due. As a further example, an entitlement state or entitlement state data 1851 may be "Closed" in which no access is permitted and the customer has no access to the computer software product or any data managed thereby. Thus, according to one embodiment, for a given entitlement state or state data 1851, multiple access attributes or criteria may be defined. For ease of explanation and not limitation, reference is made to entitlement state data or access data 1851.

According to one embodiment, the integrated or hybrid runtime state model 1850 includes service state data 1852 that specifies or defines current service state applicable to the customer and which customer actions are permitted given the service state 1852 and current entitlement state 1851 such that the service state 1852 is a sub-state of the entitlement state 1851.

Figure 19:
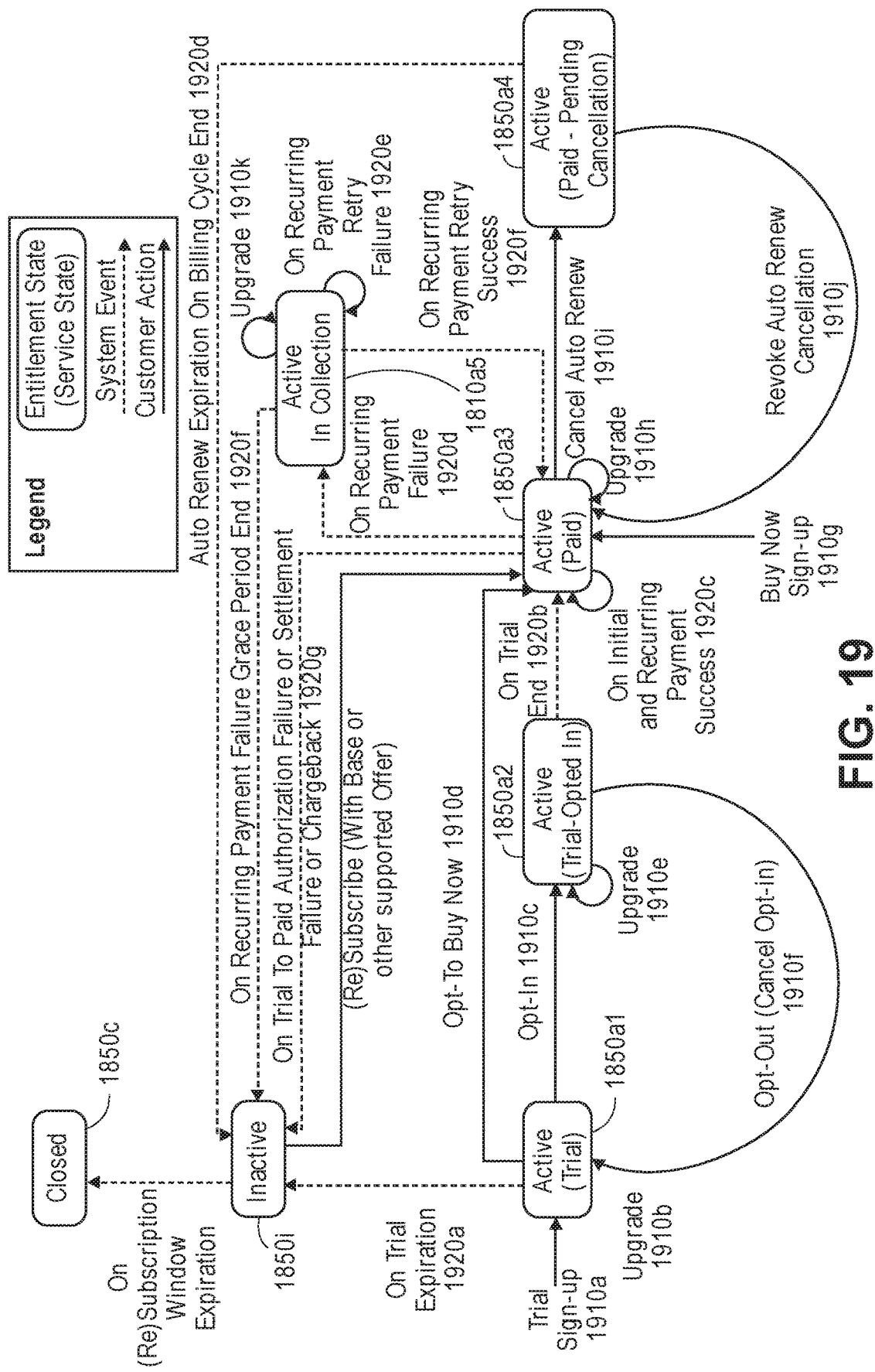
FIG. 19 is a system flow diagram illustrating how an integrated or hybrid entitlement-service state model can be executed to automatically transform the state represented thereby in response to user actions and system generated events concerning computer software product that is the subject of a system generated subscription offer.

With further reference to FIG. 19, which is a state-flow diagram illustrating how the integrated or hybrid entitlement-service state model 1850 can be utilized to manage a customer's access to a computer software program based on different circumstances or conditions and how state model changes can be implemented in response to customer actions and/or system generated events (e.g., generated by billing system 150b or BRM as shown in FIG. 16C). Examples of automatically generated system events include generation of events indicating a transition (e.g., opting in from a trial subscription), payment or non-payment or other payment issue (e.g., credit card failure or non-payment greater than a pre-determined time). In the illustrated embodiment, the integrated or hybrid entitlement-service state model 1850 specifies a hybrid state including an entitlement state and, if applicable, a sub-state in the form of the service state, the combination of which determine which actions are permitted by the subscriber. In the example shown in FIG. 19, the service state 1852 or sub-state is represented as in (parentheses), and in the illustrated embodiment, a service state 1852 is specified when the entitlement state 1851 is active (which may involve service states of trial, trial opted in, paid, pending cancellation, in collection and in collection pending cancellation), but not when the entitlement state 1851 is inactive (which may apply with service states of paid and trial, for example), or closed (for any service state).

For example, in the illustrated embodiment, as an exemplary starting point, the customer initially interacts with the customer facing application 160 to take the action of signing up for a trial 1910a by responding to an offering for the computer software product. This is reflected by the hybrid state of state model 1850a1 (entitlement state=active, service state=trial, or Active (trial)). Possible pre-defined customer actions 1910 that are permissible given this combination of entitlement state/service state (Active/Trial) 1850a1 ("a" referring to "active") include upgrade 1910b, opt-in 1910c, opt to buy now 1910d. A system generated event 1920 of trial expiration 1920e may also occur during the Active (trial) state 1850a1.

During Active (Trial) 1850a1, the customer may take the action of upgrading 1910b to a trial of another or upgraded version of the computer software product, in which case the state model 1850 remains unchanged as Active (Trial) 1850a1. During the Active (Trial) 1850a1 state, the customer may take the action of opting in 1910c to transition from the trial subscription to a paid subscription upon termination of the trial subscription, in which case the hybrid state of the state model 1850 is automatically modified from Active (Trial) 1850a1 to Active (Trial Opted In) 1850a2 in response to this customer action and input received through the offering application 160.

During the Active (Trial) 1850a1 state, the customer may also opt to purchase 1910d the computer software product to transition from the trial subscription to a paid subscription upon termination of the trial subscription, in which case the hybrid state of the state model 1850 is automatically modified from Active (Trial) 1850a1 to Active (Trial-Opted In) 1850a2 in response to this customer action. During this Active (Trial-Opted In) state 1850a2, the customer may also upgrade 1910e the computer software product that was the subject of the end of trial payment, in which case the state model 1850 remains unchanged as Active (Trial-Opt-In) 1850a2. If the customer later opts out from this trial 1910f, the hybrid state of the state model 1850 is automatically modified from Active (Trial-Opt-In) 1850a2 back to Active (Trial) 1850a1 in which case the customer may not be charged, e.g., if cancellation occurs before payment or before the trial period ends.

If payment is received from the customer by trial end 1920b, as reflected by a system generated event (e.g., as generated by a billing system 150b such as BRM), the hybrid state of the state model 1850 is modified from Active (Trial-Opt-In) 1850a2 to Active (Paid) 1850a3 to reflect that the customer has paid for a subscription to the computer software product upon termination of the trial. The hybrid state of the state model 1850 may also be automatically modified to be placed in an Active (Paid) 1850a3 state when the customer does not begin with a trial subscription and instead initially purchases the computer software product (Buy Now Sign Up) 1910g through the customer facing application 160.

During the Active (Trial) 1850a1 state, the customer may take no action, resulting in a system generated event of trial expiration 1920a, in which case the hybrid state of the state model 1850 is automatically modified from Active (Trial) 1810a1 to Inactive 1810i.

Continuing with reference to the state model 1850 in the hybrid state of Active (Paid) 1850a3, the Active (Paid) state 1850a3 remains unchanged when the customer upgrades 1910h the computer software product that was the subject of the prior payment or upon a system generated event, e.g., generated by a billing system 150b, indicating continuing subscription payment success (On Initial and Recurring Payment Success) 1920c.

During the Active (Paid) state 1850a3, upon customer actions of canceling an automatic renewal option 1910i and upon expiration of the subscription, the hybrid state of the state model 1850 is automatically modified to transition from Active (Paid) 1850a3 to Active (Paid-Pending Cancellation) 1850a4, but upon revocation of this cancellation 1910j, the hybrid state of the state model 1850 is automatically modified to revert back to Active (Paid) 1850a3. If automatic renewal is not effected as a result of lack of customer action and expiration of auto renew upon termination of a billing cycle as reflected by system generated event 1920d, the hybrid state of the state model 1850 is automatically modified to transition from Active (Paid-Pending Cancellation) 1850a4 to Inactive 1810i such that the customer now only has read-only access to the customer's data in the Inactive state 1820i.

The hybrid state of the state model 1850 may also be automatically modified to transition to Active (In Collection) 1810a5, which is still an active state but the subscription payment is late as reflected by system generated event 1920 and in collection and remains in this state 1810a5 while the system awaits payment or attempts to or retries to effect payment but fails to do so 1920e, but is automatically modified to transition back to Active (Paid) 1850a3 upon a system generated event indicating successful payment 1920f. If the customer initiates or completes an upgrade 1910k during the Active (In Collection) 1850a5 state, the customer remains in the Active (In Collection) 1850a5 state until the collection issue is resolved.

If after a certain amount of time or grace period, payment cannot be effected as reflected by event 1920f generated by billing system 105b, the hybrid state of the state model 1850 is automatically modified from Active (In Collection) 1850a5 to Inactive 1850i ("i" referring to inactive") such that the customer now only has read-only access to the customer's data in this state. The state model 1850 may also be automatically modified to transition from Active (Paid) 1850a3 to Inactive 1850i based on a billing system 105b event indicating authorization or settlement failure or a chargeback 1920g, e.g., as determined by a system generated event received by the database hosting the integrated entitlement state—service state model 1850, but may automatically revert back to Active (Paid) 1850a3 upon user action in the form of resubscription 1910l, which may involve a base or other supported offer involving the computer software product.

While in the Inactive state 1850i, during which the customer still retains read-only access, the state may transition from Inactive 1850i to Closed 1850c ("c" referring to "closed") after a pre-determined amount of time during which resubscription was permitted has passed, thus resulting in a "Closed" state 1850c, which terminates read-only access. Once in the Closed state 1850c, in order to access the subscription model again, the customer is required to begin with a new trial or purchase of the computer software product and no longer has access to the data that was previously accessible in the Active and Inactive states.

It will be understood that embodiments may involve various other flows and integrated or hybrid state model 1850 configurations involving different states 1850a, 1850i, 1850c, customer actions 1910 and system generated events 1920 and that FIG. 19 is provided as an illustrative example of how the integrated entitlement state—service state model 1850 can be configured and automatically modify or transform to adapt to different customer actions and system generated events. For example, although not shown in FIG. 19, on recurring payment failure and while in the Active (In Collection) state 1850a5 during the grace period, a customer may request auto renew cancellation, which will be effective at the end of a billing cycle provided that payment can be processed and the state can transition out of collection before the end of the billing cycle. If not, then the subscription can be deactivated at the end of the grace period rendering the cancellation request moot. Further, although not shown in FIG. 19, the system may be immediately transformed such that the integrated or hybrid state model 1850 assumes state of Closed state 1850c upon occurrence of a pre-determined event, e.g., determination that customer is a restricted party or a party that is not permitted to use these services.

Figure 20A:
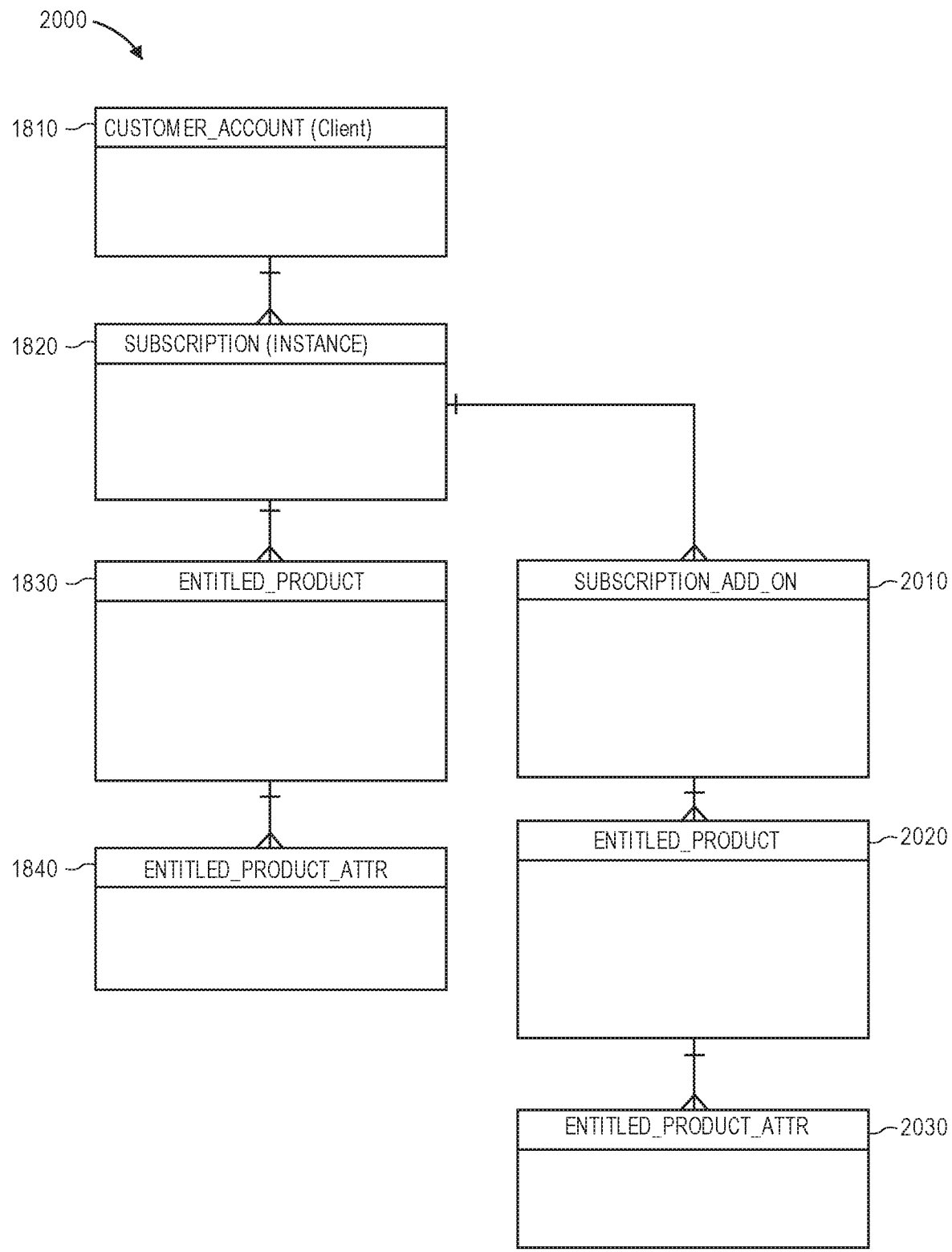
FIGS. 20A-B illustrate a subscription model constructed according to one embodiment that includes an integrated or hybrid entitlement-service state model and how different model elements are related to each other in order to control access to a computer software product that was the subject of a system generated offer and customer actions related thereto and that also provides for management of product add-ons to a base entitled computer software product.
Figure 20B:
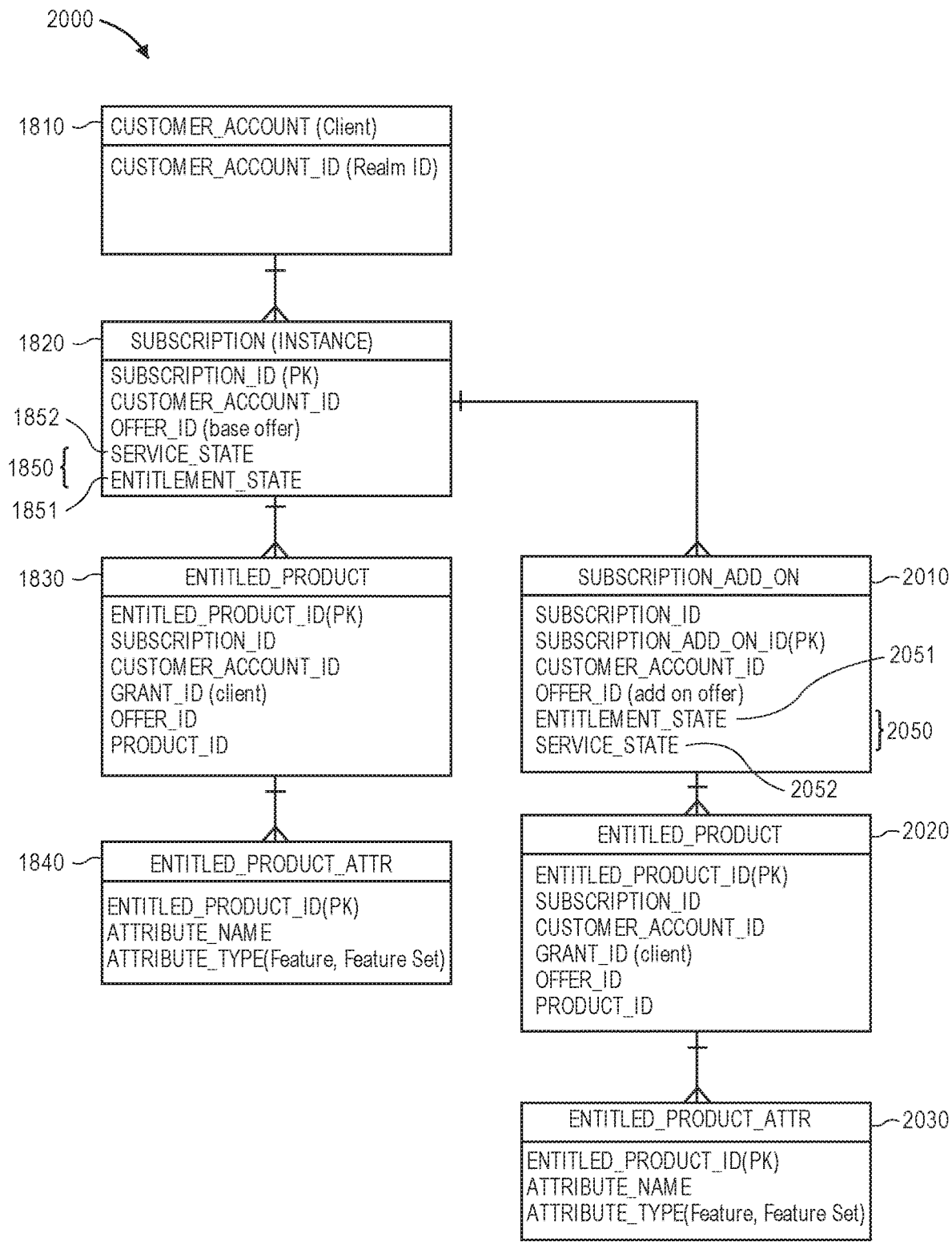

Referring to FIGS. 20A-B, a logical representation of a runtime subscription model 2000 constructed according to one embodiment and that also incorporates an integrated entitlement state—service state model 1850 also provides for representation of add-ons to the entitled product. In the illustrated embodiment, the runtime subscription model 2000 provides for automated and adaptive software product governance including controlling use of a first or base computer software product by a subscriber or customer and a subscription add-on, or a different, second computer software product, are illustrated. While in FIG. 18B reference is made to an entitled product, when discussing embodiments involving an add-on to that entitled product, reference is made to the "base" entitled product and the "add-on" to that base entitled product. Reference to a subscription "add-on" is defined as a different and independent computer software product relative to the base or first computer software product (in contrast to an additional or new "feature" add-on for the same base or first computer software product).

For example, a customer may have a paid subscription to a base entitled product of QUICKBOOKS ONLINE (QBO) and may be eligible, by virtue of already having a paid subscription to QBO, to access a different product, such as INTUIT PAYROLL. Thus, whether a subscription add-on is available to a customer depends on the base entitled product to which the customer is also subscribed such that subscription add-ons as reflected in the runtime subscription model 2000 and account for a portfolio of products under a subscription that can evolve independently of the subscription to a base entitled product. Thus, an "add-on" to a computer software product such as QBO is distinguished from another "feature" of QBO.

In the illustrated embodiment, the runtime subscription model 2000 that accounts for subscription add-ons includes various elements, tables, objects or records (generally, "element") that are linked or associated with each other and data thereof as described with reference to FIGS. 18A-B including a CUSTOMER_ACCOUNT (Client) element 1810, SUBSCRIPTION (INSTANCE) ELEMENT 1820, ENTITLED_PRODUCT element 1830 and ENTITLED_PRODUCTATTR element 1840, and the integrated or hybrid entitlement state—service state model 1850 being contained within the SUBSCRIPTION (INTANCE) element 1820, details about which are described with reference to FIGS. 18A-B and not repeated. Further, in the embodiment illustrated in FIGS. 20A-B, the runtime subscription model 2000 also includes a Subscription Add On element 2010 that is associated with, related to, linked to, or cross-referenced with the Subscription (Instance) element 1820 described with reference to FIGS. 18A-B, and is also associated with, related to, linked to, or cross-referenced with an Entitled Product element 2020 (which is the product that is the add-on the first or base Entitled Product), which is associated with, related to, linked to, or cross-referenced with, the Entitled Product Attribute element 2030 for that add-on entitled product.

A Subscription Add On element 2010 configured according to one embodiment and integrated with a Subscription (Instance) 1820 that specifies a separate add-on computer software product to a base entitled software product includes fields or attributes:

SUBSCRIPTION_ID: as noted above with reference to SUBSCRIPTION (INSTANCE), a unique ID to a customer that is used to identify a subscription or instantiation of an offer pertaining to the computer software product, SUBSCRIPTION_ADD_ON_ID(PK) (a unique identifier to a customer that is used to segregate multiple instances of a subscription add-on offer from the base level offer on the parent Subscription. A subscription add-on offer is an offer level that 'extends' the customer offering portfolio for a specific subscription with new product (s). The subscription add-on offer can be cancelled or de-entitled independently from the base level offer and is not considered part of the same arrangement as the subscription (base offer) or any other active subscription add-on. Subscription add-on offers can only contain dependent products.

CUSTOMER_ACCOUNT_ID (as discussed above with reference to FIG. 18B, data for identifying a customer account, e.g., "Realm ID" generated by the access control system 1640 such as OII Grant in FIG. 16B).

OFFER_ID (add on offer) (an external identifier reference on transactions from the initiating source application such as customer facing offering application 160 shown in FIGS. 1 and 16B). This identifier for an offer for which an add-on is available for pre-determined entitled products to which the customer is subscribed is received with transactions via the customer facing offering application 160 and re-populated when a subsequent transition is processed).

SERVICE_STATE (as discussed with reference to FIG. 18B, a component or state data 1852 of the integrated or hybrid entitlement-service state model 1850; the service state 1852 indicates which status the subscription is in in terms of, for example, whether the customer is paying or is not, and drives what actions a user can take next in terms of changing their subscription portfolio).

ENTITLEMENT STATE) STATE (a component or state data 1851 of the integrated or hybrid entitlement-service state model 1850 that governs customer access to or use of the computer software product and in certain embodiments, may specify multiple access attributes such as whether access is allowed and the level of access.

As shown in FIG. 18B, the integrated or hybrid entitlement state—service state model 1850 extends across multiple subscription data elements—one integrated or hybrid state model 1850 for the subscription element 1820 involving the base entitled product, and one integrated or hybrid state model 2050 with its own entitlement state data 2051 and service state data 2052 involving the add-on product, as specified by the entitled product and entitled product attribute element 2020 and 2030.

Figure 21A:
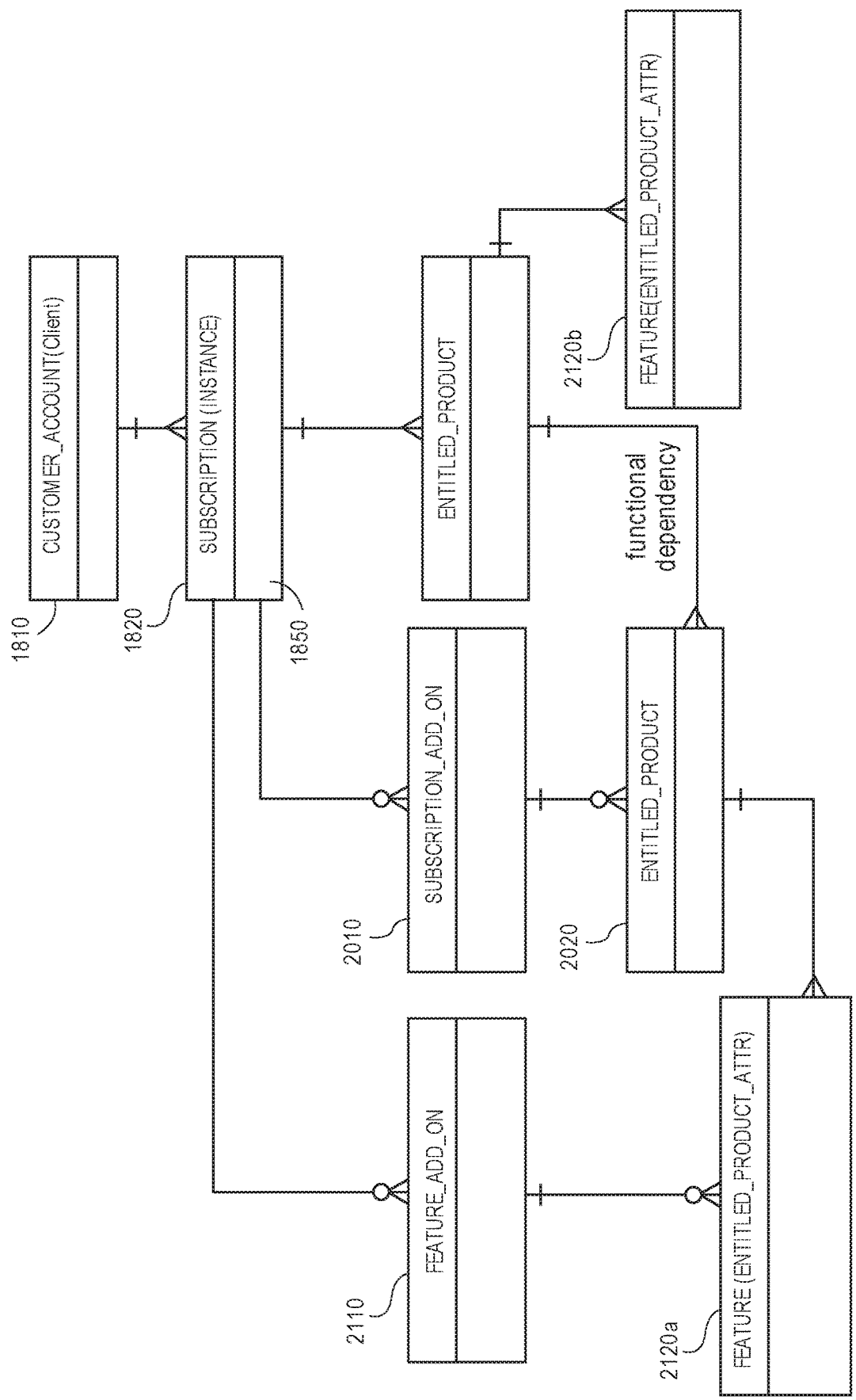
FIGS. 21A-B illustrate a subscription model constructed according to one embodiment that includes an integrated or hybrid entitlement-service state model and how different model elements are related to each other in order to control access to a computer software product that was the subject of a system generated offer and customer actions related thereto and that also provides for management of product add-ons to a base entitled computer software product and for management of feature add-ons to an entitled computer software product.
Figure 21B:
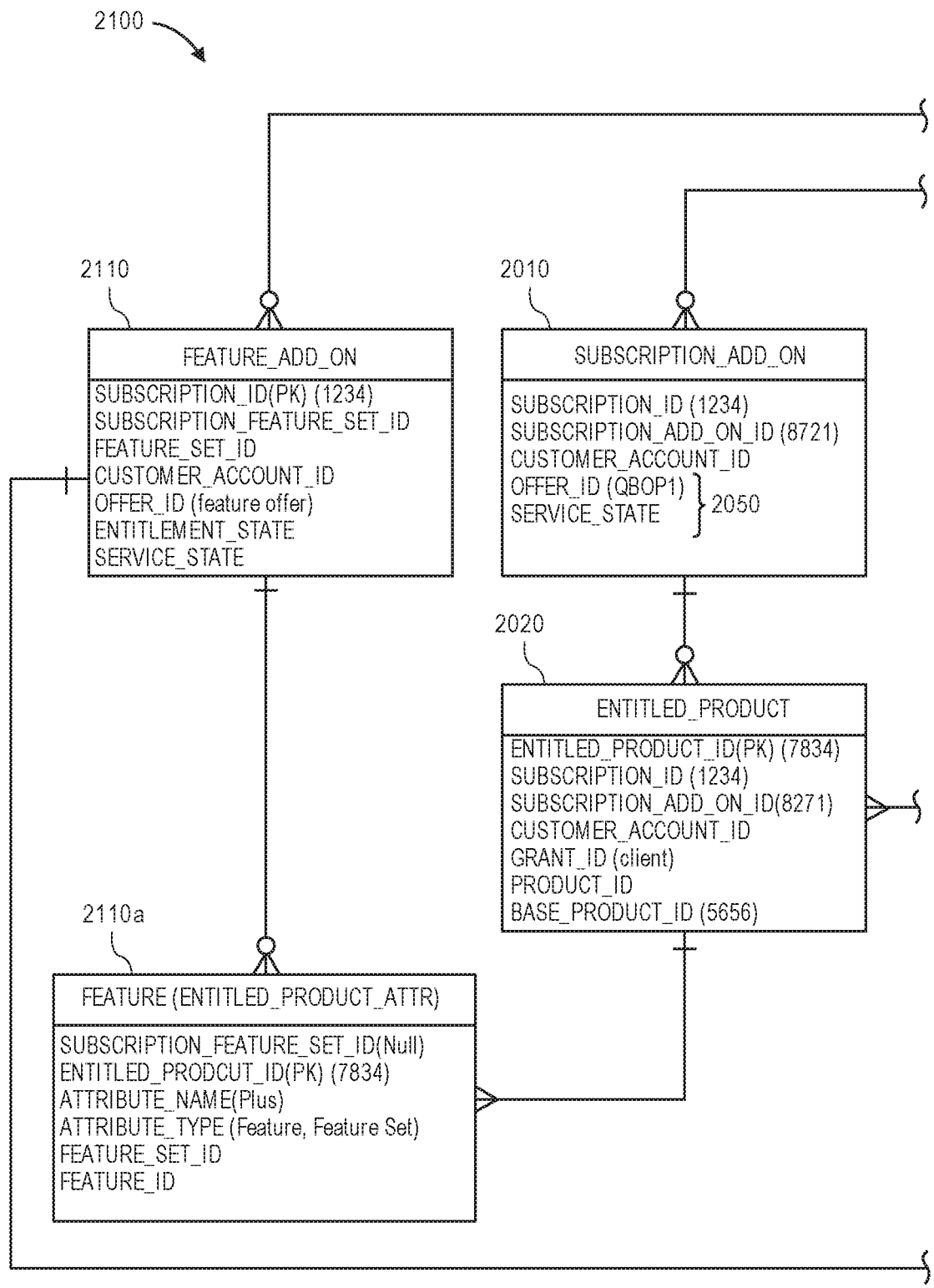
Figure 21B:
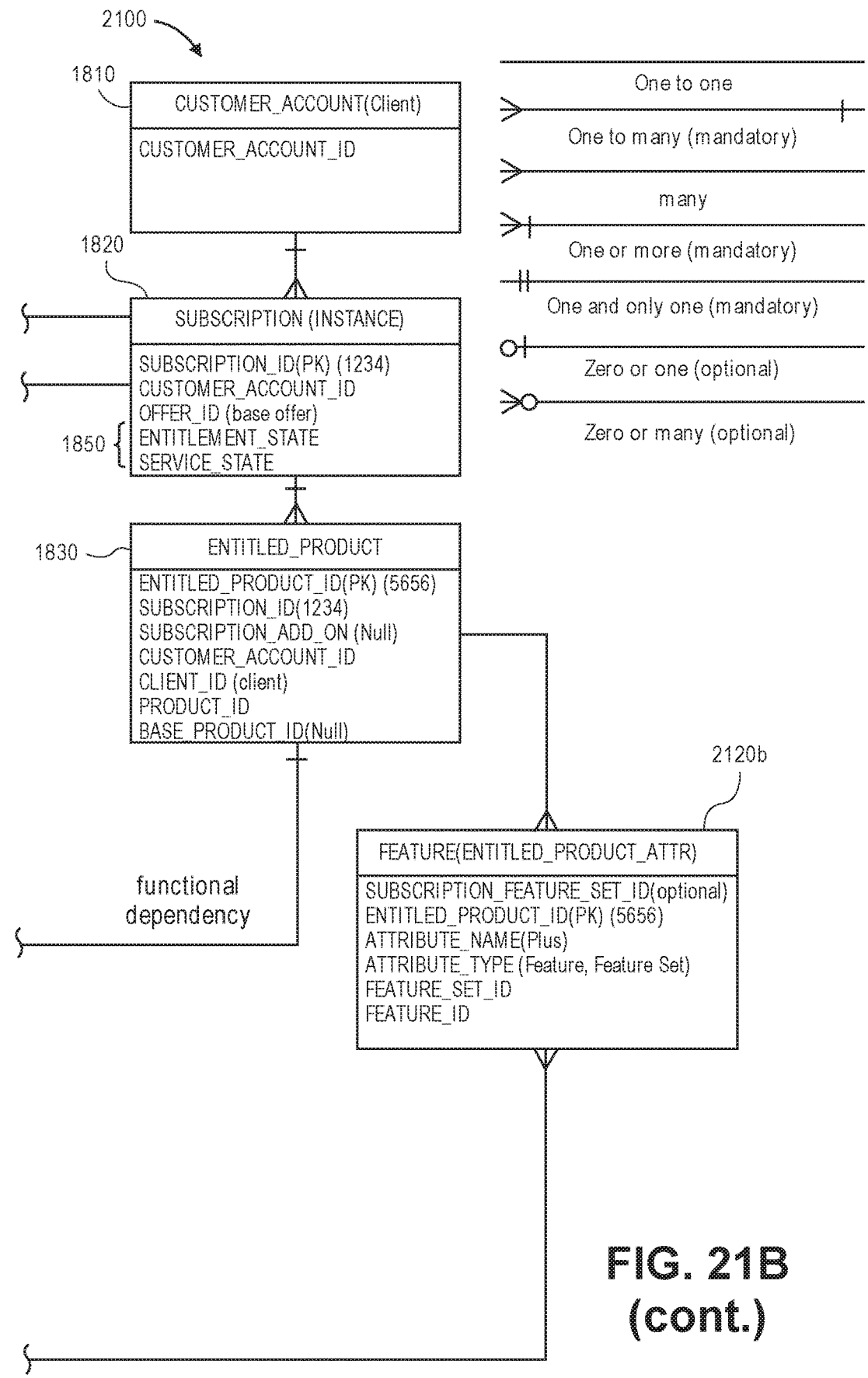

Referring to FIGS. 21A-B, while certain embodiments are described with reference to a subscription add-on in the form of a separate add-on computer software product to a different and independent base computer program product, embodiments may also account for individual feature add-ons for the same entitled computer software product. FIGS. 21A-B illustrate an embodiment of a runtime subscription model 2100 that accounts for both subscription add-ons, which involve a different computer software product, and feature add-ons, which involve other features for the same entitled product. Thus, a customer may have a paid subscription to a base entitled product of QBO with a limited feature set and may be eligible, by virtue of already having a paid subscription to QBO, to also utilize other add-on QBO features or QBO feature sets.

The embodiment illustrated in FIGS. 21A-B illustrate a runtime subscription model 2100 that includes a logical representation of both feature add-ons and product add-ons, and it will be understood that embodiments may involve one or both types of add-ons, or no such add-ons.

Referring to FIGS. 21A-B, a logical representation of a runtime subscription model 2100 constructed according to one embodiment and that incorporates an integrated or hybrid entitlement state—service state model 1850 also provides for representation of feature add-ons (versus product add-ons) to the entitled product. In the illustrated embodiment, the runtime subscription model 2100 provides for adaptive governance of use of a first or base computer software product by a subscriber or customer and an add-on of a feature for that same entitled product are illustrated. In the illustrated embodiment, the runtime subscription model 2100 that accounts for feature add-ons includes various elements, tables, objects or records (generally, "element") that are linked or associated with each other and data thereof, various aspects of which are described with reference to FIGS. 18A-B and 20A-B, and the runtime subscription model 2100 may have feature-specific data elements including FEATURE_ADD-ON element 2100, FEATURE (ENTITLED_PRODUCT_ATTR) element 2110 (two of which 2110a, 2001b are shown for features pertaining to the different entitled products), and additional subscription add-on references can be added to previously described ENTITLED PRODUCT elements as needed.

Figure 22:
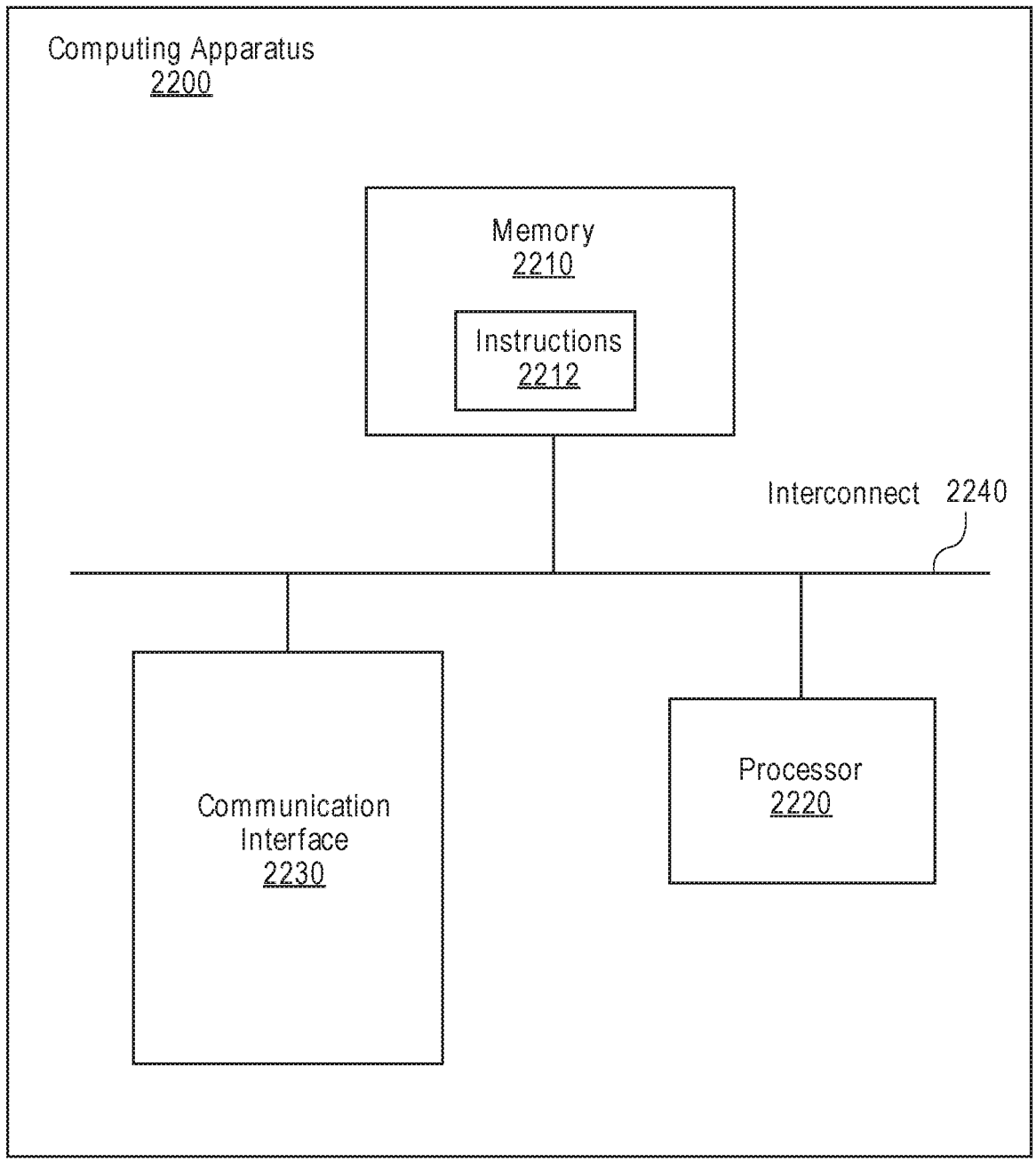
FIG. 22 is a block diagram of components of a computer system that may be programmed or configured to execute embodiments.

FIG. 22 generally illustrates certain components of a computing device 2200 that may be utilized as part of the ICS system 310a or a spoke computing system 150. That is, system components of the ICS system 310a or spoke computing system 150 include components of a computing device 1700 for execution of various computer instructions according to embodiments. For example, the computing device may include a memory 2210, program instructions 2212, a processor or controller 2220 to execute instructions 2212, a network or communications interface 2230, e.g., for communications with a network or interconnect 2240 between such components. The memory 2210 may be or include one or more of cache, RAM, ROM, SRAM, DRAM, RDRAM, EEPROM and other types of volatile or non-volatile memory capable of storing data. The processor unit 2220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2240 may include a system bus, LDT, PCI, ISA, or other types of buses, and the communications or network interface may, for example, be an Ethernet interface, a Frame Relay interface, or other interface. The network interface 2230 may be configured to enable a system component to communicate with other system components across a network which may be a wireless or various other networks. It should be noted that one or more components of computing device 2200 may be located remotely and accessed via a network. Accordingly, the system configuration provided in FIG. 22 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2220 performs steps or executes program instructions 2212 within memory 2210 and/or embodied on the carrier to implement method embodiments.

Although particular embodiments have been shown and described with reference to FIGS. 1-22, it should be understood that the above discussion is not intended to limit the scope of these embodiments and that embodiments may be utilized in various other ways.

For example, it will be understood that while certain components of the entitlement-monetization model have been described as being reusable for other purposes, examples of model elements that may be re-used include: Product elements, records, tables or objects (e.g. QBO, Payroll), Feature Set elements, records, tables or objects 504 (QBO Essentials), Feature elements, records, tables or objects 506, including entitlement limits if applicable (QBO Essentials Feature Set), Charge elements, records, tables or objects 508 (QBO Essentials ROW USD Monthly recurring), Discount elements, records, tables or objects 512 (30 Percent Discount, Monthly Recurring), Package Component elements, records, tables or objects 516 (Composed of Charge, Feature Set, Discount) and Package elements, records, tables or objects 514 (QBO Essentials ROW USD Monthly Buy Now—30 Percent Off For 12 Months).

Further, while certain embodiments have been described with reference to design time software product configuration reflected in a generated offer, embodiments may be utilized to add a new Product 502 (which may involve cloning an existing product are starting with a new previously unreleased product), adding or editing values for the Product 502, prompting a user (administrator) to add lower level objects to complete the configuration like Entitlements, Entitlement Attributes, Charge Offers, etc., create a new Discount 512, which may involve defining a generic discount promotion container (which is tied to a Product 502—e.g. QBO), creating a new Package 514, which may involve selecting a Product 502 that has already been defined (e.g., QBO), Feature Set 504/Entitlement Definition (Essentials), Charge 508 (QBO Essentials ROW USD Monthly Recurring), Discount 512 (30% Off, Monthly Recurring) to define new Package 514, or creating a new Offer 518, which may involve presenting a list of Packages 514 to select, followed by data entry of offer level attributes like name, description, effective dates, adding to Transitions 512 to indicate what other offers to which a new offer can transition.

As another example, depending on system configurations, mapping and/or enrichment for publication to spoke computing systems may be may not be necessary depending on how the system is configured and how interfaces to billing and revenue recognition systems are implemented.

Moreover, spoke computing systems may be in network communication with the computing system or database hosing the entitlement-monetization model while at least one spoke computing system is in communication with a customer computer 180 through a network, or spoke computing systems may be managed by the same host or host computer and in communication with a customer computer 180 through a network.

Further, while embodiments involving a runtime integrated or hybrid entitlement-service state model have been described, it will be understood that the integrated data model including entitlement and monetization definitions and the integrated state model including entitlement state and serviced state data can execute independently of each other such that different embodiments of a deign time integrated data model ca be used with a runtime integrated state model, and different embodiments or versions of a runtime integrated state model can be used with a design time integrated data model. Moreover, this flexibility also results in reusability of model elements or portions thereof within a data model, as well as sharing of model element data between design time and runtime data models.

Thus, while embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computing system, the computing system hosting a computer software product with a customer facing application and comprising a database, one or more processors and at least one memory, the database in communication with the one or more processors and storing a runtime subscription model configured to be executed by the one or more processors to automatically control and manage at runtime access to and use of the computer software product that a customer subscribes to through the customer facing application, the at least one memory storing executable instructions, that when executed by the one or more processors, cause the one or more processors to:

access the database to execute the runtime subscription model, the runtime subscription model comprising a hybrid entitlement-service state model to specify multiple pre-determined hybrid states enabled to be transitioned from one to another, each hybrid state of the hybrid entitlement-service state model comprising a combination of first state data and second state data, the first state data representing an entitlement state and specifying whether access to the computer software product is active and granted to the customer, the second state data representing a service state as a sub-state of the active entitlement state and specifying one or more permissible customer actions each corresponding to a change to the service state based on the combination of the first state data and the second state data, the service state corresponding to one of a trial subscription, an opted-in transition to a paid subscription, or the paid subscription to the computer software product;

automatically generate an electronic event concerning the computer software product at runtime, the electronic event indicating a transition from a first hybrid state to a second hybrid state of the hybrid entitlement-service state model based at least in part upon a system generated change to the service state of the first hybrid state and a change to the service state of the first hybrid state caused by a permissible customer action specified by the second state data of the first hybrid state of the hybrid entitlement-service state model, the permissible customer action being received through the customer facing application accessed by the customer computer through the network;

automatically modify and transform the first hybrid state of the hybrid entitlement-service state model to the second hybrid state of the hybrid entitlement-service state model in the database at runtime based on the generated electronic event;

modify, in the database, runtime subscription model data associated with a customer account comprising the combination of first state data and second state data associated with the second hybrid state of the hybrid entitlement-service state model, the modified runtime subscription model data indicating a runtime subscription instantiation of the computer software product that the customer is entitled to access under the second hybrid state;

receive a request from the customer to access the computer software product through the customer facing application via the customer computer through the network; and in response to the request, automatically control and manage the computer software product at runtime to determine whether the customer is granted access to and use of the computer software product through the customer facing application based at least in part upon the second hybrid state of the hybrid entitlement-service state model of the modified runtime subscription model data.

2. The computing system of claim 1, wherein the executable instructions are further operable to cause the computing system to:

in response to determine that the customer is permitted to access the computer software product through the customer facing application, determine capabilities of the computer software product that the customer is entitled to access via the customer computer through the network.

3. The computing system of claim 1, wherein the database is not accessible by the customer computer through the customer facing application utilized by the customer to transmit the request concerning the computer software product.

4. The computing system of claim 1, wherein the runtime subscription model comprises:

a customer account identification element comprising a unique identifier of the customer account associated with the computing system for the customer;

a subscription element comprising the hybrid entitlement-service state model and representing a runtime subscription instance and serving as a container for the computer software product to which the customer is entitled to access, the subscription element comprising a subscription offer identifier, the unique identifier of the customer account, the respective first state data and the respective second state data of the hybrid entitlement-service state model related to the entitled computer software product;

an entitled product element associated with the subscription element and the customer account identification element and identifying a subscription offer related to the entitled computer software product; and an entitled product attribute element associated with the entitled product element and comprising a feature or feature set of the entitled computer software product, the feature or feature set specifying a type or version of the entitled computer software product and functionality to access the entitled computer software product.

5. The computing system of claim 4, wherein the hybrid entitlement-service state model is exclusively contained within the subscription element.

6. The computing system of claim 4, wherein no part of the hybrid entitlement-service state model is included in the entitled product element or the entitled product attribute element.

7. The computing system of claim 4, wherein the runtime subscription model further comprises:
- a subscription add-on element identifying an offer for an add-on product to the computer software product, wherein the subscription add-on element is associated with the add-on product and includes its own hybrid entitlement-service state model with its own entitlement state data and service state data involving the add-on product;
- an entitled product element associated with the subscription add-on element and the customer account identification element and identifying the add-on product identified in the subscription add-on element offer; and
- an entitled product attribute element associated with the add-on product and specifying a feature or feature set of the add-on product.

8. The computing system of claim 7, wherein the customer is required to subscribe to the computer software product in order to be eligible to access the add-on product.

9. The computing system of claim 1, wherein the first state data of each hybrid state of the hybrid entitlement-service state model comprises:
- the entitlement state;
- first access data associated with the entitlement state and specifying whether the customer is granted access to the computer software product; and
- second access data associated with the entitlement state and specifying a level of access to the computer software product.

10. The computing system of claim 9, wherein the entitlement state is selected from a group consisting of:
- an active state which indicates a full access to the computer software product;
- an inactive state which indicates a read-only access to customer data of the computer software product; and
- a closed state which indicates no access to the computer software product.

11. The computing system of claim 9, wherein the first access data comprises data selected from a binary data set.

12. The computing system of claim 1, wherein the second state data of each hybrid state of the hybrid entitlement-service state model comprises the service state of the computer software product applicable to the customer account, wherein the one or more permissible customer actions are based at least in part upon the service state.

13. The computing system of claim 12, wherein the service state further corresponds to one of a group of subscription offers consisting of:
- the trial subscription to the computer software product during which the customer has opted-in to transition to the paid subscription upon a termination of the trial subscription;
- a pending cancellation of the paid subscription to the computer software product; and
- the paid subscription to the computer software product having an active status of being in collection of a subscription payment while the computing system awaits the subscription payment or retries to effect the subscription payment.

14. The computing system of claim 12, wherein the second state data of each hybrid state of the hybrid entitlement-service state model specifies a service state for a given active entitlement state, and wherein the one or more permissible customer actions each corresponding to a respective subscription offer are selected by the customer via the customer computer through the customer facing application from a group comprising:
- signing up for the trial subscription to the computer software product;
- opting-out to upgrade the computer software product;
- opting-in to a payment transition from the trial subscription to a paid subscription; and
- canceling auto renewing the subscription to the computer software product.

15. The computing system of claim 1, wherein the database further comprises a design time hybrid entitlement-monetization data model, the design time hybrid entitlement-monetization data model comprising:
- an entitlement definition specifying the computer software product and attributes of the computer software product, and
- a monetization definition specifying terms governing use of the computer software product specified by the entitlement definition, wherein the entitlement definition and the monetization definition are inextricably tied to each other in the entitlement-monetization data model.

16. The computing system of claim 15, further comprising:
- an intermediate publishing service in communication with the database; and
- a plurality of spoke computing systems in communication with the intermediate publishing service that is configured to publish elements of the entitlement-monetization data model to respective spoke computing systems for runtime processing of the customer request made through the customer facing application concerning the computer software product, at least one spoke computing system being configured to receive the request from the customer facing application through a network, the plurality of spoke computing systems being configured to process the request to deploy or provide access to the computer software product configured according to the entitlement-monetization data model through the network in response to the request.

17. The computing system of claim 16, wherein the plurality of spoke computing systems comprises:
- a first spoke computing system that serves as an electronic catalog of the computer software product configured according to the entitlement-monetization data model and is accessible by the customer through the customer facing application; and
- a second spoke computing system comprising an event generation system configured to generate the electronic event.

18. The computing system of claim 1, wherein the system generated change to the service state of the first hybrid state is caused by the one or more processor to identify at least one of a grace period of a subscription offer, a payment failure or a successful payment associated with the first service data or second service data of the respective hybrid state.

19. The computing system of claim 1, wherein the change to the service state of the first hybrid state is caused by the permissible customer action associated with a user's selection of one of multiple product subscription offers involving the computer software product when the customer interacts with the customer facing application of the customer computer through the network.

\* \* \* \* \*